(12) United States Patent
Anderson et al.

(10) Patent No.: US 6,592,999 B1
(45) Date of Patent: Jul. 15, 2003

(54) MULTI-LAYER COMPOSITES FORMED FROM COMPOSITIONS HAVING IMPROVED ADHESION, COATING COMPOSITIONS, AND METHODS RELATED THERETO

(75) Inventors: Lawrence G. Anderson, Pittsburgh, PA (US); John W. Burgman, Gibsonia, PA (US); Karen A. Morow, Verona, PA (US); Richard J. Sadvary, Pittsburgh, PA (US); Shiryn Tyebjee, Allison Park, PA (US); Dennis A. Simpson, Wexford, PA (US); Thomas R. Hockswender, Gibsonia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/919,200

(22) Filed: Jul. 31, 2001

(51) Int. Cl.$^7$ .................................................. B32B 9/04
(52) U.S. Cl. .................. 428/447; 428/413; 525/477; 525/478; 528/12; 528/25; 524/858; 156/326; 156/330
(58) Field of Search ................ 428/447, 413; 526/266, 273; 525/105, 477, 478; 528/12, 25, 29, 38, 87, 88, 403, 408, 419, 421; 524/795, 792, 858, 860, 414, 127, 100; 156/326, 330

(56) References Cited

U.S. PATENT DOCUMENTS

| | | | |
|---|---|---|---|
| 3,964,936 A | 6/1976 | Das ........................ 148/6.27 |
| 4,121,011 A | 10/1978 | Glover et al. ............ 428/347 |
| 4,652,497 A * | 3/1987 | Ascarelli et al. ........ 428/447 |
| 4,832,990 A | 5/1989 | Boccalon et al. ....... 427/388.1 |
| 5,049,245 A | 9/1991 | Nomura et al. .......... 204/27 |
| 5,073,455 A | 12/1991 | Nose et al. ............. 428/411.1 |
| 5,108,832 A | 4/1992 | Nugent, Jr. et al. ..... 428/304.4 |
| 5,853,809 A | 12/1998 | Campbell et al. ....... 427/407.1 |
| 5,939,491 A | 8/1999 | Wilt et al. ............... 525/100 |
| 5,948,541 A | 9/1999 | Inspektor ................ 428/469 |
| 5,951,747 A | 9/1999 | Lewis et al. ............. 106/14.44 |
| 5,976,716 A | 11/1999 | Inspektor ................ 428/698 |
| 6,059,867 A | 5/2000 | Lewis et al. ............. 106/14.44 |
| 6,111,044 A * | 8/2000 | Yamamoto et al. ...... 526/266 |
| 6,117,533 A | 9/2000 | Inspektor ................ 428/216 |
| 6,136,902 A | 10/2000 | Fukasawa et al. ....... 524/128 |
| 6,174,949 B1 | 1/2001 | Ninomiya et al. ....... 524/404 |
| 6,403,220 B1 * | 6/2002 | Brennan et al. .......... 428/413 |

FOREIGN PATENT DOCUMENTS

JP    04-039371    *    2/1992

OTHER PUBLICATIONS

"Encyclopedia of Chemical Technology", Kirk–Othmer, Fourth Edition, vol. 4, pp. 413–423.

"Organoborn Chemistry", Howard Steinberg, Interscience Publisher, vol. 1, pp. 840–867.

* cited by examiner

*Primary Examiner*—Robert Dawson
*Assistant Examiner*—Christopher Keehan
(74) *Attorney, Agent, or Firm*—Deborah M. Altman

(57) ABSTRACT

The present invention provides an improved multi-layer composite of two or more polymeric layers at least one of which is formed from a thermosetting composition. The composite includes at least a first polymeric layer formed on a substrate and a second polymeric layer over the first polymeric layer, wherein in the absence of a boron-containing compound, the first and second polymeric layers have poor interlayer adhesion. The improvement resides in the inclusion of at least one boron-containing compound in one or both of the first and second polymeric layers in an amount sufficient to improve the interlayer adhesion between the first and second polymeric layers. Also provided is an improved curable coating composition used to form a multi-layer composite coating of two or more cured coating layers, at least one of which is formed from the thermosetting composition. Related methods and coated substrates are also provided.

35 Claims, No Drawings

MULTI-LAYER COMPOSITES FORMED FROM COMPOSITIONS HAVING IMPROVED ADHESION, COATING COMPOSITIONS, AND METHODS RELATED THERETO

CROSS REFERENCE TO RELATED APPLICATIONS

Reference is made to related U.S. patent application Ser. Nos. 09/919,198, 09/919,093, 09/919,213 and 09/919,095, filed concurrently herewith.

FIELD OF THE INVENTION

The present invention relates to multi-layer composites of two or more polymeric layers, at least one of which is formed from a thermosetting composition. The composite comprising at least a first polymeric layer formed on a substrate and a second polymeric formed over at least a portion of the first polymeric layer, wherein in the absence of an adhesion promoting composition, the first polymeric layer and the second polymeric layer have poor interlayer adhesion. The present invention also relates to curable coating compositions used to form multi-layer composites, to methods for improving the interlayer adhesion of such multi-layer composites and to coated substrates.

BACKGROUND OF THE INVENTION

Color-plus-clear coating systems involving the application of a colored or pigmented basecoat to a substrate followed by application of a transparent or clearcoat over the basecoat have become increasingly popular as original finishes for a number of consumer products including, for example, automotive vehicles. The color-plus-clearcoating systems have outstanding appearance properties such as gloss and distinctness of image, due in large part to the clearcoat. Such color-plus-clearcoating systems have become popular for use with automotive vehicles, aerospace applications, floor coverings such as ceramic tiles and wood flooring, packaging coatings and the like.

Topcoat coating compositions, particularly those used to form the transparent clearcoat in color-plus-clearcoating systems for automotive applications, are subject to defects that occur during the assembly process as well as damage from numerous environmental elements. Such defects during the assembly process include paint defects in the application or curing of the basecoat or the clearcoat. Damaging environmental elements include acidic precipitation, exposure to ultraviolet radiation from sunlight, high relative humidity and high temperatures, defects due to contact with objects causing scratching of the coated surface, and defects due to impact with small, hard objects resulting in chipping of the coating surface.

Further, elastomeric automotive parts and accessories, for example, elastomeric bumpers and body side moldings, are typically coated "off site" and shipped to automobile assembly plants. The coating compositions applied to such elastomeric substrates are typically formulated to be very flexible so the coating can bend or flex with the substrate without cracking. To achieve the requisite flexibility, coating compositions for use on elastomeric substrates often are formulated to produce coatings with lower crosslink densities or to include flexibilizing adjuvants which act to lower the overall film glass transition temperature (Tg). While acceptable flexibility properties can be achieved with these formulating techniques, they also can result in softer films that are susceptible to scratching. Consequently, great expense and care must be taken to package the coated parts to prevent scratching of the coated surfaces during shipping to automobile assembly plants.

U.S. Pat. No. 6,235,858 B1 discloses carbamate and/or urea functional polymers for use in coating compositions, especially clear coating compositions for color-plus-clear coating systems. Such polymers provide coatings with good resistance to damage caused by acidic precipitation.

U.S. Pat. No. 5,853,809 discloses clearcoats in color-plus-clear systems which have improved scratch resistance due to the inclusion in the coating composition of inorganic particles such as colloidal silicas which have been surface modified with a reactive coupling agent via covalent bonding.

A number of patents disclose the use of a surface active material, for example, a polysiloxane, in coating compositions to improve mar resistance of the cured coatings. U.S. Pat. Nos. 5,939,491 and 6,225,434B1 disclose coating compositions comprising organic polysiloxanes having reactive functional groups. These polysiloxanes provide coatings with improved mar and scratch resistance.

A number of patents disclose the use of boric acid in polymeric compositions. For example, U.S. Pat. Nos. 5,951,747 and 6,059,867 discloses the use of boric acid and borates in conjunction with a succinate in non-chromate, corrosion-inhibiting coating compositions for improved adhesion to metallic surfaces. Such compositions further include inhibitors such as phosphates, phosphosilicates, silicates, titanates, and zinc salts. U.S. Pat. No. 4,832,990 discloses a process for improving adhesion of polyolefins to metal substrates comprising mechanical cleaning of the metal surface, treating the metal surface with a water-alcohol solution containing an alkoxysilane and boric acid, thermally treating the acid treated substrate, and subsequently treating the substrate with a polyolefin-based composition comprising zeolites and carbon black pigment. U.S. Pat. No. 5,073,455 discloses a thermoplastic laminated film which has improved adhesion to hydrophilic polymers, hydrophobic polymers and inorganic substances. The film comprise a base film of thermoplastic resin and a layer formed on the base film comprising a composition of one or more of water-soluble resins, water emulsified resins and water-dispersible resins, and an organic boron polymer or a mixture composed of an organic boron polymer and vinyl alcohol.

Other multi-layer composite coatings are commonplace in modern coating lines. For example, a typical automotive coating system can include the sequential application of an electrodeposition primer, a primer-surfacer, a color enhancing base coat, and a transparent top coat. In some instances, the electrodeposition primer is applied over a mill-applied weldable, thermosetting coating which has been applied to the coiled steel metal substrate from which the automobile body (or body parts, such as fenders, doors and hoods) has been formed. Also, adhesive coatings, for example, windshield adhesives, trim and molding adhesives and structural adhesives are sometimes applied to the cured top coats where necessary. Due to these multi-layer composite coating processes, it is necessary that the previously applied coating layer have excellent intercoat or interlayer adhesion to the subsequently applied coating layer(s).

Although the aforementioned coating compositions exhibit improvements for acid etch resistance and mar and scratch resistance, such compositions may not be readily recoatable. That is, when a subsequent coating is applied to the cured mar and scratch resistant coating composition, the intercoat adhesion between the cured coating and the subsequently applied coating can be quite poor.

For example, as mentioned above, on most vehicle coating lines the vehicle body is first given a corrosion inhibitive electrodepositable primer coating commonly formed from a cationic electrodepositable coating composition. This electrodeposition primer is fully cured and, a primer-surfacer is typically applied to the cured electrodeposition primer. The primer-surfacer serves to enhance chip resistance of subsequently applied top coatings as well as to ensure good appearance of the top coatings. The electrodepositable primer must have excellent interlayer, i.e., intercoat, adhesion to the subsequently applied primer-surfacer coating. The top coats, which can include a monocoats as well as a color-plus-clear coating system, are then applied to the cured primer-surfacer coating. While most top coats have excellent intercoat adhesion to the primer-surfacer coating, some top coating compositions inherently may exhibit intercoat adhesion problems with some primer-surfacer coatings.

Also, due to the resultant cost-savings, there is recent interest in the automotive coatings market in eliminating the primer-surfacer step altogether. That is, the top coats can be directly applied to the cured electrodeposition primer. In such modified coating processes, the electrodeposition primer is required to meet stringent durability and appearance specifications. Moreover, the cured electrodepositable primer must have excellent intercoat adhesion to the subsequently applied top coats (either monocoats or color coats of a color-plus-clear system).

On commercial automobile coating lines during application of the coating system, certain portions of the line can experience occasional process problems, for example, clearcoat applicator malfunctions, or curing oven faults where temperatures are out of specification. While the color coat typically is "flash cured" to drive off solvent, but not fully cure the coating, once the clear coating has been applied, the color-plus-clear coating system typically is given a full cure (e.g., 250° F. for 20 minutes) to simultaneously cure both the base coat and the top coat. In instances where the clear coat application system is malfunctioning, the auto body with the applied color coat will continue through the clear coat applicator station and into the clear coat curing oven, thereby fully curing the color coat. If this occurs, some automobile manufacturers elect to reapply the color coat over the fully cured color coat prior to application of the clearcoat. In such situations, the fully cured color coat can have poor intercoat adhesion with the subsequently applied color coat, even though the compositions may be the same.

Also, windshields and other items such as trim moldings typically are affixed to the body of a vehicle with an adhesive material, typically a moisture-cured material containing isocyanate group-containing polymers. Motor Vehicle Safety Standards (MVSS) require that these adhesives have complete adhesion to both the windshield and the coated substrate to which they are applied. Similar adhesive compositions can be used as structural adhesives as well. Such adhesives, for example, are commercially available from Essex Specialty Products, Inc. of Auburn Hills, Mich. These adhesive products adhere well to many cured top coating compositions used to coat vehicles such as automobiles. It is known, however, that these adhesive materials often do not completely adhere to some top coats, for example, those formed from coating compositions based on carbamate and/or urea containing polymers. This necessitates the application of a primer coating to the cured carbamate and/or urea-based top coatings prior to application of the windshield adhesive to ensure compliance with the aforementioned Motor Vehicle Safety Standards. Such primer coatings are typically based on moisture-curable polymers similar to those comprising the adhesive. Use of such primer coatings has proven to be effective, but primer coating application adds an additional and expensive step to the windshield and/or trim installation processes.

Moreover, as discussed previously, during the assembly process, the applied color-plus-clear coating can include surface defects in the clear coat surface which requires repair. Some automobile manufacturers elect to remove the defect and recoat the repair area with the same clear coat composition. In this instance, the cured clear coat must have excellent intercoat adhesion to the subsequently applied clear coat. It is known, however, that some clear coats when cured have poor intercoat adhesion with the subsequently applied repair clear coat.

In view of the foregoing, there remains a need in the coating industry for coating compositions which have improved properties such as acid etch resistance and mar and scratch resistance while maintaining excellent intercoat or interlayer adhesion to subsequently applied coatings and/or adhesives.

Also, many adhesion promoters are known in the art. Such adhesion promoters include, for example, phosphatized epoxy compounds, for example, the reaction product formed from phosphoric acid and a bisphenol A or hydrogenated bisphenol A diglycidyl ether. Typically, such adhesion promoters are useful for promoting adhesion of coating layers which contain them to a substrate, for example, a metallic substrate or an elastomeric substrate or to a previously applied coating layer. Also, such adhesion promoters can be used advantageously to promote cohesive integrity within a coating layer, for example, the cohesive integrity of a metal flake-containing basecoat. Further, it is known that adhesion promoter compositions, such as a phosphate wipe or an adhesion-promoting primer, can be topically applied to a cured coating to provide an adhesion promoting layer thereover, thereby improving adhesion of a subsequently applied coating. This, however, necessitates an additional and costly coating step in the coating application process. It is not known, however, to include an adhesion promoter as a component in a coating composition which will migrate during a curing reaction through the surrounding polymeric matrix to the surface of the resultant coating thereby promoting the interlayer or intercoat adhesion between the resultant coating and a subsequently applied coating.

As mentioned above, the surface of a coating can be modified by the inclusion of one or more surface active agents, for example, silicone oils, siloxanes, and fluorsurfactants, in the coating compositions to improve such properties as slip and mar resistance of such coatings. Typical surface active agents have solubility parameters or surface energies which are sufficiently different from the coating compositions (i.e., the composition without the surface active agent) such that, when included in the composition, the surface active agent can migrate or partition to the surface region of the cured coating as the composition cures. That is, the surface active agent is present at the surface region of the resultant coating layer. While such surface-modified coatings can exhibit improved slip and mar resistance, they often are difficult to recoat. Hence, the interlayer or intercoat adhesion with a subsequently applied coating is poor, sometimes resulting in delamination.

It has now been found that by selecting adhesion promoting components and surface active agents such that the solubility parameter of the coating composition containing both the adhesion promoting component and the surface active agent is sufficiently different from that of an analogous coating composition which does not contain the adhesion promoting component and the surface active agent, that the adhesion promoting component partitions to the surface region of the resultant coating. This can result in a concentration of the adhesion promoting component at the surface region which is greater than the concentration in the interior or bulk region of the coating layer. This partitioning effect of the adhesion promoting component can significantly increase its effect in promoting the adhesion of the coating layer which contains the adhesion promoter to a subsequently applied coating layer, as well as to the substrate to which it is applied.

SUMMARY OF THE INVENTION

In one embodiment, the present invention is directed to an improved multi-layer composite of two or more polymeric layers at least one of which is formed from a thermosetting composition. The composite comprises at least a first polymeric layer formed on a substrate and a second polymeric layer over at least a portion of the first polymeric layer, wherein in the absence of a boron-containing compound, the first polymeric layer and the second polymeric layer have poor interlayer adhesion. The improvement comprises the inclusion of at least one boron-containing compound selected from boric acid, boric acid equivalents, and mixtures thereof in one or both of the first and second polymeric layers in an amount sufficient to improve the interlayer adhesion of the first polymeric layer and the second polymeric layer.

The present invention is also directed to an improved curable coating composition used to form a multi-layer composite coating comprising two or more cured coating layers. The multi-layer composite coating comprises at least a first coating layer formed on at least a portion of a substrate and a second coating layer formed over at least a portion of the first coating layer, wherein one or both of the first and second coating layers is formed from the improved coating composition, and wherein in the absence of a boron-containing compound, the first coating layer and the second coating layer have poor interlayer adhesion. The improvement comprises the inclusion in the curable coating composition of a boron-containing compound selected from at least one of boric acid, boric acid equivalents, and mixtures thereof in an amount sufficient to improve the interlayer adhesion between the first coating layer and the second coating layer.

In a further embodiment, the present invention is directed to a method for improving the interlayer adhesion of a multi-layer composite comprising two or more polymeric layers, at least one of which is formed from a thermosetting composition. The composite comprises at least a first polymeric layer formed on at least a portion of a substrate and a second polymeric layer formed over at least a portion of the first polymeric layer, wherein in the absence of a boron-containing compound, the first polymeric layer and the second polymeric layer have poor interlayer adhesion. The improvement comprises the inclusion in one or both of the polymeric layers of any of the aforementioned boron-containing compounds in an amount sufficient to improve the interlayer adhesion of the first polymeric layer and the second polymeric layer.

In another embodiment, the present invention provides curable coating composition formed from components comprising (A) at least one film-forming polymer comprising at least one reactive functional group; (B) at least one reactant comprising at least one functional group that is reactive with the reactive functional group of the polymer (A); and (C)at least one compound selected from borates, aluminates, titanates, zirconates, silicates, siloxanes, silanes, and mixtures thereof, wherein each component is different.

Coated substrates are also provided.

DETAILED DESCRIPTION OF THE PREFERRED EMBODIMENTS

Other than in the operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10, that is, having a minimum value equal to or greater than 1 and a maximum value of equal to or less than 10.

In one embodiment, the present invention provides an improved multi-layer composite comprising at least a first polymeric layer and a second polymeric layer formed over the first polymeric layer thereby forming an interface region there between. At least one of the polymeric layers is formed from a thermosetting composition comprising an adhesion promoter composition. The adhesion promoter composition comprises (1) at least one adhesion promoting component, and (2) at least one surface active component. The improvement comprises the presence of the adhesion promoting component (1) at the interface region.

In a further embodiment, the present invention is directed to an improved multi-layer composite comprising at least a first polymeric layer and a second polymeric layer formed over the first polymeric layer thereby forming an interface region there between. The first polymeric layer has a surface region and a bulk region and is formed from a thermosetting composition. The thermosetting composition is formed from the following components: (A) at least one polymer comprising one or more reactive functional groups selected from at least one of a hydroxyl group and a carbamate group; (B) at least one curing agent selected from at least one of an aminoplast resin, a polyisocyanate and a blocked isocyanate; and (C) at least one adhesion promoter composition comprising (1) at least one adhesion promoting component selected from at least one of boric acid, boric acid equivalents, and mixtures thereof, and (2) at least one surface active component comprising a least one polysiloxane comprising at least one of the following structural units (I):

wherein each $R^1$ is independently selected from H, a monovalent hydrocarbon group or a siloxane group; each $R^2$ independently is a group comprising at least one reactive functional group, typically OR', where R' is H or an alkyl group having 1 to 20 carbon atoms; and m and n each represent a positive number fulfilling the requirements of 0<m<4; 0<n<4; and 2≦(m+n)≦4. The improvement comprises the presence of the adhesion promoting component (1) at the interface region.

The adhesion promoter composition comprises at least one adhesion promoting component (1) and at least one surface active component (2). It should be understood that the adhesion promoter composition can comprise the adhesion promoting component (1) and the surface active component as separate components in an admixture; or the adhesion promoter composition can comprise a reaction product formed from the adhesion promoting component (1) and the surface active component (2). Obviously, the adhesion promoter composition can comprise the above described reaction product formed from components (1) and (2), as well as the component (1), and the component (2), all present as three separate ingredients.

In one embodiment of the present invention, the adhesion promoter composition comprises an adhesion promoting component (1) which is selected from at least one of boron, aluminum, titanium, zirconium, and silicon. Typically, the adhesion promoting component (1) comprises a compound selected from at least one of a borate, an aluminate, a titanate, a zirconate, a silicate, a siloxane, a silane and mixtures thereof. In one specific embodiment of the invention, the at least one adhesion promoting component (1) is selected from at least one of a borate and an aluminate.

Examples of suitable borates are those discussed below in detail. Examples of titanates suitable for use in the compositions of the present invention include titanium isopropoxide, isopropyl triostearoyl titanate, dicyclo(dioct) pyrophosphato titanate, tetraisopropyl di(dioctyl)phosphito titanate. Suitable aluminates include aluminum alkoxides such as aluminum isoproxide, which is typically employed, and aluminum acetylacetonate, Exemplary of a suitable silicate is tetraethyl orthosilicate. Suitable siloxanes include tetraisopropyldisiloxanes and tetramethylsiloxane. Suitable silanes include tetramethyl silyl ethers. In one embodiment of the present invention, a polysiloxane comprising one or more hydroxyl functional groups is employed as the surface active component (2). In one particular embodiment of the present invention, the adhesion promoting component (1) comprises an aluminum alkoxide, such as aluminum triisopropoxide, and the surface active component (2) comprises a polysiloxane comprising one or more hydroxyl groups.

Other materials suitable for use as the surface active component (2) are any of the surface active agents well known in the art. As used herein, by "surface active agent" is meant any material which tends to lower the solid surface tension or surface energy of the "cured" composition or coating. That is, the cured composition or coating formed from a composition comprising a surface active agent has a lower solid surface tension or surface energy than a cured coating formed from the analogous composition which does not contain the surface active agent.

For purposes of the present invention, solid surface tension can be measured according to the Owens-Wendt method using a Rame'-Hart Contact Angle Goniometer with distilled water and methylene iodide as reagents. Generally, a 0.02 cc drop of one reagent is placed upon the cured coating surface and the contact angle and its complement are measured using a standard microscope equipped with the goniometer. The contact angle and its complement are measured for each of three drops. The process is then repeated using the other reagent. An average value is calculated for the six measurements for each of the reagents. The solid surface tension is then calculated using the Owens-Wendt equation:

$$\{\gamma|(1+\cos \Phi)\}/2=(\gamma|^d\gamma_s^d)^{1/2}+(\gamma|^p\gamma_s^p)^{1/2}$$

where γ| is the surface tension of the liquid (methylene iodide=50.8, distilled water=72.8) and $\gamma^d$ and $\gamma^p$ are the dispersion and polar components (methylene iodide $\gamma^d$=49.5, $\gamma^p$=1.3; distilled water $\gamma^d$=21.8, $\gamma^p$=51.0); the values for Φ measured and the cos Φ determined. Two equations are then setup, one for methylene iodide and one for water. The only unknowns are $\gamma_s^{d \text{ and }} \gamma_s^p$. The two equations are then solved for the two unknowns. The two components combined represent the total solid surface tension.

The surface active component (2) can be selected from amphiphilic, reactive functional group-containing polysiloxanes such as are described below, amphiphilic fluoropolymers, and mixtures of any of the foregoing. With reference to water-soluble or water-dispersible amphiphilic materials, the term "amphiphilic" means a polymer having a generally hydrophilic polar end and a water-insoluble generally hydrophobic end. Nonlimiting examples of suitable functional group-containing polysiloxanes for use as surface active agents include those polysiloxanes described above. Nonlimiting examples of suitable amphiphilic fluoropolymers include fluoroethylene-alkyl vinyl ether alternating copolymers (such as those described in U.S. Pat. No. 4,345,057) available from Asahi Glass Company under the tradename LUMIFLON; fluorosurfactants, such as the fluoroaliphatic polymeric esters commercially available from 3M of St. Paul, Minn. under the tradename FLUORAD; functionalized perfluorinated materials, such as 1H, 1H-perfluoro-nonanol commercially available from Fluoro-Chem USA; and perfluorinated (meth)acrylate resins.

Nonlimiting examples of other adjuvant surface active agents suitable for use in the composition or coating of the present invention can include anionic, nonionic and cationic surface active agents.

Nonlimiting examples of suitable anionic surface active agents include sulfates or sulfonates. Specific nonlimiting examples include higher alkyl mononuclear aromatic sulfonates such as the higher alkyl benzene sulfonates containing from 10 to 16 carbon atoms in the alkyl group and a straight- or branched-chain, e.g., the sodium salts of decyl, undecyl, dodecyl, tridecyl, tetradecyl, pentadecyl or hexadecyl benzene sulfonate and the higher alkyl toluene, xylene and phenol sulfonates; alkyl naphthalene sulfonate, and sodium dinonyl naphthalene sulfonate. Other nonlimiting examples of suitable anionic surface active agents include olefin sulfonates, including long chain alkenylene sulfonates, long chain hydroxyalkane sulfonates, and mixtures of any of the foregoing. Nonlimiting examples of other sulfate or sulfonate detergents are paraffin sulfonates such as the reaction products of alpha olefins and bisulfites (e.g., sodium bisulfite). Also comprised are sulfates of higher alcohols, such as sodium lauryl sulfate, sodium tallow alcohol sulfate, or sulfates of mono-or di-glycerides of fatty acids (e.g., stearic monoglyceride monosulfate), alkyl poly (ethoxy)ether sulfates including, but not limited to, the sulfates of the condensation products of ethylene oxide and lauryl alcohol (usually having 1–5 ethenoxy groups per molecule); lauryl or other higher alkyl glyceryl ether sulfonates; aromatic poly(ethenoxy)ether sulfates including, but not limited to, the sulfates of the condensation products of ethylene oxide and nonyl phenol (usually having 1–20 oxyethylene groups per molecule). Further nonlimiting examples include salts of sulfated aliphatic alcohol, alkyl ether sulfate or alkyl aryl ethoxy sulfate available from Rhone-Poulenc under the general tradename ABEX. Phosphate mono-or di-ester type anionic surface active agents also can be used. These anionic surface active agents are well known in the art and are commercially available under the general trade designation GAFAC from GAF Corporation and under the general trade designation TRITON from Rohm & Haas Company.

Nonlimiting examples of nonionic surface active agents suitable for use in the cured composition or coating of the present invention include those containing ether linkages and which are represented by the following general formula: $RO(R'O)_nH$; wherein the substituent group R represents a hydrocarbon group containing 6 to 60 carbon atoms, the substituent group R' represents an alkylene group containing 2 or 3 carbon atoms, and mixtures of any of the foregoing, and n is an integer ranging from 2 to 100. Such nonionic surface active agents can be prepared by treating fatty alcohols or alkyl-substituted phenols with an excess of ethylene or propylene oxide. The alkyl carbon chain may contain from 14 to 40 carbon atoms and may be derived from a long chain fatty alcohol such as oleyl alcohol or stearyl alcohol. Nonionic polyoxyethylene surface active agents of the type represented by the formula above are commercially available under the general trade designation SURFYNOL® from Air Products Chemicals, Inc.; PLURONIC® or TETRONIC® from BASF Corporation; TERGITOL® from Union Carbide; and SURFONIC® from Huntsman Corporation. Other nonlimiting examples of suitable nonionic surface active agents include block copolymers of ethylene oxide and propylene oxide based on a glycol such as ethylene glycol or propylene glycol including, but not limited to, those available from BASF Corporation under the general designation PLURONIC®.

As indicated above, cationic surface active agents also can be used. Nonlimiting examples of cationic surface active agents suitable for use in the compositions of the present invention include acid salts of alkyl amines such as ARMAC® HT, an acetic acid salt of n-alkyl amine available from Akzo Nobel Chemicals; imidazoline derivatives such as CALGENE® C-100 available from Calgene Chemicals Inc.; ethoxylated amines or amides such as DETHOX® Amine C-5, a cocoamine ethoxylate available from Deforest Enterprises; ethoxylated fatty amines such as ETHOX® TAM available from Ethox Chemicals, Inc.; and glyceryl esters such as LEXEMUL® AR, a glyceryl stearate/stearaidoethyl diethylamine available from Inolex Chemical Co.

Other examples of suitable surface active agents can include polyacrylates. Nonlimiting examples of suitable polyacrylates include homopolymers and copolymers of acrylate monomers, for example polybutylacrylate and copolymers derived from acrylate monomers (such as ethyl (meth)acrylate, 2-ethylhexylacrylate, butyl (meth)acrylate and isobutyl acrylate), and hydroxy ethyl(meth)acrylate and (meth)acrylic acid monomers. In one embodiment, the polyacrylate can have amino and hydroxy functionality. Suitable amino and hydroxyl functional acrylates are disclosed in Example 26 below and in U.S. Pat. No. 6,013,733, which is incorporated herein by reference. Another example of a useful amino and hydroxyl functional copolymer is a copolymer of hydroxy ethyl acrylate, 2-ethylhexylacrylate, isobutyl acrylate and dimethylamino ethylmethacrylate. In another embodiment, the polyacrylate can have acid functionality, which can be provided, for example, by including acid functional monomers such as (meth)acrylic acid in the components used to prepare the polyacrylate. In another embodiment, the polyacrylate can have acid functionality and hydroxyl functionality, which can be provided, for example, by including acid functional monomers such as (meth)acrylic acid and hydroxyl functional monomers such as hydroxy ethyl (meth)acrylate in the components used to prepare the polyacrylate.

In one particular embodiment, the thermosetting composition used to form one or more of the polymeric layers is such that the free energy of mixing value for an admixture of the adhesion promoter composition and the analogous thermosetting composition which does not contain of the adhesion promoter composition is a positive value. In another embodiment of the present invention, the solubility parameter of the adhesion promoter composition is sufficiently different from the solubility parameter of the analogous thermosetting composition which does not contain the adhesion promoter composition, such that the resulting thermodynamic interaction parameter value ($\chi$) for the admixture of the adhesion promoter composition and the thermosetting composition which does not contain the adhesion promoter composition is 0.5 or greater.

The "free energy of mixing" is defined as $\Delta G = \Delta H - T\Delta S$, where G is the Gibb's free energy, H is enthalpy, S is entropy and T is temperature. In simple terms, when the free energy of mixing ($\Delta G$) of two components is a positive value, the two components are immiscible and will phase separate. For example, in the instance where a coating composition contains these two substantially immiscible components, when applied as a coating layer one component will tend to migrate or partition to the surface region of the coating layer while the other will remain in the bulk region. Also, $\Delta G$ for a binary mixture containing a component 1 and a component 2 may be defined by the following equation:

$$\Delta G = RT[(n_1 \ln X_1 + n_2 \ln X_2) + \chi n_1 X_2]$$

where R is the gas constant, T is temperature, X is the volume fraction of component 1 or 2, N is the number of particles, and $\chi$ ("chi") represents the thermodynamic interaction parameter. The thermodynamic interaction parameter ($\chi$ or "chi") is defined as the difference in the energy of mixing of components 1 and 2. This can be represented by the following equation:

$$\chi = (\Delta E_{mix}/RT)V_m$$

where $V_m$ is the average molar volume ("reference segment volume") and R and T are defined above. "Chi" may also be defined as the difference in solubility parameter (SP) of two materials.

$$\chi = V_m(\delta_1 - \delta_2)^2/RT$$

where $\delta$ is the Hildebrand solubility parameter. The solubility parameter may be computed from a value known as the cohesive energy density ("ced") of a material. The "ced" is related to the heat of vaporization of a material, that is, how much energy is required to remove a single molecule from the bulk. For polymeric systems, such as a coating composition, where the assumption that the entropy of mixing is exceedingly small, the free energy expressions reduce to the energy of mixing itself, that is $\Delta G=\Delta H$, and a theoretical critical point exists where two materials become immiscible (phase separate) when "chi" is greater than 0.5. For regular solutions, (low molecular weight species) this critical point has a value of 2.0.

To summarize, from first principles, the "ced" for a bulk material can be computed. The "ced" is directly related to the solubility parameter ($\delta$) as indicated above. The thermodynamic interaction parameter "chi" ($\chi$) can be computed from the differences in the solubility parameter ($\delta$) for each of the two materials. "Chi" along with relative fractions of materials in a mixture may be used to compute the free energy of mixing ($\Delta G$). If $\Delta G$ is a positive value, the mixture is thermodynamically unstable and phase separation will occur. Critical points for this condition are values of "chi" 0.5 and greater for higher molecular weight materials such as the polymeric components of a resinous binder system, and 2.0 for smaller molecules. Flory, Paul J., *Principles of Polymer Chemistry*, Cornell University Press (1953), Chapters XII and XIII; *Polymer User Guide*, Sep. 1996, Molecular Simulations, Inc., San Diego, Calif.; Nicolaides, D., *Parameterisation for Mesoscale Modeling*, Molecular Simulations, Inc.

Without intending to be bound by any theory, it is believed that by such phase separation discussed above, the adhesion promoting component (1) can be present in the interface region between the first polymer layer and the second polymer layer, thereby providing improved interlayer adhesion between the two.

In one embodiment of the present invention, the first polymeric layer is formed from the thermosetting composition, typically over a substrate, and comprises a surface region and a bulk region. As used herein "surface region" of the cured thermosetting composition (or of the resultant polymeric layer) means the region which is generally parallel to the exposed air-surface interface of the cured composition (typically formed on a substrate) and which has thickness generally extending perpendicularly from the surface of the cured polymeric layer to a depth ranging from at least 20 nanometers to 200 nanometers beneath the exposed surface. In certain embodiments, this thickness of the surface region ranges from at least 20 nanometers to 100 nanometers, and can range from at least 20 nanometers to 50 nanometers. As used herein, "bulk region" of the cured thermosetting composition (or the resultant polymeric layer) means the region which extends beneath the surface region and which is generally parallel to the surface of the substrate to which the composition has been applied. The bulk region has a thickness extending from its interface with the surface region through the cured composition to the substrate or polymeric layer beneath the cured composition.

In another embodiment of the present invention, the free energy of mixing value of an admixture of the adhesion promoter composition and the thermosetting composition without the adhesion promoter composition is a positive value such that the adhesion promoting component (1) is partitioned within the first polymeric layer to provide a concentration of the adhesion promoting component (1) at the surface region which is greater than the concentration of the adhesion promoting component (1) within the bulk region of the polymeric layer.

In yet another embodiment of the present invention, the solubility parameter of the adhesion promoter composition is sufficiently different from the solubility parameter of the thermosetting composition without the adhesion promoter composition, such that the thermodynamic interaction parameter value for the admixture of the adhesion promoter composition and the thermosetting composition without the adhesion promoter composition is greater than 0.5, thereby causing the adhesion promoting component (1) to partition within the first polymeric layer to provide a concentration of the adhesion promoting component (1) at the surface region which is greater than the concentration of the adhesion promoting component (1) in the bulk region of the first polymeric layer.

As previously mentioned, in one embodiment, the present invention provides an improved multi-layer composite of two or more polymeric layers at least one of which is formed from a thermosetting composition. The composite comprises at least a first polymeric layer formed on a substrate and a second polymeric layer over at least a portion of said first polymeric layer, wherein in the absence of an adhesion promoter composition, typically boron-containing compound the first polymeric layer and the second polymeric layer have poor interlayer adhesion. The improvement comprises the inclusion of at least one boron-containing compound selected from boric acid, boric acid equivalents, and mixtures thereof in one or both of the first and second polymeric layers in an amount sufficient to improve the interlayer adhesion of the first and second polymeric layers.

It should be understood that the composite of the present invention can comprise only two polymeric layers, wherein the first polymeric layer is formed on at least a portion of a substrate and the second polymeric layer is formed over at least a portion of the first polymeric layer. Alternatively, the composite of the present invention can comprise the first polymeric layer over at least a portion of a substrate, and the second polymeric layer formed over at least a portion of the first polymeric layer, where there are one or more subsequent polymeric layers formed over at least a portion of the second polymeric layer.

For example, the first polymeric layer can comprise a primer-surfacer coating and the second polymeric layer can comprise a color-enhancing base coating to which has been subsequently applied a transparent top coat. Also, the first polymeric layer can comprise an electrodepositable primer coating and the second polymeric layer can comprise a primer-surfacer coating to which has been subsequently applied an appearance enhancing monocoat or a color-plus-clear coating system. Additionally, the first polymeric layer can comprise a transparent clear coat (as the clear coat in a color-plus-clear coating system) and the second polymeric layer can comprise a repair clear coat.

Also, it should be understood that as used herein, a polymeric layer or composition formed "over" at least a portion of a "substrate" refers to a polymeric layer or composition formed directly on at least a portion of the substrate surface, as well as a polymeric layer or composition formed over any coating or adhesion promoter material which was previously applied to at least a portion of the substrate.

That is, the "substrate" upon which the first polymeric layer has been formed can comprise a metallic or elastomeric substrate to which one or more coating layers have been previously applied. For example, the "substrate" can comprise a metallic substrate and a weldable primer coating over at least a portion of the substrate surface, and the first polymeric layer can comprise an electrodepositable primer coating. Likewise, the "substrate" can comprise a metallic substrate having an electrodepositable primer formed over at least a portion thereof, and a primer-surfacer coating over at least a portion of the electrodepositable primer. The first polymeric layer can comprise, for example, a pigmented base coat over at least a portion of this multli-layer "substrate", and the second polymeric layer can comprise a pigment-free top coat formed over at least a portion of the pigmented base coat.

At least one of the first and second polymeric layers is formed from a thermosetting composition. In the multi-layer composite of the present invention, the first polymeric only can comprise a thermosetting composition, the second layer only can comprise a thermosetting composition, or, alternatively both the first and second polymeric layers can comprise a thermosetting composition. In the latter instance, the thermosetting composition from which the first polymeric layer is formed and the thermosetting composition from which the second polymeric layer is formed can be the same or different thermosetting composition.

In one embodiment of the present invention, both the first polymeric layer and the second polymeric layer are formed from a thermosetting composition. In another embodiment, the thermosetting composition comprises a curable coating composition as described below.

As used herein, by "thermosetting composition" is meant one which "sets" irreversibly upon curing or crosslinking, wherein the polymer chains of the polymeric components are joined together by covalent bonds. This property is usually associated with a cross-linking reaction of the composition constituents often induced by heat or radiation. Hawley, Gessner G., *The Condensed Chemical Dictionary*, Ninth Edition., page 856; *Surface Coatings*, vol. 2, Oil and Colour Chemists' Association, Australia, TAFE Educational Books (1974). Once cured or crosslinked, a thermosetting composition will not melt upon the application of heat and is insoluble in solvents. By contrast, a "thermoplastic composition" comprises polymeric components which are not joined by covalent bonds and thereby can undergo liquid flow upon heating and are soluble in solvents. Saunders, K. J., *Organic Polymer Chemistry*, pp. 41–42, Chapman and Hall, London (1973).

In one embodiment of the present invention, the substrate can comprise a metallic substrate. Examples of suitable metallic substrates can include ferrous metals and non-ferrous metals. Suitable ferrous metals include iron, steel, and alloys thereof. Non-limiting examples of useful steel materials include cold-rolled steel, galvanized (zinc coated) steel, electrogalvanized steel, stainless steel, pickled steel, GALVANNEAL®, GALVALUME®, and GALVAN® zinc-aluminum alloys coated upon steel, and combinations thereof. Useful non-ferrous metals include aluminum, zinc, magnesium and alloys thereof. Combinations or composites of ferrous and non-ferrous metals can also be used.

In another embodiment of the present invention, the substrate can comprise an elastomeric substrate. Suitable elastomeric substrates can include any of the thermoplastic or thermoset synthetic materials well known in the art. Nonlimiting examples of suitable flexible elastomeric substrate materials include polyethylene, polypropylene, thermoplastic polyolefin ("TPO"), reaction injected molded polyurethane ("RIM") and thermoplastic polyurethane ("TPU").

Nonlimiting examples of thermoset materials useful as substrates in connection with the present invention include polyesters, epoxides, phenolics, polyurethanes such as "RIM" thermoset materials, and mixtures of any of the foregoing. Nonlimiting examples of suitable thermoplastic materials include thermoplastic polyolefins such as polyethylene, polypropylene, polyamides such as nylon, thermoplastic polyurethanes, thermoplastic polyesters, acrylic polymers, vinyl polymers, polycarbonates, acrylonitrile-butadiene-styrene ("ABS") copolymers, ethylene propylene diene terpolymer ("EPDM") rubber, copolymers, and mixtures of any of the foregoing.

If desired, the polymeric substrates described above can have an adhesion promoter present on the surface of the substrate over which any of a number of coating compositions (including the coating compositions of the present invention as described below) can be applied. To facilitate adhesion of organic coatings to polymeric substrates, the substrate can be pretreated using an adhesion promoter layer or tie coat, e.g., a thin layer 0.25 mils (6.35 microns) thick, or by flame or corona pretreatment.

Suitable adhesion promoters for use over polymeric substrates include chlorinated polyolefin adhesion promoters such as are described in U.S. Pat. Nos. 4,997,882; 5,319,032; and 5,397,602, incorporated by reference herein. Other useful adhesion promoting coatings are disclosed in U.S. Pat. Nos. 6,001,469 (a coating composition containing a saturated polyhydroxylated polydiene polymer having terminal hydroxyl groups), 5,863,646 (a coating composition having a blend of a saturated polyhydroxylated polydiene polymer and a chlorinated polyolefin) and 5,135,984 (a coating composition having an adhesion promoting material obtained by reacting a chlorinated polyolefin, maleic acid anhydride, acryl or methacryl modified hydrogenated polybutadiene containing at least one acryloyl group or methacryloyl group per unit molecule, and organic peroxide), which are incorporated herein by reference.

When the substrates are used as components to fabricate automotive vehicles (including, but not limited to, automobiles, trucks and tractors) they can have any shape, and can be selected from the metallic and/or flexible substrates described above. Typical shapes of automotive body components can include body side moldings, fenders, bumpers, hoods, and trim for automotive vehicles.

Also, as mentioned above, in the absence of an adhesion promoting composition, typically a boron-containing compound, the first polymeric layer and said second polymeric layer have poor interlayer adhesion. That is, the second polymeric layer, in the absence of a boron-containing compound present in either of the first polymeric layer or the second polymeric layer, the two layers have poor interlayer (i.e., intercoat) adhesion. As used herein, by "poor interlayer adhesion" is meant that the second polymeric layer will have delamination or adhesion loss from the first polymeric layer sufficient to be given a rating of 3 or lower, as determined in accordance with ASTM-D 3359-97, method B, using the rating scale specified therein.

The improvement comprises the inclusion of an adhesion promoting composition, typically a boron-containing compound, in one or both of the first polymeric layer and the second polymeric layer in an amount sufficient to improve the interlayer adhesion of the first polymeric layer and the second polymeric layer. The boron-containing compound can be present in the first polymeric layer only, the second polymeric layer only, or, alternatively, in both the first polymeric layer and the second polymeric layer. In one embodiment of the present invention, the boron-containing compound is present in the first polymeric layer.

Also, it should be understood that the adhesion promoter, for example, a boron-containing compound, can be present in any of the polymeric layers comprising the substrate over at least a portion of which is formed the first polymeric layer, as well as any of the polymeric layers that can be subsequently formed over at least a portion of the second polymeric layer.

In the multi-layer composite of the present invention, the boron-containing compound can comprise a compound selected from boric acid, boric acid equivalents, and mixtures thereof.

As used herein, in the specification and in the claims, by "boric acid equivalents" is meant any of the numerous boron-containing compounds which can hydrolyze in aqueous media to form boric acid. As used herein, by "boric acid equivalents" is meant any of the numerous boron-containing compounds which can hydrolyze in aqueous media to form boric acid. Specific, but non-limiting examples of boric acid equivalents include boron oxides, for example, $B_2O_3$; boric acid esters such as those obtained by the reaction of boric acid with an alcohol or phenol, for example, trimethyl borate, triethyl borate, tri-n-propyl borate, tri-n-butyl borate, triphenyl borate, triisopropyl borate, tri-t-amyl borate, triphenylborate, trimethoxyboroxine, tri-2-cyclohexylcyclohexyl borate, triethanolamine borate, triisopropylamine borate, mannitol borate, glycerol borate and triisopropanolamine borate.

Additionally, other amino-containing borates and tertiary amine salts of boric acid may be useful. Such boron-containing compounds include, but are not limited to, 2-(beta-dimethylaminoisopropoxy)4,5-dimethyl-1,3,2-dioxaborolane, 2-(beta-d iethylaminoethoxy)-4,4,6-trimethyl-1,3,2-dioxaborinane, 2-(beta-dimethylaminoethoxy)-4,4,6-trimethyl-1,3,2-dioxaborinane, 2-(betha-diisopropylaminoethoxy-1,3,2-dioxaborinane, 2-(beta-dibutylaminoethoxy)-4-methyl-1,3,2-dioxaborinane, 2-(gamma-dimethylaminopropoxy)-1,3,6,9-tetrapxa-2-boracycloundecane, and 2-(beta-dimethylaminoethoxy)-4,4-(4-hydorxybutyl)-1,3,2-dioxaborolane.

Boric acid equivalents can also include metal salts of boric acid (i.e., metal borates) provided that such metal borates can readily dissociate in aqueous media to form boric acid. Suitable examples of metal borates include, for example, calcium borate, potassium borates such as potassium metaborate, potassium tetraborate, potassium pentaborate, potassium hexaborate, and potassium octaborate, sodium borates such as sodium perborate, sodium metaborate, sodium diborate, sodium tetraborate, sodium pentaborate, sodium perborate, sodium hexaborate, and sodium octaborate, Likewise, ammonium borates can be useful.

Suitable boric acid equivalents can also include organic oligomeric and polymeric compounds comprising boron-containing moieties. Suitable examples include polymeric borate esters, such as those formed by reacting an active hydrogen-containing polymer, for example, a hydroxyl functional group-containing acrylic polymer or polysiloxane polymer, with boric acid and/or a borate ester to form a polymer having borate ester groups.

Polymers suitable for this purpose can include any of a variety of active hydrogen-containing polymers such as those selected from at least one of acrylic polymers, polyester polymers, polyurethane polymers, polyether polymers and silicon-based polymers. As used herein, by "silicon-based polymers" is meant a polymer comprising one or more —SiO— units in the backbone. Such silicon-based polymers can include hybrid polymers, such as those comprising organic polymeric blocks with one or more —SiO— units in the backbone.

Examples of active hydrogen-containing polymers suitable for this purpose include polymers comprising functional groups selected from at least one of a hydroxyl group, an amine group, an epoxy group, a carbamate group, a urea group, and a carboxylic acid group. In a particular embodiment of the present invention, the boron-containing compound is formed by reacting boric acid and/or a borate ester with at least one polymer selected from an acrylic polyol, a polyester polyol, a polyurethane polyol, a polyether polyol, a polysiloxane polyol and mixtures thereof.

In one embodiment of the present invention, the boron-containing compound comprises a polysiloxane borate ester formed from reactants (A) at least one polysiloxane comprising at least one of the following structural units (I):

wherein each $R^1$, which may be identical or different, represents H, OH, a monovalent hydrocarbon group or a monovalent siloxane group; each $R^2$, which may be identical or different, represents a group comprising at least one reactive functional group, wherein m and n fulfill the requirements of $0<n<4$, $0<m<4$ and $2\leq(m+n)<4$; and (B) at least one boron-containing compound selected from at least one of boric acid, a boric acid equivalent, and mixtures thereof.

It should be understood that the "at least one polysiloxane comprising at least one structural unit (I)" above is a polymer that contains at least two Si atoms per molecule. As used herein, the term "polymer" in meant to encompass oligomer, and includes without limitation both homopolymers and copolymers. It should also be understood that the at least one polysiloxane can include linear, branched, dendritic or cyclic polysiloxanes.

Moreover, as used herein, "formed from" denotes open, e.g., "comprising," claim language. As such, it is intended that a composition "formed from" a list of recited components be a composition comprising at least these recited components, and can further comprise other, nonrecited components, during the composition's formation.

Also, as used herein, the term "reactive" refers to a functional group that forms a covalent bond with another functional group under conditions sufficient to cure the composition.

As used herein, the phrase "each component is different" refers to components which do not have the same chemical structure as other components in the composition.

Each of m and n depicted in the at least one structural unit (I) above fulfill the requirements of $0<n<4$, $0<m<4$ and $2\leq(m+n)<4$. When $(m+n)$ is 3, the value represented by n can be 2 and the value represented by m is 1. Likewise, when $(m+n)$ is 2, the value represented by each of n and m is 1.

As used herein, the term "cure" as used in connection with a composition, e.g., "composition when cured," shall mean that any crosslinkable components of the composition are at least partially crosslinked. In certain embodiments of the present invention, the crosslink density of the crosslinkable components, i.e., the degree of crosslinking, ranges from 5% to 100% of complete crosslinking. In other embodiments, the crosslink density ranges from 35% to 85% of full crosslinking. In other embodiments, the crosslink density ranges from 50% to 85% of full crosslinking. One skilled in the art will understand that the presence and degree of crosslinking, i.e., the crosslink density, can be determined by a variety of methods, such as dynamic mechanical thermal analysis (DMTA) using a TA Instruments DMA 2980 DMTA analyzer conducted under nitrogen. This method determines the glass transition temperature and crosslink density of free films of coatings or polymers. These physical properties of a cured material are related to the structure of the crosslinked network.

As used herein, a "monovalent hydrocarbon group" means a monovalent group having a backbone repeat unit based exclusively on carbon. As used herein, "monovalent" refers to a substituent group that, as a substituent group, forms only one single, covalent bond. For example, a monovalent group on the at least one polysiloxane will form one single covalent bond to a silicon atom in the backbone of the at least one polysiloxane polymer. As used herein, "hydrocarbon groups" are intended to encompass both branched and unbranched hydrocarbon groups.

Thus, when referring to a "monovalent hydrocarbon group," the hydrocarbon group can be branched or unbranched, acyclic or cyclic, saturated or unsaturated, or aromatic, and can contain from 1 to 24 (or in the case of an aromatic group from 3 to 24) carbon atoms. Nonlimiting examples of such hydrocarbon groups include alkyl, alkoxy, aryl, alkaryl, and alkoxyaryl groups. Nonlimiting examples of lower alkyl groups include, for example, methyl, ethyl, propyl, and butyl groups. As used herein, "lower alkyl" refers to alkyl groups having from 1 to 6 carbon atoms. One or more of the hydrogen atoms of the hydrocarbon can be substituted with heteroatoms. As used herein, "heteroatoms" means elements other than carbon, for example, oxygen, nitrogen, and halogen atoms.

As used herein, "siloxane" means a group comprising a backbone comprising two or more —SiO— groups. For example, the siloxane groups represented by $R^1$, which is discussed above, and R, which is discussed below, can be branched or unbranched, and linear or cyclic. The siloxane groups can be substituted with pendant organic substituent groups, for example, alkyl, aryl, and alkaryl groups. The organic substituent groups can be substituted with heteroatoms, for example, oxygen, nitrogen, and halogen atoms, reactive functional groups, for example, those reactive functional groups discussed above with reference to $R^2$, and mixtures of any of the foregoing.

In one embodiment, the at least one polysiloxane (A), which is used to form the polysiloxane borate ester, comprises at least two reactive functional groups. The at least one polysiloxane can have a reactive group equivalent weight ranging from 50 to 1000 mg per gram of the at least one polysiloxane. In one embodiment, the at least one polysiloxane has a hydroxyl group equivalent weight ranging from 50 to 1000 mg KOH per gram of the at least one polysiloxane. In another embodiment, the at least one polysiloxane has a hydroxyl group equivalent weight ranging from 100 to 300 mg KOH per gram of the at least one polysiloxane, while in another embodiment, the hydroxyl group equivalent weight ranges from 100 to 500 mg KOH per gram.

In another embodiment, $R^2$ (see structural unit I above), which may be identical or different, represents a group comprising at least one reactive functional group selected from a hydroxyl group, a carboxyl group, an isocyanate group, a blocked isocyanate group, a primary amine group, a secondary amine group, an amide group, a carbamate group, a urea group, a urethane group, a vinyl group, an unsaturated ester group such as an acrylate group and a methacrylate group, a maleimide group, a fumarate group, an onium salt group such as a sulfonium group and an ammonium group, an anhydride group, a hydroxy alkylamide group, and an epoxy group.

In another embodiment, the at least one $R^2$ roup represents a group comprising at least one reactive functional group selected from a hydroxyl group and a carbamate group. In yet another embodiment, the at least one $R^2$ roup represents a group comprising at least two reactive functional groups selected from a hydroxyl group and a carbamate group. In another embodiment, the at least one R group represents a group comprising an oxyalkylene group and at least two hydroxyl groups.

In one embodiment, the at least one polysiloxane (A), which is used to form the polysiloxane borate ester, has the following structure (II) or (III):

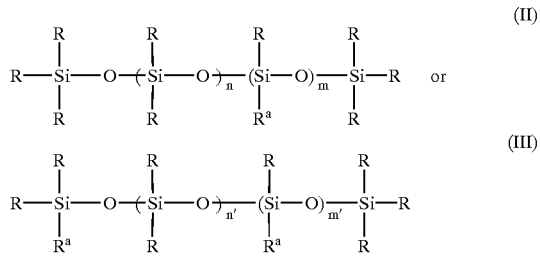

wherein: m has a value of at least 1; m' ranges from 0 to 75; n ranges from 0 to 75; n' ranges from 0 to 75; each R, which may be identical or different, is selected from H, OH, a monovalent hydrocarbon group, a monovalent siloxane group, and mixtures of any of the foregoing; and —$R^a$ comprises the following structure (IV):

wherein —$R^3$ is selected from an alkylene group, an oxyalkylene group, an alkylene aryl group, an alkenylene group, an oxyalkenylene group, and an alkenylene aryl group; and X represents a group which comprises at least one reactive functional group selected from a hydroxyl group, a carboxyl group, an isocyanate group, a blocked isocyanate group, a primary amine group, a secondary amine group, an amide group, a carbamate group, a urea group, a urethane group, a vinyl group, an unsaturated ester group such as an acrylate group and a methacrylate group, a maleimide group, a fumarate group, an onium salt group such as a sulfonium group and an ammonium group, an anhydride group, a hydroxy alkylamide group, and an epoxy group.

In one embodiment of the present invention, X represents a group which comprises at least one reactive functional group selected from a hydroxyl group, a carboxyl group, a primary amine group, a secondary amine group, an amide group, a carbamate group, a urea group, an anhydride group, a hydroxy alkylamide group, and an epoxy group.

As used herein, "alkylene" refers to an acyclic or cyclic, saturated hydrocarbon group having a carbon chain length of from $C_2$ to $C_{25}$. Nonlimiting examples of suitable alkylene groups include, but are not limited to, those derived from propenyl, 1-butenyl, 1-pentenyl, 1-decenyl, and 1-heneicosenyl, such as, for example $(CH_2)_3$, $(CH_2)_4$, $(CH_2)_5$, $(CH_2)_{10}$, and $(CH_2)_{23}$, respectively, as well as isoprene and myrcene.

As used herein, "oxyalkylene" refers to an alkylene group containing at least one oxygen atom bonded to, and interposed between, two carbon atoms and having an alkylene carbon chain length of from $C_2$ to $C_{25}$. Nonlimiting examples of suitable oxyalkylene groups include those derived from trimethylolpropane monoallyl ether, trimethylolpropane diallyl ether, pentaerythritol monoallyl ether, polyethoxylated allyl alcohol, and polypropoxylated allyl alcohol, such as —$(CH_2)_3OCH_2C(CH_2OH)_2(CH_2CH_2$—).

As used herein, "alkylene aryl" refers to an acyclic alkylene group substituted with at least one aryl group, for example, phenyl, and having an alkylene carbon chain length of $C_2$ to $C_{25}$. The aryl group can be further substituted, if desired. Nonlimiting examples of suitable substituent groups for the aryl group include, but are not limited to, hydroxyl groups, benzyl groups, carboxylic acid groups, and aliphatic hydrocarbon groups. Nonlimiting examples of suitable alkylene aryl groups include, but are not limited to, those derived from styrene and 3-isopropenyl-, -dimethylbenzyl isocyanate, such as —(CH$_2$)$_2$C$_6$H$_4$— and —CH$_2$CH(CH$_3$)C$_6$H$_3$(C(CH$_3$)$_2$ (NCO). As used herein, "alkenylene" refers to an acyclic or cyclic hydrocarbon group having one or more double bonds and having an alkenylene carbon chain length of C$_2$ to C$_{25}$. Nonlimiting examples of suitable alkenylene groups include those derived from propargyl alcohol and acetylenic diols, for example, 2,4,7,9-tetramethyl-5-decyne-4,7-diol which is commercially available from Air Products and Chemicals, Inc. of Allentown, Pa. as SURFYNOL 104.

Formulae (II) and (III) are diagrammatic, and are not intended to imply that the parenthetical portions are necessarily blocks, although blocks may be used where desired. In some cases the polysiloxane may comprise a variety of siloxane units. This is increasingly true as the number of siloxane units employed increases and especially true when mixtures of a number of different siloxane units are used. In those instances where a plurality of siloxane units are used and it is desired to form blocks, oligomers can be formed which can be joined to form the block compound. By judicious choice of reactants, compounds having an alternating structure or blocks of alternating structure may be used.

In one embodiment of the present invention the substituent R$^3$ represents an oxyalkylene group. In another embodiment, R$^3$ represents an oxyalkylene group, and X represents a group which comprises at least two reactive functional groups.

In another embodiment of the present invention where the at least one polysiloxane (A) has the structure (II) or (III) described above, (n+m) ranges from 2 to 9. In yet another embodiment where the at least one polysiloxane have the structure (II) or (III) described above, (n+m) ranges from 2 to 3. In another embodiment, where the at least one polysiloxane have the structure (II) or (III) described above, (n'+m') ranges from 2 to 9. In another embodiment where the at least one polysiloxane has the structure (II) or (III) described above, (n'+m') ranges from 2 to 3.

In yet another embodiment of the present invention, the substituent X represents a group comprising at least one reactive functional group selected from a hydroxyl group and a carbamate group. In another embodiment, the substituent X represents a group which comprises at least two hydroxyl groups. In yet another embodiment, X represents a group which comprises at least one group selected from H, a monohydroxy-substituted organic group, and a group having the following structure (V):

wherein the substituent group R$^4$ represents —CH$_2$—C—R$^3$ when p is 2 and the substituent group R$^3$ represents a C$_1$ to C$_4$ alkylene group, or the substituent group R$^4$ represents —CH$_2$—C—when p is 3, wherein at least a portion of X represents a group having the structure (V). In another embodiment, where the polysiloxane (A) has the structure (I) or (II) described above, m is 2 and p is 2.

In another embodiment of the present invention, the polysiloxane (A) is formed from at least the following reactants: (i) at least one polysiloxane of the formula (VI):

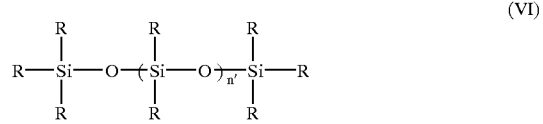

wherein each substituent group R, which may be identical or different, represents a group selected from H, OH, a monovalent hydrocarbon group, a monovalent siloxane group, and mixtures of any of the foregoing; at least one of the groups represented by R is H, and n' ranges from 0 to 100, also can range from 0 to 10, and can further range from 0 to 5, such that the percent of SiH content of the polysiloxane ranges from 2 to 50 percent, and can range from 5 to 25 percent; and (ii) at least one molecule which comprises at least functional group selected from a hydroxyl group, a carboxyl group, an isocyanate group, a blocked isocyanate group, a primary amine group, a secondary amine group, an amide group, a carbamate group, a urea group, a urethane group, a vinyl group, an unsaturated ester group such as an acrylate group and a methacrylate group, a maleimide group, a fumarate group, an onium salt group such as a sulfonium group and an ammonium group, an anhydride group, a hydroxy alkylamide group, and an epoxy group and at least one unsaturated bond capable of undergoing a hydrosilylation reaction. In another embodiment, the at least one functional group comprises hydroxyl groups.

It should be appreciated that the various R groups can be the same or different, and, in certain embodiments, the R groups will be entirely monovalent hydrocarbon groups or will be a mixture of different groups such as, for example, monovalent hydrocarbon groups and hydroxyl groups.

In another embodiment, this reaction product is ungelled. As used herein, "ungelled" refers to a reaction product that is substantially free of crosslinking and has an intrinsic viscosity when dissolved in a suitable solvent, as determined, for example, in accordance with ASTM-D1795 or ASTM-D4243. The intrinsic viscosity of the reaction product is an indication of its molecular weight. A gelled reaction product, on the other hand, since it is of an extremely high molecular weight, will have an intrinsic viscosity too high to measure. As used herein, a reaction product that is "substantially free of crosslinking" refers to a reaction product that has a weight average molecular weight (Mw), as determined by gel permeation chromatography, of less than 1,000,000.

It also should be noted that the level of unsaturation contained in reactant (ii) above, can be selected to obtain an ungelled reaction product. In other words, when a polysiloxane containing silicon hydride (i) having a higher average value of Si—H functionality is used, reactant (ii) can have a lower level of unsaturation. For example, the polysiloxane containing silicon hydride (i) can be a low molecular weight material where n' ranges from 0 to 5 and the average value of Si—H functionality is two or less. In this case, reactant (ii) can contain two or more unsaturated bonds capable of undergoing hydrosilylation reaction without the occurrence of gelation.

Nonlimiting examples of polysiloxanes containing silicon hydride (i) include 1,1,3,3-tetramethyl disilnoxane where n' is 0 and the average Si—H functionality is two; and polymethyl polysiloxane containing silicon hydride, where n' ranges from 4 to 5 and the average Si—H functionality is approximately two, such as is commercially available from BASF Corporation as MASILWAX BASE®.

Materials for use as reactant (ii) above can include hydroxyl functional group-containing allyl ethers such as those selected from trimethylolpropane monoallyl ether, pentaerythritol monoallyl ether, trimethylolpropane diallyl ether, polyoxyalkylene alcohols such as polyethoxylated alcohol, polypropoxylated alcohol, and polybutoxylated alcohol, undecylenic acid-epoxy adducts, allyl glycidyl ether-carboxylic acid adducts, and mixtures of any of the foregoing. Mixtures of hydroxyl functional polyallyl ethers with hydroxyl functional monoallyl ethers or allyl alcohols are suitable as well. In certain instances, reactant (ii) can contain at least one unsaturated bond in a terminal position. Reaction conditions and the ratio of reactants (i) and (ii) are selected so as to form the desired functional group.

The hydroxyl functional group-containing polysiloxane (A) can be prepared by reacting a polysiloxane containing hydroxyl functional groups with an anhydride to form the half-ester acid group under reaction conditions that favor only the reaction of the anhydride and the hydroxyl functional groups, and avoid further esterification from occurring. Nonlimiting examples of suitable anhydrides include hexahydrophthalic anhydride, methyl hexahydrophthalic anhydride, phthalic anhydride, trimellitic anhydride, succinic anhydride, chlorendic anhydride, alkenyl succinic anhydride, and substituted alkenyl anhydrides such as octenyl succinic anhydride, and mixtures of any of the foregoing.

The half-ester group-containing reaction product thus prepared can be further reacted with a monoepoxide to form a polysiloxane containing secondary hydroxyl group(s). Nonlimiting examples of suitable monoepoxides are phenyl glycidyl ether, n-butyl glycidyl ether, cresyl glycidyl ether, isopropyl glycidyl ether, glycidyl versatate, for example, CARDURA E available from Shell Chemical Co., and mixtures of any of the foregoing.

In another embodiment of the present invention, the at least one polysiloxane (A) is a carbamate functional group-containing polysiloxane which comprises the reaction product of at least the following reactants:
  (i) at least one polysiloxane containing silicon hydride of structure (VI) above where R and n' are as described above for that structure;
  (ii) at least one hydroxyl functional group-containing material having one or more unsaturated bonds capable of undergoing hydrosilylation reaction as described above; and
  (iii) at least one low molecular weight carbamate functional material, comprising the reaction product of an alcohol or glycol ether and a urea.

Examples of such "low molecular weight carbamate functional material" include, but are not limited to, alkyl carbamate and hexyl carbamates, and glycol ether carbamates described in U.S. Pat. Nos. 5,922,475 and 5,976,701, which is incorporated herein by reference.

The carbamate functional groups can be incorporated into the polysiloxane by reacting the hydroxyl functional group-containing polysiloxane with the low molecular weight carbamate functional material via a "transcarbamoylation" process. The low molecular weight carbamate functional material, which can be derived from an alcohol or glycol ether, can react with free hydroxyl groups of a polysiloxane polyol, that is, material having an average of two or more hydroxyl groups per molecule, yielding a carbamate functional polysiloxane (A) and the original alcohol or glycol ether. Reaction conditions and the ratio of reactants (i), (ii) and (iii) are selected so as to form the desired groups.

The low molecular weight carbamate functional material can be prepared by reacting the alcohol or glycol ether with urea in the presence of a catalyst such as butyl stannoic acid. Nonlimiting examples of suitable alcohols include lower molecular weight aliphatic, cycloaliphatic and aromatic alcohols, for example, methanol, ethanol, propanol, butanol, cyclohexanol, 2-ethylhexanol, and 3-methylbutanol. Nonlimiting examples of suitable glycol ethers include ethylene glycol methyl ether, and propylene glycol methyl ether. The incorporation of carbamate functional groups into the polysiloxane also can be achieved by reacting isocyanic acid with free hydroxyl groups of the polysiloxane.

As aforementioned, in addition to or in lieu of hydroxyl or carbamate functional groups, the at least one polysiloxane (A) can contain one or more other reactive functional groups such as carboxyl groups, isocyanate groups, blocked isocyanate groups, carboxylate groups, primary or secondary amine groups, amide groups, urea groups, urethane groups, an anhydride group, a hydroxy alkylamide group, epoxy groups, and mixtures of any of the foregoing.

When the at least one polysiloxane (A) contains carboxyl functional groups, the at least one polysiloxane (A) can be prepared by reacting at least one polysiloxane containing hydroxyl functional groups as described above with a polycarboxylic acid or anhydride. Nonlimiting examples of polycarboxylic acids suitable for use include adipic acid, succinic acid, and dodecanedioic acid. Nonlimiting examples of suitable anhydrides include those described above. Reaction conditions and the ratio of reactants are selected so as to form the desired functional groups.

In the case where at least one polysiloxane (A) contains one or more isocyanate functional groups, the at least one polysiloxane can be prepared by reacting at least one polysiloxane containing hydroxyl functional groups, as described above, with a polyisocyanate, such as a diisocyanate. Nonlimiting examples of suitable polyisocyanates include aliphatic polyisocyanates, such as, for example, aliphatic diisocyanates, for example, 1,4-tetramethylene diisocyanate and 1,6-hexamethylene diisocyanate; cycloaliphatic polyisocyanates, for example, 1,4-cyclohexyl diisocyanate, isophorone diisocyanate, and α,α-xylylene diisocyanate; and aromatic polyisocyanates, for example, 4,4'-diphenylmethane diisocyanate, 1,3-phenylene diisocyanate, and tolylene diisocyanate. These and other suitable polyisocyanates are described in more detail in U.S. Pat. No. 4,046,729, at column 5, line 26 to column 6, line 28, incorporated herein by reference. Reaction conditions and the ratio of reactants are selected so as to form the desired functional groups.

The substituent X in structure (IV) can comprise an oligomeric or polymeric urethane or urea-containing material which is terminated with isocyanate, hydroxyl, primary or secondary amine functional groups, or mixtures of any of the foregoing. When the substituent X comprises such functional groups, the at least one polysiloxane can be the reaction product of at least one polysiloxane polyol as described above, one or more polyisocyanates and, optionally, one or more compounds having at least two active hydrogen atoms per molecule selected from hydroxyl groups, primary amine groups, and secondary amine groups.

Nonlimiting examples of suitable polyisocyanates are those described above. Nonlimiting examples of compounds having at least two active hydrogen atoms per molecule include polyols and polyamines containing primary or secondary amine groups.

Nonlimiting examples of suitable polyols include polyalkylene ether polyols, including thio ethers; polyester polyols, including polyhydroxy polyesteramides; and hydroxyl-containing polycaprolactones and hydroxy-containing acrylic interpolymers. Also useful are polyether polyols formed from the oxyalkylation of various polyols, for example, glycols such as ethylene glycol, 1,6-hexanediol, Bisphenol A, and the like, or higher polyols such as trimethylolpropane, pentaerythritol and the like. Polyester polyols also can be used. These and other suitable polyols are described in U.S. Pat. No. 4,046,729 at column 7, line 52 to column 8, line 9; column 8, line 29 to column 9, line 66; and U.S. Pat. No. 3,919,315 at column 2, line 64 to column 3, line 33, both incorporated herein by reference.

Nonlimiting examples of suitable polyamines include primary or secondary diamines or polyamines in which the groups attached to the nitrogen atoms can be saturated or unsaturated, aliphatic, alicyclic, aromatic, aromatic-substituted-aliphatic, aliphatic-substituted-aromatic and heterocyclic. Exemplary suitable aliphatic and alicyclic diamines include 1,2-ethylene diamine, 1,2-porphylene diamine, 1,8-octane diamine, isophorone diamine, propane-2,2-cyclohexyl amine, and the like. Suitable aromatic diamines include phenylene diamines and the toluene diamines, for example, o-phenylene diamine and p-tolylene diamine. These and other suitable polyamines are described in detail in U.S. Pat. No. 4,046,729 at column 6, line 61 to column 7, line 26, incorporated herein by reference.

In one embodiment, the substituent group X of the structure (IV) can comprise a polymeric ester-containing group which is terminated with hydroxyl or carboxylic acid functional groups. When X is such a group, at least one polysiloxane can be the reaction product of one or more polysiloxane polyols as described above, one or more materials comprising at least one carboxylic acid functional group, and one or more organic polyols. Nonlimiting suitable examples of materials comprising at least one carboxylic acid functional group include carboxylic acid group-containing polymers well-known in the art, for example, carboxylic acid group-containing acrylic polymers, polyester polymers, and polyurethane polymers, such as those described in U.S. Pat. No. 4,681,811. Nonlimiting examples of suitable organic polyols include those described above.

To form the at least one polysiloxane (A) containing epoxy groups, at least one polysiloxane containing hydroxyl functional groups as described above can be further reacted with a polyepoxide. The polyepoxide can be an aliphatic or cycloaliphatic polyepoxide or mixtures of any of the foregoing. Nonlimiting examples of polyepoxides suitable for use include epoxy functional acrylic copolymers prepared from at least one ethylenically unsaturated monomer comprising at least one epoxy group, for example glycidyl (meth)acrylate and allyl glycidyl ether, and one or more ethylenically unsaturated monomers which have no epoxy functionality. The preparation of such epoxy functional acrylic copolymers is described in detail in U.S. Pat. No. 4,681,811 at column 4, line 52 to column 5, line 50, incorporated herein by reference. Reaction conditions and the ratio of reactants are selected so as to form the desired functional groups.

In the embodiment of the present invention where the boron-containing compound is formed from the at least one functional group-containing polysiloxane (A) and the boron-containing compound (B), the at least one polysiloxane (A) can be reacted with the boron-containing compound (B) under condensation reaction conditions well known in the art. For example, mixing boric acid or a boric acid equivalent with a polyol and removing water by distillation either directly or in combination with a solvent. Other methods for preparing boric acid esters can be found in "Kirk-Othmer Encyclopedia of Chemical Technology" 4th edition, Vol 4, p 416; John Wiley and sons; 1992 Also, it should be understood, that the boron-containing compound can be formed in situ. That is, the composition from which one or both of the first and second polymeric layers is formed can comprise boric acid and/or a borate ester and an active hydrogen-containing component, such as a polymer or polysiloxane comprising hydroxyl functional groups, as separate components. The boron-containing compound can then be formed, for example, by forming the condensate reaction product, i.e., the borate ester, within the composition at ambient temperature or as the composition undergoes a curing reaction at elevated temperatures. In this instance, the composition can comprise the condensate reaction product, and the boric acid and/or the borate ester and the active hydrogen-containing component as three separate components.

In an alternative embodiment, the present invention provides thermosetting compositions, for example, curable coating compositions comprising (A) at least one polymer comprising at least one reactive functional group, such as those described in detail below, (B) at least one curing agent having at least one functional group reactive with the functional groups of (A), and (C) at least one compound selected from a borate, an aluminate, a titanate, a zirconate, a silicate, a siloxane, a silane and mixtures thereof, wherein each component is different. Typically, the at least one compound (C) is selected from at least one of a borate and an aluminate.

Examples of suitable borates are those discussed above. Examples of titanates suitable for use in the compositions of the present invention include titanium isopropoxide, isopropyl triostearoyl titanate, dicyclo(dioct)pyrophosphato titanate, tetraisopropyl di(dioctyl)phosphito titanate. Suitable aluminates include aluminum alkoxides such as aluminum isoproxide, which is typically employed, and aluminum acetylacetonate. Exemplary of a suitable silicate is tetraethyl orthosilicate. Suitable siloxanes include tetraisopropyldisiloxanes and tetramethylsiloxane. Suitable silanes include tetramethyl silyl ethers. In one embodiment of the present invention, a polysiloxane (a) comprising one or more hydroxyl functional groups is reacted with an aluminum alkoxide such as aluminum triisopropoxide.

In the multi-layer composite of the present invention, the compound (C), which typically is selected from at least one of an aluminum alkoxide or boron-containing compound such as those described in detail above, is present in one or both of the first and second polymeric layers in an amount sufficient to improve the interlayer adhesion between the first and the second polymeric layers. That is, when the compound (C) is present in one or both of the polymeric layers, the delamination or adhesion loss, as determined in accordance with ASTM-3359-97, method B, of the second polymeric layer from the first polymer layer can be increased by one or more numerical units of the rating scale specified in the aforementioned method. As mentioned previously, one or both of the first polymeric layer and the second polymeric layer can be formed from a thermosetting composition. In one embodiment of the invention, one or both of the first polymeric layer and the second polymeric layer comprise a cured layer formed from a thermosetting composition comprising (A) at least one film-forming polymer having reactive functional groups; (B) at least one curing agent having functional groups reactive with the functional groups of (A); and (C) at least one of the aforementioned boron-containing compounds, wherein the components are different.

When added to the other components that form the thermosetting composition from which the curable composition from which the first and/or the second polymeric layer is formed, the adhesion promoter composition, usually a boron-containing compound, (C) can be present in the composition in an amount sufficient to provide an amount of elemental adhesion promoter component (1), e.g., boron, present in the composition of at least 0.001 weight percent, often at least 0.025 weight percent, usually at least 0.05 weight percent, and typically at least 0.10 weight percent, based on total weight of the resin solids present in the composition. Also, the adhesion promoter composition, usually a boron-containing compound, (C), when added to the other components that form the thermosetting composition from which the curable composition from which the first and/or second polymeric layer is formed, can be present in the composition in an amount sufficient to provide an amount of elemental adhesion promoting component (1), usually boron, present in the composition of less than 5 weight percent, often less than 3 weight percent, usually less than 2.5 weight percent, and typically less than 2 weight percent, based on total weight of the resin solids present in the composition. The amount of adhesion promoter composition, e.g., boron-containing compound, (C) is present in the thermosetting composition in an amount sufficient to provide an amount of elemental adhesion promoting component (1), e.g., boron, present in the composition that can range between any combination of these values inclusive of the recited values.

As aforementioned, the thermosetting composition of the present invention (which can comprise a curable coating composition, comprises, in addition to the compound (C), at least one film-forming polymer comprising at least one reactive functional group (A), and at least one reactant, typically a curing agent, (B) comprising at least one functional group which is reactive with the functional group of (A). The at least one film-forming polymer having reactive functional groups (A) can be different from and in addition to the at least one curing agent (B), and compound (C). The film-forming polymer (A) can have at least one functional group reactive with the curing agent (B), and, if applicable, the compound (C). In one embodiment, the at least one reactive functional group-containing film-forming polymer (A) can be selected from at least one of polyether polymers, polyester polymers, acrylic polymers, silicon-based polymers, polyepoxide polymers, and polyurethane polymers.

In a particular embodiment of the present invention, the film-forming polymer (A) can comprise at least one reactive functional group selected from a hydroxyl group, a carboxyl group, an isocyanate group, a blocked isocyanate group, a primary amine group, a secondary amine group, an amide group, a carbamate group, a urea group, a urethane group, a vinyl group, an unsaturated ester group, a maleimide group, a fumarate group, an anhydride group, a hydroxy alkylamide group, and an epoxy group.

In another embodiment of the present invention, the film-forming polymer (A) comprises at least one reactive functional group selected from a hydroxyl group, a carbamate group, an epoxy group, an isocyanate group, and a carboxyl group. In another embodiment, the polymer comprises at least one reactive functional group selected from a hydroxyl group, and a carbamate group.

The film-forming polymer (A) can comprise a mixture of any of the foregoing reactive functional groups.

Film-forming polymers suitable for use as the at least one reactive functional group-containing film-forming polymer (A) can include any of a variety of functional polymers known in the art. For example, suitable hydroxyl group-containing polymers can include acrylic polyols, polyester polyols, polyurethane polyols, polyether polyols, and mixtures thereof. In a particular embodiment of the present invention, the film-forming polymer is an acrylic polyol having a hydroxyl equivalent weight ranging from 1000 to 100 rams per solid equivalent, preferably 500 to 150 rams per solid equivalent.

Suitable hydroxyl group and/or carboxyl group-containing acrylic polymers can be prepared from polymerizable ethylenically unsaturated monomers and are typically copolymers of (meth)acrylic acid and/or hydroxylalkyl esters of (meth)acrylic acid with one or more other polymerizable ethylenically unsaturated monomers such as alkyl esters of (meth)acrylic acid including methyl (meth)acrylate, ethyl (meth)acrylate, butyl (meth)acrylate and 2-ethyl hexylacrylate, and vinyl aromatic compounds such as styrene, alpha-methyl styrene, and vinyl toluene. As used herein, "(meth)acrylate" and like terms is intended to include both acrylates and methacrylates.

In a one embodiment of the present invention the acrylic polymer can be prepared from ethylenically unsaturated, beta-hydroxy ester functional monomers. Such monomers can be derived from the reaction of an ethylenically unsaturated acid functional monomer, such as monocarboxylic acids, for example, acrylic acid, and an epoxy compound which does not participate in the free radical initiated polymerization with the unsaturated acid monomer. Examples of such epoxy compounds include glycidyl ethers and esters. Suitable glycidyl ethers include glycidyl ethers of alcohols and phenols such as butyl glycidyl ether, octyl glycidyl ether, phenyl glycidyl ether and the like. Suitable glycidyl esters include those which are commercially available from Shell Chemical Company under the tradename CARDURA E; and from Exxon Chemical Company under the tradename GLYDEXX-10. Alternatively, the beta-hydroxy ester functional monomers can be prepared from an ethylenically unsaturated, epoxy functional monomer, for example glycidyl (meth)acrylate and allyl glycidyl ether, and a saturated carboxylic acid, such as a saturated monocarboxylic acid, for example isostearic acid.

Epoxy functional groups can be incorporated into the polymer prepared from polymerizable ethylenically unsaturated monomers by copolymerizing oxirane group-containing monomers, for example glycidyl (meth)acrylate and allyl glycidyl ether, with other polymerizable ethylenically unsaturated monomers, such as those discussed above. Preparation of such epoxy functional acrylic polymers is described in detail in U.S. Pat. No. 4,001,156 at columns 3 to 6, incorporated herein by reference.

Carbamate functional groups can be incorporated into the polymer prepared from polymerizable ethylenically unsaturated monomers by copolymerizing, for example, the above-described ethylenically unsaturated monomers with a carbamate functional vinyl monomer such as a carbamate functional alkyl ester of methacrylic acid. Useful carbamate functional alkyl esters can be prepared by reacting, for example, a hydroxyalkyl carbamate, such as the reaction product of ammonia and ethylene carbonate or propylene carbonate, with methacrylic anhydride. Other useful carbamate functional vinyl monomers include, for instance, the reaction product of hydroxyethyl methacrylate, isophorone diisocyanate, and hydroxypropyl carbamate; or the reaction product of hydroxypropyl methacrylate, isophorone diisocyanate, and methanol. Still other carbamate functional vinyl monomers may be used, such as the reaction product of isocyanic acid (HNCO) with a hydroxyl functional acrylic or methacrylic monomer such as hydroxyethyl acrylate, and those described in U.S. Pat. No. 3,479,328, incorporated herein by reference. Carbamate functional groups can also be incorporated into the acrylic polymer by reacting a hydroxyl functional acrylic polymer with a low molecular weight alkyl carbamate such as methyl carbamate. Pendant carbamate groups can also be incorporated into the acrylic polymer by a "transcarbamoylation" reaction in which a hydroxyl functional acrylic polymer is reacted with a low molecular weight carbamate derived from an alcohol or a glycol ether. The carbamate groups exchange with the hydroxyl groups yielding the carbamate functional acrylic polymer and the original alcohol or glycol ether. Also, hydroxyl functional acrylic polymers can be reacted with isocyanic acid to provide pendent carbamate groups. Likewise, hydroxyl functional acrylic polymers can be reacted with urea to provide pendent carbamate groups.

The polymers prepared from polymerizable ethylenically unsaturated monomers can be prepared by solution polymerization techniques, which are well-known to those skilled in the art, in the presence of suitable catalysts such as organic peroxides or azo compounds, for example, benzoyl peroxide or N,N-azobis(isobutylronitrile). The polymerization can be carried out in an organic solution in which the monomers are soluble by techniques conventional in the art. Alternatively, these polymers can be prepared by aqueous emulsion or dispersion polymerization techniques which are well-known in the art. The ratio of reactants and reaction conditions are selected to result in an acrylic polymer with the desired pendent functionality.

Polyester polymers are also useful in the coating compositions of the invention as the film-forming polymer. Useful polyester polymers typically include the condensation products of polyhydric alcohols and polycarboxylic acids. Suitable polyhydric alcohols can include ethylene glycol, neopentyl glycol, trimethylol propane, and pentaerythritol. Suitable polycarboxylic acids can include adipic acid, 1,4-cyclohexyl dicarboxylic acid, and hexahydrophthalic acid. Besides the polycarboxylic acids mentioned above, functional equivalents of the acids such as anhydrides where they exist or lower alkyl esters of the acids such as the methyl esters can be used. Also, small amounts of monocarboxylic acids such as stearic acid can be used. The ratio of reactants and reaction conditions are selected to result in a polyester polymer with the desired pendent functionality, i.e., carboxyl or hydroxyl functionality.

For example, hydroxyl group-containing polyesters can be prepared by reacting an anhydride of a dicarboxylic acid such as hexahydrophthalic anhydride with a diol such as neopentyl glycol in a 1:2 molar ratio. Where it is desired to enhance air-drying, suitable drying oil fatty acids may be used and include those derived from linseed oil, soya bean oil, tall oil, dehydrated castor oil, or tung oil.

Carbamate functional polyesters can be prepared by first forming a hydroxyalkyl carbamate that can be reacted with the polyacids and polyols used in forming the polyester. Alternatively, terminal carbamate functional groups can be incorporated into the polyester by reacting isocyanic acid with a hydroxy functional polyester. Also, carbamate functionality can be incorporated into the polyester by reacting a hydroxyl polyester with a urea. Additionally, carbamate groups can be incorporated into the polyester by a transcarbamoylation reaction. Preparation of suitable carbamate functional group-containing polyesters are those described in U.S. Pat. No. 5,593,733 at column 2, line 40 to column 4, line 9, incorporated herein by reference.

Polyurethane polymers containing terminal isocyanate or hydroxyl groups also can be used as the polymer (d) in the coating compositions of the invention. The polyurethane polyols or NCO-terminated polyurethanes which can be used are those prepared by reacting polyols including polymeric polyols with polyisocyanates. Polyureas containing terminal isocyanate or primary and/or secondary amine groups which also can be used are those prepared by reacting polyamines including polymeric polyamines with polyisocyanates. The hydroxyl/isocyanate or amine/isocyanate equivalent ratio is adjusted and reaction conditions are selected to obtain the desired terminal groups. Examples of suitable polyisocyanates include those described in U.S. Pat. No. 4,046,729 at column 5, line 26 to column 6, line 28, incorporated herein by reference. Examples of suitable polyols include those described in U.S. Pat. No. 4,046,729 at column 7, line 52 to column 10, line 35, incorporated herein by reference. Examples of suitable polyamines include those described in U.S. Pat. No. 4,046,729 at column 6, line 61 to column 7, line 32 and in U.S. Pat. No. 3,799,854 at column 3, lines 13 to 50, both incorporated herein by reference.

Carbamate functional groups can be introduced into the polyurethane polymers by reacting a polyisocyanate with a polyester having hydroxyl functionality and containing pendent carbamate groups. Alternatively, the polyurethane can be prepared by reacting a polyisocyanate with a polyester polyol and a hydroxyalkyl carbamate or isocyanic acid as separate reactants. Examples of suitable polyisocyanates are aromatic isocyanates, such as 4,4'-diphenylmethane diisocyanate, 1,3-phenylene diisocyanate and toluene diisocyanate, and aliphatic polyisocyanates, such as 1,4-tetramethylene diisocyanate and 1,6-hexamethylene diisocyanate. Cycloaliphatic diisocyanates, such as 1,4-cyclohexyl diisocyanate and isophorone diisocyanate also can be employed.

Examples of suitable polyether polyols include polyalkylene ether polyols such as those having the following structural formulas (VII) or (VIII):

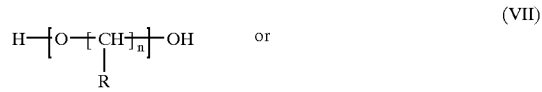

(VII)

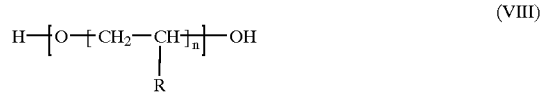

(VIII)

wherein the substituent R is hydrogen or a lower alkyl group containing from 1 to 5 carbon atoms including mixed substituents, and n has a value typically ranging from 2 to 6 and m has a value ranging from 8 to 100 or higher. Exemplary polyalkylene ether polyols include poly (oxytetramethylene) glycols, poly(oxytetraethylene) glycols, poly(oxy-1,2-propylene) glycols, and poly(oxy-1, 2-butylene) glycols.

Also useful are polyether polyols formed from oxyalkylation of various polyols, for example, glycols such as ethylene glycol, 1,6-hexanediol, Bisphenol A, and the like, or other higher polyols such as trimethylolpropane, pentaerythritol, and the like. Polyols of higher functionality which can be utilized as indicated can be made, for instance, by oxyalkylation of compounds such as sucrose or sorbitol. One commonly utilized oxyalkylation method is reaction of a polyol with an alkylene oxide, for example, propylene or ethylene oxide, in the presence of an acidic or basic catalyst. Specific examples of polyethers include those sold under the names TERATHANE and TERACOL, available from E. I. Du Pont de Nemours and Company, Inc.

Generally, the polymers having reactive functional groups which are useful in the coating compositions of the invention have a weight average molecular weight (Mw) typically ranging from 1000 to 20,000 preferably 1500 to 15,000 and more preferably 2000 to 12,000 as determined by gel permeation chromatography using a polystyrene standard.

Hydroxyl and/or carbamate functional group-containing polymers are typically employed.

Polyepoxides such as those described below with reference to the curing agent (B), can also be used.

The polymer having reactive functional groups (A) can be present in the thermosetting compositions in an amount of at least 2 percent by weight, usually at least 5 percent by weight, and typically at least 10 percent by weight based on weight of total resin solids in the coating composition. Also, the polymer having reactive functional groups can be present in the thermosetting compositions of the invention in an amount less than 80 percent by weight, usually less than 60 percent by weight, and typically less than 50 percent by weight based on weight of total resin solids in the coating composition. The amount of the polymer (A) having reactive functional groups present in the thermosetting compositions of the present invention can range between any combination of these values inclusive of the recited values.

As aforementioned, in addition to the functional group-containing film-forming polymer (A) and the boron-containing compound (C), the thermosetting composition of the present invention further comprises at least one curing agent having functional groups reactive with the functional groups of the film-forming polymer (A) (and/or the adhesion promoter composition, e.g. boron containing compound (C), where applicable).

Dependent upon the reactive functional groups of the film-forming polymer (A)(and, optionally, the composition/compound (C)), this curing agent can be selected from an aminoplast resin, a polyisocyanate, a blocked isocyanate, a polyepoxide, a polyacid, an anhydride, an amine, a polyol, and mixtures of any of the foregoing. In one embodiment, the at least one curing agent (B) is selected from an aminoplast resin and a polyisocyanate.

In another embodiment, the present invention is directed to any composition as previously described wherein the curing agent comprises an aminoplast resin. Aminoplast resins, which can comprise phenoplasts, as curing agents for hydroxyl, carboxylic acid, and carbamate functional group-containing materials are well known in the art. Suitable aminoplast resins, such as, for example, those discussed above, are known to those of ordinary skill in the art. Aminoplasts can be obtained from the condensation reaction of formaldehyde with an amine or amide. Nonlimiting examples of amines or amides include melamine, urea, or benzoguanamine. Condensates with other amines or amides can be used; for example, aldehyde condensates of glycoluril, which give a high melting crystalline product useful in powder coatings. While the aldehyde used is most often formaldehyde, other aldehydes such as acetaldehyde, crotonaldehyde, and benzaldehyde can be used.

The aminoplast resin contains imino and methylol groups and in certain instances at least a portion of the methylol groups are etherified with an alcohol to modify the cure response. Any monohydric alcohol can be employed for this purpose including methanol, ethanol, n-butyl alcohol, isobutanol, and hexanol.

Nonlimiting examples of aminoplasts include melamine-, urea-, or benzoguanamine-formaldehyde condensates, in certain instances monomeric and at least partially etherified with one or more alcohols containing from one to four carbon atoms. Nonlimiting examples of suitable aminoplast resins are commercially available, for example, from Cytec Industries, Inc. under the trademark CYMEL® and from Solutia, Inc. under the trademark RESIMENE®.

In another embodiment of the present invention, the curing agent comprises an aminoplast resin which, when added to the other components that form the thermosetting composition, is generally present in an amount ranging from 2 weight percent to 65 weight percent, can be present in an amount ranging from 5 weight percent to 50 weight percent, and typically is present in an amount ranging from 5 weight percent to 40 weight percent based on total weight of resin solids present in the composition.

In yet another embodiment of the present invention, the at least one reactant (B) comprises a polyisocyanate curing agent. As used herein, the term "polyisocyanate" is intended to include blocked (or capped) isocyanates as well as unblocked (poly)isocyanates. The polyisocyanate can be an aliphatic or an aromatic polyisocyanate, or a mixture of the foregoing two. Diisocyanates can be used, although higher polyisocyanates such as isocyanurates of diisocyanates are often used. Higher polyisocyanates also can be used in combination with diisocyanates. Isocyanate prepolymers, for example, reaction products of polyisocyanates with polyols also can be used. Mixtures of polyisocyanate curing agents can be used.

If the polyisocyanate is blocked or capped, any suitable aliphatic, cycloaliphatic, or aromatic alkyl monoalcohol known to those skilled in the art can be used as a capping agent for the polyisocyanate. Other suitable capping agents include oximes and lactams. When used, the polyisocyanate curing agent is typically present, when added to the other components which form the coating composition, in an amount ranging from 5 to 65 weight percent, can be present in an amount ranging from 10 to 45 weight percent, and often are present in an amount ranging from 15 to 40 percent by weight based on the total weight of resin solids present in the composition.

Other useful curing agents comprise blocked isocyanate compounds such as, for example, the tricarbamoyl triazine compounds described in detail in U.S. Pat. No. 5,084,541, which is incorporated by reference herein. When used, the blocked polyisocyante curing agent can be present, when added to the other components in the composition, in an amount ranging up to 20 weight percent, and can be present in an amount ranging from 1 to 20 weight percent, based on the total weight of resin solids present in the composition.

In one embodiment of the present invention, the curing agent comprises both an aminoplast resin and a polyisocyanate.

Anhydrides as curing agents for hydroxyl functional group-containing materials also are well known in the art and can be used in the present invention. Nonlimiting examples of anhydrides suitable for use as curing agents in the compositions of the invention include those having at least two carboxylic acid anhydride groups per molecule which are derived from a mixture of monomers comprising an ethylenically unsaturated carboxylic acid anhydride and at least one vinyl co-monomer, for example, styrene, alpha-methyl styrene, vinyl toluene, and the like. Nonlimiting examples of suitable ethylenically unsaturated carboxylic acid anhydrides include maleic anhydride, citraconic anhydride, and itaconic anhydride. Alternatively, the anhydride can be an anhydride adduct of a diene polymer such as maleinized polybutadiene or a maleinized copolymer of butadiene, for example, a butadiene/styrene copolymer. These and other suitable anhydride curing agents are described in U.S. Pat. No. 4,798,746 at column 10, lines 16–50; and in U.S. Pat. No. 4,732,790 at column 3, lines 41–57, both of which are incorporated herein by reference.

Polyepoxides as curing agents for carboxylic acid functional group-containing materials are well known in the art. Nonlimiting examples of polyepoxides suitable for use in the compositions of the present invention comprise polyglycidyl esters (such as acrylics from glycidyl methacrylate), polyglycidyl ethers of polyhydric phenols and of aliphatic alcohols, which can be prepared by etherification of the polyhydric phenol, or aliphatic alcohol with an epihalohydrin such as epichlorohydrin in the presence of alkali. These and other suitable polyepoxides are described in U.S. Pat. No. 4,681,811 at column 5, lines 33 to 58, which is incorporated herein by reference.

Suitable curing agents for epoxy functional group-containing materials comprise polyacid curing agents, such as the acid group-containing acrylic polymers prepared from an ethylenically unsaturated monomer containing at least one carboxylic acid group and at least one ethylenically unsaturated monomer which is free from carboxylic acid groups. Such acid functional acrylic polymers can have an acid number ranging from 30 to 150. Acid functional group-containing polyesters can be used as well. The above-described polyacid curing agents are described in further detail in U.S. Pat. No. 4,681,811 at column 6, line 45 to column 9, line 54, which is incorporated herein by reference.

Also well known in the art as curing agents for isocyanate functional group-containing materials are polyols, that is, materials having two or more hydroxyl groups per molecule, different from component (b) when component (b) is a polyol. Nonlimiting examples of such materials suitable for use in the compositions of the invention include polyalkylene ether polyols, including thio ethers; polyester polyols, including polyhydroxy polyesteramides; and hydroxyl-containing polycaprolactones and hydroxy-containing acrylic copolymers. Also useful are polyether polyols formed from the oxyalkylation of various polyols, for example, glycols such as ethylene glycol, 1,6-hexanediol, Bisphenol A and the like, or higher polyols such as trimethylolpropane, pentaerythritol, and the like. Polyester polyols also can be used. These and other suitable polyol curing agents are described in U.S. Pat. No. 4,046,729 at column 7, line 52 to column 8, line 9; column 8, line 29 to column 9, line 66; and U.S. Pat. No. 3,919,315 at column 2, line 64 to column 3, line 33, both of which are incorporated herein by reference.

Polyamines also can be used as curing agents for isocyanate functional group-containing materials. Nonlimiting examples of suitable polyamine curing agents include primary or secondary diamines or polyamines in which the radicals attached to the nitrogen atoms can be saturated or unsaturated, aliphatic, alicyclic, aromatic, aromatic-substituted-aliphatic, aliphatic-substituted-aromatic, and heterocyclic. Non limiting examples of suitable aliphatic and alicyclic diamines include 1,2-ethylene diamine, 1,2-porphylene diamine, 1,8-octane diamine, isophorone diamine, propane-2,2-cyclohexyl amine, and the like. Non-limiting examples of suitable aromatic diamines include phenylene diamines and the toluene diamines, for example, o-phenylene diamine and p-tolylene diamine. These and other suitable polyamines described in detail in U.S. Pat. No. 4,046,729 at column 6, line 61 to column 7, line 26, which is incorporated herein by reference.

When desired, appropriate mixtures of curing agents may be used. It should be mentioned that the thermosetting compositions compositions can be formulated as a one-component composition where a curing agent such as an aminoplast resin and/or a blocked isocyanate compound such as those described above is admixed with other composition components. The one-component composition can be storage stable as formulated. Alternatively, compositions can be formulated as a two-component composition where a polyisocyanate curing agent such as those described above can be added to a pre-formed admixture of the other composition components just prior to application. The pre-formed admixture can comprise curing agents such as aminoplast resins and/or blocked isocyanate compounds such as those described above.

In another embodiment in which the thermoseting composition can form a coating which is cured by actinic radiation or the combination of actinic radiation and thermal energy, the components from which the coating composition are formed further can comprise at least one photoinitiator or photosensitizer which provides free radicals or cations to initiate the polymerization process. Useful photoinitiators have an adsorption in the range of 150 to 2,000 nm. Non-limiting examples of useful photoinitiators include benzoin, benzophenone, hydroxy benzophenone, anthraquinone, thioxanthone, substituted benzoins such as butyl isomers of benzoin ethers, $\alpha,\alpha$-diethoxyacetophenone, $\alpha,\alpha$-dimethoxy-$\alpha$-phenylacetophenone, 2-hydroxy-2-methyl-1-phenyl propane 1-one and 2,4,6-trimethyl benzoyl diphenyl phosphine oxide.

In one embodiment, the present invention is directed to an improved curable coating composition used to form a multi-layer composite coating comprising at least a first coating layer formed on at least a portion of a substrate, and a second coating layer formed over at least a portion of the first coating layer, where one or both the first coating layer and the second coating layer are formed from the curable coating composition, and wherein in the absence of a boron-containing compound, the first and second coating layers have poor interlayer adhesion. The improvement comprises the inclusion in the curable coating composition of a boron-containing compound present in an amount sufficient to improve the interlayer adhesion between the first coating layer and the second coating layer.

The curable coating composition of the present invention can comprise any of the foregoing thermosetting compositions described above. Also, in the multi-layer composite coating wherein both of the first and second coating layers are formed from the curable composition, it should be understood that each of the first and second coating layers can be formed from the same or different curable coating compositions.

In a particular embodiment, the present invention is directed to a multi-layer composite coating as discussed above where one or both of the first coating layer and the second coating layer are formed from a curable coating composition formed from components comprising (A) an acrylic and/or a polyester polymer having at least one reactive functional group selected from a hydroxyl group, a carbamate group, and mixtures thereof; such as any of those described above, (B) a curing agent selected from an aminoplast resin and a polyisocyanate, such as those described above, and (C) any of the foregoing adhesion promoter compositions, e.g., boron-containing compounds, described above. In another embodiment, the present invention is directed to a multi-layer composite coating as discussed above where one or both of the first coating layer and the second coating layer are formed from a curable coating composition formed from components comprising (A) an acrylic and/or a polyester polymer having at least one reactive functional group selected from a hydroxyl group, a carbamate group, and mixtures thereof; (B) a curing agent selected from an aminoplast resin and a blocked isocyanate compound comprising a tricarbamoyl triazine; and (C) any of the boron-containing compounds described above.

The curable coating compositions of the present invention can be solvent-based compositions, water-based compositions, in solid particulate form, that is, a powder composition, in the form of a powder slurry or an aqueous dispersion. The components of the present invention used to form the compositions of the present invention can be dissolved or dispersed in an organic solvent. Nonlimiting examples of suitable organic solvents include alcohols, such as butanol; ketones, such as methyl amyl ketone; aromatic hydrocarbons, such as xylene; and glycol ethers, such as, ethylene glycol monobutyl ether; esters; other solvents; and mixtures of any of the foregoing.

In solvent based compositions, the organic solvent is generally present in amounts ranging from 5 to 80 percent by weight based on total weight of the resin solids of the components which form the composition, and can be present in an amount ranging from 30 to 50 percent by weight. The compositions as described above can have a total solids content ranging from 40 to 75 percent by weight based on total weight of the resin solids of the components which form the composition, and can have a total solids content ranging from 50 to 70 percent by weight. Alternatively, the inventive compositions can be in solid particulate form suitable for use as a powder coating, or suitable for dispersion in a liquid medium such as water for use as a powder slurry.

In a further embodiment, the compositions as previously described further comprise a catalyst which is present during the composition's formation. In one embodiment, the catalyst is present in an amount sufficient to accelerate the reaction between at least one reactive functional group of the at least one curing agent and/or at least one reactive functional group of the at least one film-forming polymer.

Nonlimiting examples of suitable catalysts include acidic materials, for example, acid phosphates, such as phenyl acid phosphate, and substituted or unsubstituted sulfonic acids such as dodecylbenzene sulfonic acid or para-toluene sulfonic acid. Non-limiting examples of suitable catalysts for reactions between isocyanate groups and active hydrogen-containing materials, for example, those comprising hydroxyl groups, include tin catalysts such as dibutyl tin dilaurate and dibutyl tin oxide. Non-limiting examples of epoxy acid base catalysts include tertiary amines such as N,N'-dimethyidodecyl amine catalysts. In another embodiment, the catalyst can be a phosphatized polyester or a phosphatized epoxy. In this embodiment, the catalyst can be, for example, the reaction product of phosphoric acid and a bisphenol A diglycidyl ether having two hydrogenated phenolic rings, such as DRH-151, which is commercially available from Shell Chemical Co. The catalyst can be present, when added to the other components that form the composition, in an amount ranging from 0.1 to 5.0 percent by weight, and is typically present in an amount ranging from 0.5 to 1.5 percent by weight based on the total weight of resin solids present in the composition.

In another embodiment, additional components can be present during the formation of the compositions as previously described. These additional components include, but are not limited to, particles different from components (A), (B) and (C), for example, silica in colloidal, fumed, or amorphous form, alumina or colloidal alumina, titanium dioxide, cesium oxide, yttrium oxide, colloidal yttria, zirconia, e.g., colloidal or amorphous zirconia, and mixtures of any of the foregoing, flexibilizers, plasticizers, surface active agents, thixotropic agents, rheology control modifiers, anti-gassing agents, organic cosolvents, flow controllers, hindered amine light stabilizers, anti-oxidants, UV light absorbers, coloring agents or tints, and similar additives conventional in the art, as well as mixtures of any of the foregoing can be included in the composition. These additional ingredients can be present, when added to the other components that form the composition, in an amount up to 40 percent by weight based on the total weight of resin solids present in the composition.

In one embodiment, the present invention is directed to a multi-layer composite coating wherein the first curable coating composition comprises a base coating composition and the second curable composition comprises a top coating composition. In another embodiment of the present invention, the base coating composition comprises a substantially pigment-free coating composition and the top coating composition comprises a substantially pigment-free top coating composition. In an alternative embodiment of the present invention, the base coating composition comprises a pigment-containing coating composition and the top coating composition comprises a pigment-containing composition. In another embodiment of the present invention, the base coating composition comprises a pigment-containing coating composition and the top coating composition comprises a substantially pigment-free coating composition. In another embodiment of the present invention, the base coating composition comprises a substantially pigment-free base coating composition and the top coating composition comprises a pigment-containing coating composition.

As used herein, by "substantially pigment-free coating composition" is meant a coating composition which forms a transparent coating, such as a clearcoat in a multi-component composite coating composition. Such compositions are sufficiently free of pigment or particles such that the optical properties of the resultant coatings are not seriously compromised. As used herein, "transparent" means that the cured coating has a BYK Haze index of less than 50 as measured using a BYK/Haze Gloss instrument.

The pigment-containing coating compositions can be any of the pigmented compositions commonly used in the coatings industry. For example, the pigment-containing coating composition can comprise a primer coating composition, such as a pigmented thermosetting weldable primer coating composition, for example, those commercially available under the tradename BONAZINC®, an electrodepositable coating composition such as ED-5000, a primer-surfacer coating composition such as GPX45379, a color-enhancing base coat such as HWB-9517, and ODCT-6373, all available from PPG Industries, Inc. of Pittsburgh, Pa., or an adhesive composition such as those used as automotive windshield adhesives, for example BETASEAL 15625 available from Essex Specialty Products.

Likewise, the pigment-free curable coating composition can comprise any of the pigment-free coatings known in the art such as those used as clear coats in color-plus-clear coating systems for the automotive industry. Non-limiting examples include TKU1050AR, ODCT-8000, and those available under the tradename DIAMONDCOAT® and NCT®, all commercially available from PPG Industries, Inc.

In another embodiment, the present invention is directed to multi-component composite coating compositions comprising a basecoat deposited from a pigment-containing base coating composition, which can comprise any of the aforementioned curable coating compositions, and a topcoat deposited from any of the coating compositions of the present invention previously described above. In one embodiment, the present invention is directed to a multi-component composite coating composition as previously described, wherein the topcoating composition is transparent after curing and is selected from any of the compositions previously described. The components used to form the topcoating composition in these embodiments can be selected from the coating components discussed above, and additional components also can be selected from those recited above. It should be understood that one or both of the basecoating composition and the top coating composition can be formed from the curable coating compositions of the present invention.

The basecoat and transparent topcoat (i.e., clearcoat) compositions used in the multi-component composite coating compositions of the present invention in certain instances can be formulated into liquid high solids coating compositions, that is, compositions containing 40 percent, or greater than 50 percent by weight resin solids. The solids content can be determined by heating a sample of the composition to 105° C. to 110° C. for 1–2 hours to drive off the volatile material, and subsequently measuring relative weight loss. As aforementioned, although the compositions can be liquid coating compositions, they also can be formulated as powder coating compositions.

Where the basecoat is not formed from a composition of the present invention (but the topcoat is formed from a curable coating composition of the present invention) the coating composition of the basecoat in the color-plus-clear system can be any of the compositions useful in coatings applications, particularly automotive applications. The coating composition of the basecoat can comprise a resinous binder and a pigment to act as the colorant. Nonlimiting examples of resinous binders are acrylic polymers, polyesters, alkyds, and polyurethanes.

The resinous binders for the basecoat can be organic solvent-based materials such as those described in U.S. Pat. No. 4,220,679, note column 2, line 24 continuing through column 4, line 40, which portions are incorporated by reference. Also, water-based coating compositions such as those described in U.S. Pat. Nos. 4,403,003, 4,147,679 and 5,071,904 can be used as the binder in the basecoat composition. These U.S. patents are incorporated herein by reference.

The basecoat composition can comprise one or more pigments as colorants. Nonlimiting examples of suitable metallic pigments include aluminum flake, copper bronze flake, and metal oxide coated mica.

Besides the metallic pigments, the basecoat compositions can contain nonmetallic color pigments conventionally used in surface coatings such as, for example, inorganic pigments such as titanium dioxide, iron oxide, chromium oxide, lead chromate, and carbon black; and organic pigments such as phthalocyanine blue and phthalocyanine green.

Optional ingredients in the basecoat composition can comprise those which are well known in the art of formulating surface coatings and can comprise surface active agents, flow control agents, thixotropic agents, fillers, anti-gassing agents, organic co-solvents, catalysts, and other customary auxiliaries. Nonlimiting examples of these materials and suitable amounts are described in U.S. Pat. Nos. 4,220,679; 4,403,003; 4,147,769; and 5,071,904, which patents are incorporated herein by reference.

The basecoat compositions can be applied to the substrate by any conventional coating technique such as brushing, spraying, dipping, or flowing. Spray techniques and equipment for air spraying, airless spray, and electrostatic spraying in either manual or automatic methods, known in the art can be used.

During application of the basecoat to the substrate, the film thickness of the basecoat formed on the substrate can range from 0.1 to 5 mils. In another embodiment, the film thickness of the basecoat formed on the substrate can range 0.1 to 1 mils, and can be 0.4 mils.

After forming a film of the basecoat on the substrate, the basecoat can be cured or alternatively given a drying step in which solvent is driven out of the basecoat film by heating or an air drying period before application of the clearcoat. Suitable drying conditions may depend on the particular basecoat composition, and on the ambient humidity if the composition is water-borne, but a drying time from 1 to 15 minutes at a temperature of 75° to 200° F. (21° to 93° C.) can be adequate.

The transparent or clear topcoat composition can be applied to the basecoat by any conventional coating technique, including, but not limited to, compressed air spraying, electrostatic spraying, and either manual or automatic methods. The transparent topcoat can be applied to a cured or to a dried basecoat before the basecoat has been cured. In the latter instance, the two coatings can then be heated to cure both coating layers simultaneously. Typical curing conditions can range from 50° F. to 475° F. (10° C. to 246° F.) for 1 to 30 minutes. The clearcoating thickness (dry film thickness) can be 1 to 6 mils.

A second topcoat coating composition can be applied to the first topcoat to form a "clear-on-clear" topcoat. The first topcoat coating composition can be applied over the basecoat as described above. The second topcoat coating composition can be applied to a cured or to a dried first topcoat before the basecoat and first topcoat have been cured. The basecoat, the first topcoat and the second topcoat can then be heated to cure the three coatings simultaneously.

It should be understood that the second transparent topcoat and the first transparent topcoat coating compositions can be the same or different provided that, when applied wet-on-wet, one topcoat does not substantially interfere with the curing of the other for example by inhibiting solvent/water evaporation from a lower layer. Moreover, the first topcoat, the second topcoat or both can be the curable coating composition of the present invention. Alternatively, only one of the first topcoat and the second topcoat is formed from the curable coating composition of the present invention.

In this instance, the topcoat that does not comprise the curable coating composition of the present invention can include any of the crosslinkable coating compositions comprising at least one thermosettable coating material and at least one curing agent. Suitable waterborne clearcoats for this purpose are disclosed in U.S. Pat. No. 5,098,947 (incorporated by reference herein) and are based on water-soluble acrylic resins. Useful solvent borne clearcoats are disclosed in U.S. Pat. Nos. 5,196,485 and 5,814,410 (incorporated by reference herein) and include polyepoxides and polyacid curing agents. Suitable powder clearcoats for this purpose are described in U.S. Pat. No. 5,663,240 (incorporated by reference herein) and include epoxy functional acrylic copolymers and polycarboxylic acid curing agents.

Typically, after forming the first topcoat over the basecoat, the first topcoat is given a drying step in which solvent is driven out of the film by heating or, alternatively, an air drying period or curing step before application of the second topcoat. Suitable drying conditions will depend on the particular first topcoat composition, and on the ambient humidity if the composition is water-borne, but, in general, a drying time from 1 to 15 minutes at a temperature of 75° F. to 200° F. (21° C. to 93° C.) will be adequate.

The film-forming composition of the present invention when employed as a second topcoat coating composition can be applied as described above for the first topcoat by any conventional coating application technique. Curing conditions can be those described above for the topcoat. The second topcoating dry film thickness can range from 0.1 to 3 mils (7.5 micrometers to 75 micrometers).

It should be mentioned that the coating compositions of the present invention can be advantageously formulated as a "monocoat", that is a coating which forms essentially one coating layer when applied to a substrate. The monocoat coating composition can be pigmented. Nonlimiting examples of suitable pigments include those mentioned above. When employed as a monocoat, the coating compositions of the present invention can be applied (by any of the conventional application techniques discussed above) in two or more successive coats, and, in certain instances can be applied with only an ambient flash period between coats. The multi-coats when cured can form essentially one coating layer.

In one embodiment, the present invention is directed to a method of repairing a multi-layer composite coating comprising a base coat formed on a substrate from a film-forming base coating composition and a first top coat deposited over at least a portion of the base coat, the first top coat formed from a first film-forming top coating composition comprising any of the foregoing coating compositions, the method comprising locating an area of the composite coating which is flawed, and applying a repair top coat film-forming composition to the flawed area after the flawed area has been prepared for repairing. The repair topcoat film-forming composition can comprise a film-forming composition which is the same or different from the first topcoat film-forming composition. The flawed area can be any coating blemish that cannot be polished out, for example dirt particles in the coating surface. The flawed area typically can be abraded or sanded to remove such coating blemishes. In a repair carried out in accordance with the method of the present invention, the first top coating can provide excellent intercoat adhesion with the subsequently applied repair top coating.

The coating compositions of the present invention can provide cured coatings having excellent intercoat or interlayer adhesion to subsequently applied coating layers. For example, any of the aforementioned substantially pigment-free coating compositions can be applied as a transparent clearcoat in a color-plus-clear coating system as discussed above. In the event of damage to the cured coating system causing a surface defect, it may be necessary to prepare the damaged area for repair with a subsequently applied clear coat composition. The coating compositions of the present invention can provide excellent intercoat adhesion between the first clear coat layer and the subsequently applied repair clear coat layer. Likewise, when used as a top coat composition, the coating compositions of the present invention also provide excellent interlayer adhesion between the cured top coat and a subsequently applied windshield adhesive without the intervening step of applying an adhesion promoting primer.

Illustrating the invention are the following examples that are not to be considered as limiting the invention to their details. All parts and percentages in the examples, as well as throughout the specification, are by weight unless otherwise indicated.

Examples

Example AA describes the preparation of a polysiloxane polyol. Examples BB and CC describe the preparation of a carbamate functional acrylic resin and a carbamate functional polyester resin, respectively. Examples A through J describe the preparation of various adhesion promoters used in the compositions of the present invention. Coating composition Examples 1 through 9 describe the preparation of one-component clearcoating compositions. Examples 10 through 13 describe the preparation of clearcoating compositions based on epoxy-containing acrylic resins in conjunction with acid functional curing agents. Examples 14 through 23 describe the preparation of two-component clearcoating compositions. Examples 24 and 25 describe the preparation of basecoating compositions. Examples 26 through 30 describe the preparation of clearcoating compositions based on carbamate group-containing resins, and Examples 31 through 33 describe the preparation of powder clearcoating compositions.

Resin Compositions Example AA

Polysiloxane Polyol

This example describes the preparation of a polysiloxane polyol which was subsequently used to form respective silica dispersions of Examples A and B, and the adhesion promoters used in the thermosetting compositions of the present invention. The polysiloxane polyol was a product of the hydrosilylation of a reactive silicone fluid having an approximate degree of polymerization of 3 to 7, i.e., (Si—O)$_3$ to (Si—O)$_7$. The polysiloxane polyol was prepared from a proportionately scaled-up batch of the following mixture of ingredients in the ratios indicated:

| Ingredients | Equivalent Weight | Equivalents | Parts By Weight (kilograms) |
|---|---|---|---|
| Charge I: | | | |
| Trimethylolpropane monoallyl ether | 174.0 | 756.0 | 131.54 |
| Charge II: | | | |
| MASILWAX BASE[1] | 156.7[2] | 594.8 | 93.21 |
| Charge III: | | | |
| Chloroplatinic acid | | 10 ppm | |
| Toluene | | | 0.23 |
| Isopropanol | | | 0.07 |

[1]Polysiloxane-containing silicon hydride, commercially available from BASF Corporation.
[2]Equivalent weight based on mercuric bichloride determination.

To a suitable reaction vessel equipped with a means for maintaining a nitrogen blanket, Charge I and an amount of sodium acetate equivalent to 20 to 25 ppm of total monomer solids was added at ambient conditions and the temperature was gradually increased to 75° C. under a nitrogen blanket. At that temperature, about 5.0% of Charge II was added under agitation, followed by the addition of Charge III, equivalent to 10 ppm of active platinum based on total monomer solids. The reaction was then allowed to exotherm to 95° C. at which time the remainder of Charge II was added at a rate such that the temperature did not exceed 95° C. After completion of this addition, the reaction temperature was maintained at 95° C. and monitored by infrared spectroscopy for disappearance of the silicon hydride absorption band (Si—H, 2150 cm$^{-1}$).

Example BB

Carbamate Functionalacrlic Polymer

This example describes the preparation of a carbamate functional acrylic used in the clearcoating compositions of Examples 26–30 described below. The polymer was prepared from the following ingredients:

| Ingredient | Weight in Parts |
|---|---|
| Acrylic polymer[1] | 1614.4 |
| Methyl carbamate | 240.3 |
| Butyl stannoic acid | 3.05 |
| Triphenyl phosphite | 3.05 |

[1]Prepared from hydroxypropyl acrylate, butyl methacrylate and alpha methyl styrene dimer, 90% solids in DOWANOL ® PM.

A suitable reactor equipped with a thermocouple, overhead stirrer, nitrogen inlet and a reflux condenser was charged with the above ingredients. The reaction mixture was heated to a temperature of 145° C. under a nitrogen blanket. At this temperature, reflux was observed. The reaction mixture was held at reflux for one hour. After the hold period was complete, the reflux condenser was removed, and the reactor equipped for distillation (short column, still head, thermocouple, and receiver) at atmospheric pressure. Distillate began to come over at 139° C. The temperature of the reaction was gradually raised to 151° C. to maintain a steady rate of distillation. At this point, 87 parts of distillate had been collected. The reaction mixture was then cooled to 140° C. and equipped for simple vacuum distillation (still head, vacuum adapter, receiver flask). Distillation was resumed under reduced pressure; the pressure inside the reactor was gradually reduced to maintain distillation until a reactor pressure of 60-mm Hg was attained. When the distillation was essentially stopped, the reaction mixture was sampled and the hydroxyl value found to be 36. The additional distillate collected totaled 158 parts. The contents of the reactor were then diluted with 410 parts of ethyl 3-ethoxypropionate and 410 parts DOWANOL PM. The final resin solution was found to have solids content of 64.5%, determined at 110° C. for one hour.

The weight average molecular weight was about 10,400 and the number average molecular weight was about 2,900, as determined by gel permeation chromatography using a polystyrene standard.

Example CC

Carbamate Funtional Polyester

This example describes the preparation of a carbamate-functional polyester resin used in the carbamate containing clearcoating compositions of the present invention. The carbamate functional polyester resin was prepared from the following ingredients:

| Ingredient | Weight in Parts |
|---|---|
| Polyester[1] | 6916.4 |
| Methyl carbamate | 1081.4 |
| Butyl stannoic acid | 14.4 |
| Triphenyl phosphite | 14.4 |
| DOWANOL PM | 1297.7 |

[1]Polyester polymer prepared from 2,2,4-trimethyl-1,3-pentanediol/ trimethylol propane/neopentyl glycol/hexahydrophthalic anhydride in a 22.7:10.6:17.5:49.2 weight ratio, 100% solids.

A suitable reactor was charged with the above ingredients and equipped with a thermocouple, overhead stirrer, nitrogen inlet and a reflux condenser. The mixture was heated to a temperature of 141° C. under a nitrogen blanket. At this temperature reflux was observed. The reaction mixture was held at reflux for one hour. After the hold period was complete, the reflux condenser was removed, and the reactor equipped for distillation (short column, still head, thermocouple, and receiver) at atmospheric pressure. Distillate began to come over at 132° C. The temperature of the reaction was gradually raised to 151° C. to maintain a steady rate of distillation. At this point 422 parts of distillate had been collected. The reaction mixture was then cooled to 145° C. and equipped for simple vacuum distillation (still head, vacuum adapter, receiver flask). Distillation was resumed under reduced pressure; the pressure inside the reactor was gradually reduced to maintain distillation until a reactor pressure of 60-mm Hg was attained. When the distillation was essentially stopped, the reaction mixture was sampled and the hydroxyl value found to be acceptable (32.6). The additional distillate collected totaled 1007 parts. The contents of the reactor were cooled and then diluted with 1295 parts of DOWANOL PM and 1648 parts of DOWANOL PM Acetate. The final resin solution was found to have a solids content of 69.5%, determined at 110° C. for one hour, a weight average molecular weight of about 2,500 and a number average molecular weight of about 1,200, as determined by gel permeation chromatography using a polystyrene standard.

Silica Dispersions

Example A

This example describes the preparation of a colloidal silica dispersion used as a component in the thermosetting compositions of the present invention. The colloidal silica dispersion was prepared as follows. A suitable reaction vessel was equipped for vacuum distillation and flushed with $N_2$. To the reaction flask was added 3150 of the polysiloxane polyol of Example AA described above, 4500 of ORGANOSILICASOL™ MT-ST colloidal silica (which is commercially available from Nissan Chemicals) and 1440 of methyl amyl ketone. The mean particle size of the silica particles was about 10–20 nanometers, as disclosed at http//www.snowtex.com/organo types.html (Jun. 2, 2000), which is incorporated by reference herein. The resulting mixture was vacuum distilled at 25° C. for a period of 8 hours.

Example B

This example describes the preparation of a colloidal silica dispersion used as a component in the thermosetting compositions of the present invention. The colloidal silica dispersion was prepared as follows. A 4-neck reaction flask equipped for vacuum distillation was flushed with $N_2$. To the reaction flask was added 1501.4 of the polysiloxane tetrol described above, 3752.9 of ORGANOSILICASOL™ MT-ST colloidal silica (which is commercially available from Nissan Chemicals) and 900.6 of methyl amyl ketone. The resulting mixture was vacuum distilled at 70 mm Hg and 31° C.

Adhesion Promoter Compositions

The following Examples C through H describe the preparation of various adhesion promoting compositions used in the coating compositions of the present invention. Each adhesion promoting composition was prepared as described below.

Example C

A four-neck reaction flask equipped with stirrer, temperature probe, Dean Stark trap and reflux condenser was flushed with N2. The following materials were charged to the flask and blended under agitation: 180.4 of the polysilxoane polyol of Example AA, 300.9 of isopropyl alcohol and 25.8 g of boric acid. The mixture was heated to reflux at a temperature of 79° C., and 200 ml of solvent was removed over 0.25 hours. The resulting material was cooled and measured to have 49.8% solids and contained 3.0% water.

Example D

A four-neck reaction flask equipped with stirrer, temperature probe, Dean Stark trap and reflux condenser was flushed with $N_2$. The following materials were charged to the flask and blended under agitaion: 3241.4 of the polysiloxane polyol of Example AA, 5415.3 of isopropyl alcohol and 463.9 of boric acid. The mixture was heated to reflux at a temperature of 73° C., and 3607.7 of solvent was removed over a period of 1.5 hours. The resulting material was cooled and measured to have 56.0% solids and contained 2.5% water.

Example E

A four-neck reaction flask equipped with stirrer, temperature probe, Dean Stark trap and reflux condenser was flushed with $N_2$. The following materials were charged to the flask and blended under agitation: 180.3 of polysiloxane polyol of Example AA, 300.7 of isopropyl alcohol and 25.8 of boric acid. The mixture was heated to reflux at a temperature 79° C., and 200 ml of solvent was removed over a period of 0.25 hours. The resulting material was cooled and measured to have 49.5% solids and contained 3.0% water.

Example F

A four-neck reaction flask equipped with stirrer, temperature probe, Dean Stark trap and reflux condenser was flushed with $N_2$. The following materials were charged to the flask and blended under agitation: 1575.5 Dowanol PM, and 144.8 of boric acid. The mixture was heated to reflux at a temperature of 110° C., and held for a period of 2 hours. Thereafter, 632.3 of solvent was removed over a period of 0.5 hours. The resulting material was cooled and measured to have 11.2% solids and contained 5.0% water.

Example G

A four-neck reaction flask equipped with stirrer, temperature probe, Dean Stark trap and reflux condenser was flushed with $N_2$. The following ingredients were charged to the flask and blended under agitation: 454.7 of acrylic polyol (prepared from 14.5% butyl acrylate, 14.5% butyl methacrylate, 27.6% isobornyl methacrylate, 22.6% hydroxypropyl methacrylate, 20.4% hydroxyethyl methacrylate, and 0.4% acrylic acid, having a resin solids of 69.7%, Mw 3227 and hydroxyl value of 101), 97.2 of isopropyl alcohol and 2.06 of boric acid. The mixture was heated to reflux at a temperature of 93° C., and held for a period of 1 hour. Thereafter, 62 of solvent was removed over a period of 0.25 hours. The resulting material was cooled and measured 69.3% solids and contained 0.1% water.

Example H

A four-neck reaction flask equipped with stirrer, temperature probe, Dean Stark trap and reflux condenser was flushed with $N_2$. The following materials were charged to the flask and blended under agitation: 360.5 of the polysiloxane polyol of Example AA, 601.7 of isopropyl alcohol and 13.6 g of aluminum isopropoxide (available from Aldrich Chemical Co.). The mixture was heated to reflux at a temperature of 81 ° C., and, thereafter, 401.8 g of solvent was removed over a period of 1 hour. The resulting material was cooled and measured to have 53.32% solids Example I A four-neck reaction flask equipped with stirrer, temperature probe, Dean Stark trap and reflux condenser was flushed with $N_2$. The following materials were charged to the flask and blended under agitation: 3242.1 of the polysiloxane polyol of Example AA, 5411.2 of isopropyl alcohol and 463.9 of boric acid. The mixture was heated to reflux at a temperature of 72° C., and 3674.3 of solvent was removed over a period of 2 hours. The resulting material was cooled and measured 56.13% solids and contained 2.5% water.

Thermosetting Coating Compositions One Componet Clearcoating Compositions

Example 1

This example describes the preparation of a resinous binder pre-mix used in the one-package thermosetting coating compositions of Examples 4–6 below. Each of the ingredients was added sequentially and mixed under mild agitation.

| Ingredient | Parts by weight (grams) | Solid weight (grams) |
| --- | --- | --- |
| Methyl n-amyl ketone | 18.0 | — |
| Butyl Cellosolve ® acetate[1] | 18.0 | — |
| Butyl Carbitol ® acetate[2] | 4.0 | — |
| TINUVIN ® 384[3] | 1.58 | 1.50 |
| TINUVIN ® 400[4] | 1.76 | 1.50 |
| TINUVIN ® 292[5] | 0.40 | 0.40 |
| TINUVIN ® 123[6] | 0.40 | 0.40 |
| Silica dispersion of Example A | 13.2 | 10.0 |
| LUWIPAL 018[7] | 41.1 | 30.0 |
| TACT[8] | 9.4 | 5.0 |
| Polybutyl acrylate[9] | 0.50 | 0.30 |
| Blocked acid catalyst[10] | 2.50 | 1.00 |

[1]2-Butoxyethyl acetate solvent commercially available from Union Carbide Corp.
[2]2-(2-Butoxyethoxy) ethyl acetate commercially available from Union Carbide Corp.
[3]Substituted benzotriazole UV light stabilizer commercially available from Ciba Specialty Chemicals Corp.
[4]Substituted triazine UV light stabilizer commercially available from Ciba Specialty Chemicals Corp.
[5]Sterically hindered amine light stabilizer commercially available from Ciba Specialty Chemicals Corp.
[6]Bis-(1-octyloxy-2,2,6,6-tetramethyl-4-piperidinyl) sebacate hindered aminoether light stabilizer available from Ciba Specialty Chemicals Corp.
[7]High imino, butylated melamine formaldehyde resin commercially available from BASF Corp.
[8]Tris (alkyl carbamoyl) triazine available from Cytec Industries, Inc. The alkyl substituent was mixed methyl and butyl.
[9]A flow control agent having a Mw of about 6700 and a Mn of about 2600 made in xylene at 62.5% solids available from E.I. duPont de Nemours and Company.
[10]Dodecyl benzene sulfonic acid solution, blocked with diisopropanol amine to 91% total neutralization, 40 percent in ethanol.

Example 2

This example describes the preparation of a resinous binder pre-mix used in the one-package thermosetting coating composition of Examples 7–9 described below. Each of the ingredients was added sequentally and mixed under mild agitation.

| Ingredient | Parts by weight (grams) | Solid weight (grams) |
|---|---|---|
| Methyl n-amyl ketone | 16.0 | — |
| Butyl Cellosolve ® acetate | 16.0 | — |
| Butyl Carbitol ® acetate | 3.50 | — |
| TINUVIN ® 928[1] | 3.00 | 3.00 |
| TINUVIN ® 292 | 0.40 | 0.40 |
| Silica Dispersion of Example B | 10.3 | 7.0 |
| RESIMENE ® 757[2] | 41.2 | 40.0 |
| Polybutyl acrylate | 0.50 | 0.30 |
| Blocked acid catalyst | 2.50 | 1.00 |

[1]2-(2H-Benzotriazol-2yl)-6-(1-methyl-1-phenylethyl)-4-(1,1,3,3-tetramethylbutyl)phenol UV absorber available from Ciba Specialty Chemicals Corp.
[2]Methylated and butylated melamine-formaldehyde resin available from Cytec Industries, Inc.

Example 3

This example describes the preparation of a resinous binder pre-mix used in the preparation of thermosetting coating compositions of Examples 7–9 described below. The resins were admixed and blended under mild agitation.

| Ingredient | Parts by weight (grams) | Solid weight (grams) |
|---|---|---|
| Carbamoylated acrylic[1] | 44.4 | 28.0 |
| Carbamoylated polyester[2] | 38.9 | 28.0 |

[1](58% butyl methacrylate/40% hydroxypropyl acrylate/2% methyl styrene dimer) 64% solids in a solvent blend of (50% DOWANOL PM/50% propanoic acid, 3-ethoxy ethyl ester), 75% carbamoylated with methyl carbamate.
[2](10.6% trimethylol propane/22.7% 2,2,4-trimethyl-1,3-pentanediol/17.5% neopentyl glycol/49.2% hexahydrophthalic anhydride) 69% solids in a solvent blend of (44% Dowanol PM/56% Dowanol PM Acetate) 75% carbamoylated with methyl carbamate.

The preparation of various one-package thermosetting coating 15 compositions are described below in the following Tables 1 and 2. The amounts listed are the total parts by weight in grams and the amount within parenthesis are percentages by weight based on weight of solids. Each component was mixed sequentally with agitation. Comparative coating compositions which do not contain a boron-containing compound are indicated using an "*".

TABLE 1

| Ingredient | Example 4* | Example 5 | Example 6 |
|---|---|---|---|
| Example 1 pre-mix | 110.8 (50.1) | 110.8 (50.1) | 110.8 (50.1) |
| Acrylic resin[1] | 89.9 (58.0) | 88.4 (57.0) | 83.7 (54.0) |
| Siloxane Borate of Example C | — | 2.01 (1.00) | 8.0 (4.00) |
| Reduction: | | | |
| Methyl n-amyl ketone | 5.4 | 4.79 | 3.07 |
| Butyl Cellosolve ® acetate | 5.4 | 4.79 | 3.07 |
| Butyl Carbitol ® acetate | 1.2 | 1.06 | 0.68 |
| Spray viscosity[2] (sec) | 28.4 | 28.2 | 28.1 |

TABLE 1-continued

| Ingredient | Example 4* | Example 5 | Example 6 |
|---|---|---|---|
| Paint temperature (° F.) | 73.3 | 73.5 | 73.1 |
| Theory % Solids[3] | 50.8 | 51.0 | 51.6 |

[1]Acrylic resin (30% styrene, 19.9% hydroxyethyl methacrylate, 28.7% CarduraE (available from Shell Chemical Co.), 9.5% acrylic acid, and 12% ethylhexyl acrylate) at 65% solids in SOLVESSO 100 (available from Exxon Chemicals America), prepared in Example A of U.S. Pat. No. 5,965,670.
[2]Viscosity measured in seconds with a #4 FORD efflux cup at ambient temperature.
[3]Theory % Solids of a coating is determined by taking the solid weight of the coating formulation divided by the sum of the parts by weight of the coating formulation and the reducing solvent weight

TABLE 2

| Ingredient | Example 7* | Example 8 | Example 9 |
|---|---|---|---|
| Example 2 pre-mix | 93.4 (51.7) | 93.4 (51.7) | 93.4 (51.7) |
| Example 3 pre-mix | 83.3 (56.0) | 81.8 (55.0) | 77.4 (52.0) |
| Siloxane Borate of Example D | — | 1.79 (1.00) | 7.1 (4.00) |
| Methyl n-amyl ketone | 2.00 | — | — |
| Butyl Cellosolve ® acetate | 2.00 | — | — |
| Butyl Carbitol ® acetate | 0.50 | — | — |
| Reduction Information: | | | |
| Methyl n-amyl ketone | 3.03 | 4.7 | 3.83 |
| Butyl Cellosolve ® acetate | 3.03 | 4.7 | 3.83 |
| Butyl Carbitol ® acetate | 0.67 | 1.04 | 0.85 |
| Spray viscosity[1] (sec) | 28.4 | 28.7 | 28.1 |
| Paint temperature (° F.) | 72.4 | 72.3 | 72.0 |
| Theory % Solids[2] | 57.3 | 57.5 | 57.8 |

[1]Viscosity measured in seconds with a #4 FORD efflux cup at ambient temperature.
[2]Theory % Solids of a coating is determined by taking the solid weight of the coating formulation divided by the sum of the parts by weight of the coating formulation and the reducing solvent weight.

Testing

The film forming compositions of Examples 4–9 were spray applied to a pigmented basecoat to form color-plus-clear composite coatings over primed electrocoated steel panels. The panels used were cold rolled steel panels (size 4 inches×12 inches (10.16 cm by 30.48 cm)). The steel panels for Examples 4–6 were coated with ED5000 electrocoat, available from PPG Industries, Inc, and SUPERMAR primer, available from Herberts/DuPont. The ED5000 electrocoat test panels are available as APR22986 from ACT 10 Laboratories, Inc. of Hillsdale, Mich. Examples 7–9 utilized steel panels that were coated with ED5240 electrocoat and FCP6579 primer, both available from PPG Industries, Inc. The test panels are available as APR40017 from ACT Laboratories, Inc. of Hillsdale, Mich.

The basecoat used for Examples 4–6 was Nero Vulcano UR806/A, black pigmented solvent-based acrylic/melamine basecoat, available from PPG Industries, Inc. Examples 7–9 used ODCT6373 Ebony Black, a black pigmented solvent-based acrylic/melamine basecoat, available from PPG Industries, Inc.

The Nero Vulcano UR806/A basecoat was automated spray applied in one coat to the electrocoated and primed steel panels at ambient temperature (about 70° F. (21 ° C.)). A dry film thickness of about 0.5 to 0.7 mils (about 13 to 18 micrometers) was targeted. After the basecoat application, a ninety second air flash at ambient temperature was given before applying the clearcoat. The ODCT6373 Ebony Black basecoat was automated spray applied in two coats to the electrocoated and primed steel panels at ambient temperature (about 70° F. (21° C.)). A ninety second air flash at ambient temperature was given between the two basecoat applications. A dry film thickness of about 0.6 to 0.8 mils (about 15 to 20 micrometers) was targeted. After the second basecoat application, a ninety second air flash at ambient temperature was given before applying the clearcoat.

The clear coating compositions of Examples 4–9 were each automated spray applied to a basecoated panel at ambient temperature in two coats with a ninety second ambient flash between applications. Examples 4–6 were targeted for a 1.5 to 1.7 mils (about 38 to 43 micrometers) dry film thickness, and Examples 7–9 were targeted for a 1.7 to 1.9 mils (about 43 to 48 micrometers) dry film thickness. All coatings were allowed to air flash at ambient temperature for ten minutes. Panels prepared from each coating were baked for thirty minutes at 285° F. (141° C.) to fully cure the coating(s). The panels were baked in a horizontal position.

To test for recoat adhesion, an original basecoated and clearcoated panel, as described above, was given another layer of basecoat and clearcoat or clearcoat only. Examples 4–6 were recoated with Nero Vulcano UR806/A and Examples 4–6, depending on the respective original panel. Examples 7–9 were recoated with ODCT6373 Ebony Black and Examples 7–9, depending on the respective original panel. For example, an Example 4 clearcoat over Nero Vulcano UR806/A original (prepared above) was recoated with Nero Vulcano UR806/A and Example 4 clearcoat. Half of an original panel from each clear coating was basecoated and clearcoated and the other half of the panel was clearcoated only. To recoat the panels half and half, the bottom halves of the original panels were covered with aluminum foil and then the respective basecoats were automated spray applied as described above. The foil was removed, resulting in an original panel with the upper half coated in basecoat and the bottom half still with only the original coating layers. The respective clearcoat was then automated spray applied to the entire panel as described above. The resulting panels were half coated in basecoat/clearcoat from the original spray application and another layer of basecoat/clearcoat from the recoat spray application (B/C//B/C). The other half of the resulting panel was coated in basecoat/ clearcoat from the original spray application and another layer of clearcoat from the recoat spray application (B/C//C).

Test results for the coatings are reported below in Table 3. As mentioned above the coating compositions of Examples 4–6 were applied over Nero Vulcano UR806/A basecoat and Examples 7–9 were applied over ODCT6373 Ebony Black basecoat.

TABLE 3

| Example # | Adhesion Promoter (B) Elemental Weight % on Resin Solids | 20° Gloss[1] | Recoat Adhesion[2] B/C//B/C | B/C//C | Windshield Adhesion[3] (% cohesive failure) |
|---|---|---|---|---|---|
| 4* | 0 | 91 | 0 td | 0 td | — |
| 5 | 0.02 | 91 | 2/3 | 0 | — |
| 6 | 0.08 | 91 | 4+ | 4 | — |
| 7* | 0 | 86 | 2+ | 0 | 0 |
| 8 | 0.02 | 86 | 5− | 3+ | 100 |
| 9 | 0.08 | 84 | 5 | 5 | 100 |

[1] 20° gloss was measured with a Statistical Novo-Gloss 20° gloss meter, available from Paul N. Gardner Company, Inc.
[2] Recoat adhesion tests the adhesion of the recoat layer (either basecoat/clearcoat or clearcoat only) to the original layers (steel/electrodeposition/primer/basecoat/clearcoat). A multi-blade claw with 2.0 mm spaced teeth (blade and handle/blade holder are available from Paul N. Gardner Company, Inc.) was used to scribe the cured coating. Two sets of scribes were made by scribing the second set on top of and perpendicular to the first set. Detached flakes and ribbons of coating were wiped off the panel and strapping tape (3M #898 available from Minnesota, Mining and Manufacturing Co. - 3M) was smoothed firmly over the crosshatch marking. Within 90 seconds of application, the tape was removed in one continuous motion directed toward the tester and as parallel to the panel as possible. The scribed area was inspected and rated for removal of the recoat layer to the substrate according to the following scale:
5 = The edges of the cuts are completely smooth and none of the lattice squares is detached.
4 = Small flakes of coating are detached at intersections. Less than five percent of the area is affected.
3 = Small flakes of the coating are detached along edges and at intersections of cuts. The area affected is five to fifteen percent of the lattice.
2 = The coating has flaked along the edges and on parts of the squares. The area affected is fifteen to thirty-five percent of the lattice.
1 = The coating has flaked along the edges of cuts in large ribbons and whole squares have detached. The area affected is thirty-five to sixty-five percent of the lattice.
0 = Flaking and detachment worse than rating 1. Over sixty-five percent of the lattice is affected.
Td = Total delamination,
[3] The adhesion between a coating and a windshield adhesive used in the automotive industry was determined using the Quick Knife test. Within 1 to 4 hours of the final thirty minute bake cycle, a bead of the BETASEAL 15625 urethane adhesive (Supplied by Essex Specialty Products Inc.) was applied to the surface of the clearcoat of a basecoated and clearcoated panel, prepared as described above. The plastic nozzle (supplied with adhesive) was prepared for the urethane by cutting the tip at ~80° angle. The opening measured approximately 5 mm in diameter. On the long end of the cut edge, a notch approximately 5 mm wide by 2 mm high was cut. The tube of urethane was placed in a battery powered caulking gun and a small amount was squeezed from the tube into a paper cup for disposal. The caulking gun was set at ~90% speed for a steady flow of adhesive. The plastic tip was placed on the panel with the notch facing away from the person applying the bead. With the tip held firmly on the panel at the same angle (80°) as the cut nozzle, a steady bead was applied down the length of the panel. The bead was flat where it contacted the panel. After the bead was laid, the panel was placed in a ventilated hood where it remained undisturbed for at least 72 hours @ 20–50% R.H. in order to cure. After the bead cured, the adhesive bead was cut with a razor blade knife. A small section was cut at the beginning of the bead to make it easier to grasp. To cut the bead, the small beginning section was pulled back at approximately a 180° angle and slices were made in the adhesive at a 60° to 80° angle in a quick motion. The blade was kept in contact with the clearcoat at all times during. The adhesive bead continued to be pulled while the adhesive was being cut at ~½" intervals. A minimum of 10 cuts was made. After making slices to the adhesive bead, the panel was rated for % Cohesive Failure (% C.F.) of the bead to the panel. (Cohesive Failure occurs when the integrity of the adhesive bead is lost as a result of cutting and pulling rather than the bond between the adhesive bead and the clearcoat surface.) Failures were reported as a total % along the bead. For example, if there was 20% of the urethane remaining on the panel, then it was reported as 20% C.F. and if the entire bead can be pulled off, it was considered to be 0% C.F. The desired result was a minimum of 90% or higher cohesion.

The data presented above in Table 3 illustrate that recoat adhesion for the one-package coating compositions of the present invention improves as the amount of adhesion promoting composition increases in the composition, while similar comparative compositions which do not contain the polysiloxane borate have poor or no recoat adhesion. Further, the data illustrate that while the comparative composition of Example 7 exhibits very poor (0%) MVSS cohesive failure, the compositions of the present invention (Examples 8 and 9) exhibit excellent (100%) cohesive failure.

Examples 10 Through 13

The following Examples 10 through 13 presented in Table 4 below describe the preparation of thermosetting coating compositions based on epoxy containing acrylic resins cured with acid functional curing agents in combination with aminoplast resins. The compositions were prepared by admixing the following ingredients under mild agitation. Note, those comparative compositions which do not contain a boron-containing compound (i.e., Comparative Examples 10 and 13) are designated with an "*"

TABLE 4

| Materials | Example 10* Solids Resin + Additive | Soln. Wt. | Example 11 Solids Resin + Additive | Soln. Wt. | Example 12 Solids Resin + Additive | Soln. Wt. | Example 13* Solids Resin + Additive | Soln. Wt. |
|---|---|---|---|---|---|---|---|---|
| n-pentyl propionate[1] | — | 25 | — | 25 | — | 25 | — | 15 |
| DOWANOL ® DPM[2] | — | — | — | — | — | — | — | 11.2 |
| TINUVIN ® -328[3] | 3 | 3 | 3 | 3 | 3 | 3 | 2.7 | 2.7 |
| Colloidal silica dispersion of Example A | | 10.5 | | 10.5 | | 10.5 | — | — |
| 60% GMA resin[4] | 42.9 | 67 | 39.05 | 61 | 37.05 | 58 | — | — |
| 50% GMA resin[5] | — | — | — | — | — | — | 56.25 | 87.9 |
| Primary amyl alcohol[6] | — | — | — | — | — | — | — | 4.1 |
| CYMEL 202[7] | 3 | 3.8 | 3 | 3.8 | 3 | 3.8 | 2.05 | 2.6 |
| CYLINK ® 2000[8] | 10 | 20 | 10 | 20 | 10 | 20 | — | — |
| Fumed silica dispersion[9] | — | — | — | — | — | — | — | 12.9 |
| Isostearic Acid[10] | 4 | 4 | 4 | 4 | 4 | 4 | 4.1 | 4.1 |
| PENTEK[11] | 34.25 | 50.4 | 34.1 | 50 | 32.1 | 47.2 | 34.2 | 50.3 |
| Siloxane Borate of Example A | — | — | 4 | 8.1 | 8 | 16.2 | — | — |
| TINUVIN ® 123 | 0.4 | 0.4 | 0.4 | 0.4 | 0.4 | 0.4 | 0.35 | 0.35 |
| Polybutyl acrylate | — | — | — | — | — | — | 0.51 | 0.85 |
| DISPARLON OX-60[12] | — | — | — | — | — | — | 0.04 | 0.08 |
| Multiflow (50% sol. Of MODAFLOW)[13] | 0.025 | 0.05 | 0.025 | 0.05 | 0.025 | 0.05 | 0.09 | 0.18 |
| Di-methyl cocoamine[14] | 0.3 | 0.3 | 0.3 | 0.3 | 0.3 | 0.3 | 0.32 | 0.32 |

[1]Available from Dow Chemical Co.
[2]Dipropylene glycol monomethyl ether, available from Dow Chemical Co.
[3]2-(2'-Hydroxy-3',5'-dtert-amylphenyl) benzotriazole UV light stabilizer available from Ciba Specialty Chemicals Corp.
[4]Acrylic resin comprising 60% glycidyl methacrylate, 31% n-butyl methacrylate, 0.2% methyl methacrylate, 7% styrene, 2% diphenyl-2,4-methyl-4 pentene-1, 66% solids in dipropylene glycol monomethyl ether and n-amyl propionate.
[5]Acrylic resin comprising 50% glycidyl methacrylate, 41% n-butyl methacrylate, 0.2% methyl methacrylate, 7% styrene, 2% diphenyl-2,4-methyl-4 pentene-1, 64% solids in dipropylene glycol monomethyl ether and n-amyl propionate.
[6]Available from Dow Chemical Co.
[7]Melamine available from Cytec Industries, Inc.
[8]Available from Cytec Industries, Inc.
[9]R-812 silica from Degussa dispersed in n-amyl alcohol and a trimethylol propane/methylhexahydrophthalic anhydride half ester of Example G in U. S. Pat. No. 5,256,452.
[10]Available from Uniqema.
[11]Polyester prepared from 83% 4-methyl hexahydrophthalic anhydride and 17% pentaerythritol, 67% solids in n-propyl alcohol and n-amyl propionate.
[12]Available from Kusumoto, a King Industries distributor.
[13]Available from Solutia.
[14]Available from Albemarle Corp.

The clearcoats prepared as described above were reduced with DOWANOL ® DPM to a spray viscosity of 26 seconds at ambient temperature (approximately 76° F. (26° C.)), with a Ford #4 cup.

Testing

The film forming compositions of Examples 10–13 were spray applied to a pigmented basecoat to form color-plus-clear composite coatings over electrocoated steel panels. The panels used were cold rolled steel panels (size 4 inches×12 inches (10.16 cm by 30.48 cm)). The steel panels for Examples 10–13 were coated with ED5000 electrocoat, available from PPG Industries, Inc. These prepared test panels are available as APR23884 from ACT Laboratories, Inc. of Hillsdale, Mich.

The basecoat used for Examples 10–13 was HWB-9517, black pigmented waterborne basecoat, available from PPG Industries, Inc. The HWB-9517 basecoat was automated spray applied in one coat to the electrocoated steel panels at ambient temperature (i.e., at approximately 76° F. (25° C.) and 30% relative humidity). A dry film thickness of about 0.5 to 0.7 mils (about 13 to 18 micrometers) was targeted. The basecoat was allowed to flash ambiently for about 5minutes and then prebaked for five minutes at 200° F. (93° C.).

The clear coating compositions of Examples 10–13 were each automated spray applied to a basecoated panel at ambient temperature in two coats with a 60 second ambient flash between applications. Coatings of Examples 10–13 were targeted for a 1.8 to 2 mils (about 46 to 51 micrometers) dry film thickness. All coatings were allowed to air flash at ambient temperature for ten minutes. Panels prepared from each coating were baked for thirty minutes at 285° F. (141° C.) to fully cure the coating(s). The panels were baked in a horizontal position.

To test for recoat adhesion, an original basecoated and clearcoated panel, as described above, was given another layer of basecoat and clearcoat or clearcoat only. Examples 10–13 were recoated with HWB-9517 basecoat. To recoat the panels half and half, the right halves of the original panels were covered with masking tape and then the respective basecoats were automated spray applied as described above. The tape was removed, resulting in an original panel with the right half coated in basecoat and the left half still with only the original coating layers. The respective clearcoat was then automated spray applied to the entire panel as described above. The resulting panels were half coated in basecoat/clearcoat from the original spray application and another layer of basecoat/clearcoat from the recoat spray application (B/CH/B/C). The other half of the resulting panel was coated in basecoat/clearcoat from the original spray application and another layer of clearcoat from the recoat spray application (B/C//C). Test data is presented below in the following Table 5.

TABLE 5

| Clearcoat composition | 20° Gloss | Elemental weight % on Resin Solids | MVSS primerless adhesion % pass | Recoat Adhesion % pass B/C//B/C | Recoat Adhesion % pass B/C//C |
| --- | --- | --- | --- | --- | --- |
| Example 11 | 72 | 0.08 | data unavailable | 30 | 50 |
| Example 12 | 72 | 0.16 | 88 | 100 | 100 |
| Example 10 | 83 | 0 | 100 | 0 | 0 |
| Example 13* | 83 | 0 | 100 | 100 | 100 |

*Comparative examples

The data presented in Table 5 above illustrate that the epoxy-acid clear coat controls of Comparative Examples 10 and 13 pass MVSS primeness adhesion. However, these same the clearcoating of Example 10 exhibits very poor recoat adhesion when recoated either with a subsequently applied repair basecoat/clearcoat system or a repair clearcoat. By contrast, the coating compositions of the present invention which contain the polysiloxane borate, exhibit improved recoat adhesion and 100% recoat adhesion (see Examples 11 and 12, respectively).

Two-Component Clearcoating Compositions

Comparative Example 14

This comparative example describes the preperation of a two-component clearcoat composition which does not contain an adhesion promoting compound. The coating composition was prepared by admixing the following ingredients sequentially under mild agitation.

| Ingredient | Parts by Weight (grams) | Solid Weight (grams) |
| --- | --- | --- |
| Methyl n-amyl ketone | 30.0 | — |
| Butyl Cellosolve ® acetate | 10.0 | — |
| Butyl Carbitol ® acetate | 5.0 | — |
| Tinuvin 928 | 3.0 | 3.0 |
| Tinuvin 292 | 0.5 | 0.5 |
| Silica dispersion of Example A | 8.8 | 6.7 |
| Acrylic Resin[1] | 58.2 | 42.2 |
| CYMEL ® 202 | 18.8 | 15.0 |
| Polysiloxane polyol of Example AA | 11.0 | 11.0 |
| Phenyl Acid Phosphate Catalyst[2] | 0.7 | 0.5 |
| DesmodurN3300[4] | 27.1 | 27.1 |

[1]Acrylic polyol prepared from 14.5% butyl acrylate, 14.5% butyl methacrylate, 27.6% isobornyl methacrylate, 22.6% hydroxypropyl methacrylate, 20.4% hydroxyethyl methacrylate, and 0.4% acrylic acid, having resin solids of 69.7%, Mw 3227 and a hydroxyl value of 101.
[2]Phenyl acid phosphate solution, 75 percent in isopropanol.
[3]Isocyanurate of hexamethylene diisocyanate available from Bayer Corp.

Example 15

This example describes the preparation of a two-component clearcoat composition of the present invention which contains a siloxane borate as an adhesion promoting compound. The coating composition was prepared by admixing the following ingredients sequentially under mild agitation.

| Ingredient | Parts by Weight (grams) | Solid Weight (grams) |
| --- | --- | --- |
| Methyl n-amyl ketone | 30.0 | — |
| Butyl Cellosolve ® acetate | 10.0 | — |
| Butyl Carbitol ® acetate | 5.0 | — |
| Tinuvin 928 | 3.0 | 3.0 |
| Tinuvin 292 | 0.5 | 0.5 |
| Silica dispersion of Example A | 8.8 | 6.7 |
| Acrylic Resin of Example 14 | 58.2 | 42.2 |
| Cymel 202 | 18.8 | 15.0 |
| Polysiloxane polyol of Example AA | 10.0 | 10.0 |
| Siloxane Borate of Example E | 2.4 | 1.0 |
| Phenyl Acid Phosphate Catalyst | 0.7 | 0.5 |
| DesmodurN3300 | 27.1 | 27.1 |

Example 16

This example describes the preparation of a two-component clearcoat composition of the present invention which contains a siloxane borate as an adhesion promoting compound. The coating composition was prepared by admixing the following ingredients sequentially under mild agitation.

| Ingredient | Parts by Weight (grams) | Solid Weight (grams) |
| --- | --- | --- |
| Methyl n-amyl ketone | 30.0 | — |
| Butyl Cellosolve ® acetate | 10.0 | — |
| Butyl Carbitol ® acetate | 5.0 | — |
| Tinuvin 928 | 3.0 | 3.0 |
| Tinuvin 292 | 0.5 | 0.5 |

-continued

| Ingredient | Parts by Weight (grams) | Solid Weight (grams) |
|---|---|---|
| Silica dispersion of Example A | 8.8 | 6.7 |
| Acrylic Resin of Example 14 | 58.2 | 42.2 |
| Cymel 202 | 18.8 | 15.0 |
| Polysiloxane polyol of Example AA | 9.0 | 9.0 |
| Siloxane Borate of Example E | 4.9 | 2.0 |
| Phenyl Acid Phosphate Catalyst | 0.7 | 0.5 |
| DesmodurN3300 | 27.1 | 27.1 |

Example 17

This example describes the preparation of a two-component clearcoat composition of the present invention which contains a siloxane borate as an adhesion promoting compound. The coating composition was prepared by admixing the following ingredients sequentially under mild agitation.

| Ingredient | Parts by Weight (grams) | Solid Weight (grams) |
|---|---|---|
| Methyl n-amyl ketone | 30.0 | — |
| Butyl Cellosolve ® acetate | 10.0 | — |
| Butyl Carbitol ® acetate | 5.0 | — |
| Tinuvin 928 | 3.0 | 3.0 |
| Tinuvin 292 | 0.5 | 0.5 |
| Silica dispersion of Example A | 8.8 | 6.7 |
| Acrylic Resin of Example 14 | 58.2 | 42.2 |
| Cymel 202 | 18.8 | 15.0 |
| Polysiloxane polyol of Example AA | 7.0 | 7.0 |
| Siloxane Borate of Example E | 9.8 | 4.0 |
| Phenyl Acid Phosphate Catalyst | 0.7 | 0.5 |
| DesmodurN3300 | 27.1 | 27.1 |

Example 18

This example describes the preparation of a two-component clearcoat composition of the present invention which contains a boric acid as an adhesion promoting compound. The coating composition was prepared by admixing the following ingredients sequentially under mild agitation.

| Ingredient | Parts by Weight (grams) | Solid Weight (grams) |
|---|---|---|
| Methyl n-amyl ketone | 30.0 | — |
| Butyl Cellosolve ® acetate | 10.0 | — |
| Butyl Carbitol ® acetate | 5.0 | — |
| Tinuvin 928 | 3.0 | 3.0 |
| Tinuvin 292 | 0.5 | 0.5 |
| Silica dispersion of Example A | 8.8 | 6.7 |
| Acrylic Resin of Example 14 | 58.2 | 42.2 |
| Cymel 202 | 18.8 | 15.0 |
| Polysiloxane polyol of Example AA | 11.0 | 11.0 |
| Boric acid (20% solution in methanol) | 1.3 | 0.3 |
| Phenyl Acid Phosphate Catalyst | 0.7 | 0.5 |
| DesmodurN3300 | 27.1 | 27.1 |

Example 19

This example describes the preparation of a two-component clearcoat composition of the present invention which contains a boric acid as an adhesion promoting compound. The coating composition was prepared by admixing the following ingredients sequentially under mild agitation.

| Ingredient | Parts by Weight (grams) | Solid Weight (grams) |
|---|---|---|
| Methyl n-amyl ketone | 30.0 | — |
| Butyl Cellosolve ® acetate | 10.0 | — |
| Butyl Carbitol ® acetate | 5.0 | — |
| Tinuvin 928 | 3.0 | 3.0 |
| Tinuvin 292 | 0.5 | 0.5 |
| Silica dispersion of Example A | 8.8 | 6.7 |
| Acrylic Resin of Example 14 | 58.2 | 42.2 |
| Cymel 202 | 18.8 | 15.0 |
| Polysiloxane polyol of Example AA | 11.0 | 11.0 |
| Boric acid (20% solution in methanol) | 5.0 | 1.0 |
| Phenyl Acid Phosphate Catalyst | 0.7 | 0.5 |
| DesmodurN3300 | 27.1 | 27.1 |

Example 20

This example describes the preparation of a two-component clearcoat composition of the present invention which contains triisopropyl borate as an adhesion promoting compound. The coating composition was prepared by admixing the following ingredients sequentially under mild agitation.

| Ingredient | Parts by Weight (grams) | Solid Weight (grams) |
|---|---|---|
| Methyl n-amyl ketone | 30.0 | — |
| Butyl Cellosolve ® acetate | 10.0 | — |
| Butyl Carbitol ® acetate | 5.0 | — |
| Tinuvin 928 | 3.0 | 3.0 |
| Tinuvin 292 | 0.5 | 0.5 |
| Silica dispersion of Example A | 8.8 | 6.7 |
| Acrylic Resin of Example 14 | 58.2 | 42.2 |
| Cymel 202 | 18.8 | 15.0 |
| Polysiloxane polyol of Example AA | 11.0 | 11.0 |
| Triisopropyl Borate[1] | 0.9 | 0.9 |
| Phenyl Acid Phosphate Catalyst | 0.7 | 0.5 |
| DesmodurN3300 | 27.1 | 27.1 |

[1]Available from Aldrich Chemical Co.

Example 21

This example describes the preparation of a two-component clearcoat composition of the present invention which contains borate ester as an adhesion promoting compound. The coating composition was prepared by admixing the following ingredients sequentially under mild agitation.

| Ingredient | Parts by Weight (grams) | Solid Weight (grams) |
|---|---|---|
| Methyl n-amyl ketone | 30.0 | — |
| Butyl Cellosolve ® acetate | 10.0 | — |
| Butyl Carbitol ® acetate | 5.0 | — |
| Tinuvin 928 | 3.0 | 3.0 |
| Tinuvin 292 | 0.5 | 0.5 |
| Silica dispersion of Example A | 8.8 | 6.7 |
| Acrylic Resin of Example 14 | 58.2 | 42.2 |
| Cymel 202 | 18.8 | 15.0 |
| Polysiloxane polyol of Example AA | 11.0 | 11.0 |

-continued

| Ingredient | Parts by Weight (grams) | Solid Weight (grams) |
|---|---|---|
| Bonc Acid Ester of Example F | 2.2 | 0.3 |
| Phenyl Acid Phosphate Catalyst | 0.7 | 0.5 |
| DesmodurN3300 | 27.1 | 27.1 |

Example 22

This example describes the preparation of a two-component clearcoat composition of the present invention which contains an acrylic borate as an adhesion promoting compound. The coating composition was prepared by admixing the following ingredients sequentially under mild agitation.

| Ingredient | Parts by Weight (grams) | Solid Weight (grams) |
|---|---|---|
| Methyl n-amyl ketone | 30.0 | — |
| Butyl Cellosolve ® acetate | 10.0 | — |
| Butyl Carbitol ® acetate | 5.0 | — |
| Tinuvin 928 | 3.0 | 3.0 |
| Tinuvin 292 | 0.5 | 0.5 |
| Silica dispersion of Example A | 8.8 | 6.7 |
| Boric Acid Ester of Example G | 60.9 | 42.2 |
| Cymel 202 | 18.8 | 15.0 |
| Polysiloxane polyol of Example AA | 11.0 | 11.0 |
| Phenyl Acid Phosphate Catalyst | 0.7 | 0.5 |
| DesmodurN3300 | 27.1 | 27.1 |

Example 23

This example describes the preparation of a two-component clearcoat composition of the present invention which contains a siloxane aluminum isopropoxide as an adhesion promoting compound. The coating composition was prepared by admixing the following ingredients sequentially under mild agitation.

| Ingredient | Parts by Weight (grams) | Solid Weight (grams) |
|---|---|---|
| Methyl n-amyl ketone | 30.0 | — |
| Butyl Cellosolve ® acetate | 10.0 | — |
| Butyl Carbitol ® acetate | 5.0 | — |
| Tinuvin 928 | 3.0 | 3.0 |
| Tinuvin 292 | 0.5 | 0.5 |
| Silica dispersion of Example A | 8.8 | 6.7 |
| Acrylic Resin of Example 14 | 58.2 | 42.2 |
| Cymel 202 | 18.8 | 15.0 |
| Polysiloxane polyol of Example AA | — | — |
| Siloxane Aluminum isopropoxide of Example H | 42.9 | 22.9 |
| Phenyl Acid Phosphate Catalyst | 0.7 | 0.5 |
| DesmodurN3300 | 27.1 | 27.1 |

The clearcoats Examples 14 through 23 described above were reduced in viscosity to about 25 seconds on a #4 Ford efflux cup at ambient temperature using methyl n-amyl ketone.

Testing

The film forming compositions of Examples 14–23 were spray applied to a pigmented basecoat to form color-plus-clear composite coatings over primed electrocoated steel panels. The panels used were cold rolled steel panels (size 4 inches×12 inches (10.16 cm by 30.48 cm)). The steel panels for Examples 14–23 were coated with ED5050B electrocoat, available from PPG Industries, Inc, and 11 77225A primer surfacer, also available from PPG Industries, Inc or coated with ED5000 electrocoat, available from PPG Industries, Inc, and GPXH5379 primer surfacer, also available from PPG Industries, Inc. The test panels are available as APR39754 or APR39375 from ACT Laboratories, Inc. of Hillsdale, Mich.

The basecoat used for Examples 14–23 was Obsidian Schwarz, black pigmented waterborne basecoat, available from BASF Corporation. The Obsidian Schwarz basecoat was automated spray applied in two coats with approximately 30 second flash between coats to the electrocoated and primed steel panels at about 70° F. (21° C.) temperature and about 60% relative humidity. A dry film thickness of about 0.5 to 0.6 mils (about 12 to 16 micrometers) was targeted. The basecoat was allowed to flash ambiently for about five minutes and then prebaked for five minutes at 176° F. (80° C.).

The clear coating compositions of Examples 14–23 were each automated spray applied to a basecoated panel at ambient temperature in two coats with about a 30 second ambient flash between coats. Examples 1–10 were targeted for a 1.5 to 2.0 mils (about 38 to 51 micrometers) dry film thickness. All coatings were allowed to air flash at ambient temperature for ten minutes. Panels prepared from each coating were baked for 30 minutes at 285° F. (141 ° C.) to fully cure the coating(s). The panels were baked in a horizontal position.

To test for recoat adhesion, an original basecoated and clearcoated panel, as described above, was given another layer of basecoat and clearcoat or clearcoat only. With the condition of sanding, the right half of the panel was sanded with 1200 rit sand paper and the left half was not sanded thus giving sanded and non-sanded areas. Half of an original panel from each clear coating was basecoated and clearcoated and the other half of the panel was clearcoated only. To recoat the panels half and half, the bottom halves of the original panels were covered with aluminum foil and then the top halves were recoated with Obsidian Schwarz basecoat using the same conditions as above. The foil was removed, resulting in an original panel with the upper half coated in basecoat and the bottom half still with only the original coating layers. The respective clearcoat was then automated spray applied to the entire panel as described above. The resulting panels were half coated in basecoat/clearcoat from the original spray application and another layer of basecoat/clearcoat from the recoat spray application (B/C//B/C). The other half of the resulting panel was coated in basecoat/ clearcoat from the original spray application and another layer of clearcoat from the recoat spray application (B/C//C). Test data is reported below in the following Table 6.

TABLE 6

| | Adhesion promoter Elemental Weight % on Resin Solids | | Recoat Adhesion-Cross Hatch 30/285° F.(141° C.)//30/285° F.(141° C.) | | | |
|---|---|---|---|---|---|---|
| | | | Sanded | | Non-Sanded | |
| Example # | | 20° Gloss | B/C//B/C | B/C//C | B/C//B/C | B/C//C |
| 14* | 0 | 84 | 5 | 5 | 0 | 0 |
| 15 | 0.02 | 84 | 5 | 5 | 5 | 0 |

TABLE 6-continued

| Example # | Adhesion promoter Elemental Weight % on Resin Solids | 20° Gloss | Recoat Adhesion-Cross Hatch 30/285° F.(141° C.)//30/285° F.(141° C.) | | | |
|---|---|---|---|---|---|---|
| | | | Sanded | | Non-Sanded | |
| | | | B/C// B/C | B/C// C | B/C// B/C | B/C// C |
| 16 | 0.04 | 85 | 5 | 5 | 5 | 0 |
| 17 | 0.08 | 84 | 5 | 5 | 5 | 5– |
| 18 | 0.04 | 84 | 5 | 5 | 5 | 0 |
| 19 | 0.16 | 85 | 5 | 5 | 5 | 5– |
| 20 | 0.04 | 85 | — | — | 5 | 0 |
| 21 | 0.04 | 85 | — | — | 5 | 0 |
| 22 | 0.03 | 85 | — | — | 5 | 0 |
| 23 | 0.10 | 82 | 5 | 5 | 5 | 0 |

*Designates a comparative example.

The data presented above in Table 6 illustrate that the inclusion in a two-component clearcoating composition of the adhesion promoting composition of Examples C through H above provide excellent adhesion where a basecoat/clearcoat system is recoated with a repair basecoat/clearcoat system. Further, the data for Examples 14–22 illustrate that the inclusion of the polysiloxane borate and boric acid (where the composition also comprises a polysiloxane) at levels of elemental boron of 0.08 or greater, show excellent adhesion where a basecoat/clearcoat system is repaired with a clearcoat.

Basecoating Compositions

Examples 24 and 25 describe the preparation of basecoating compositions. Comparative Example 24 describes the preparation of an aqueous basecoating composition which does not contain the polysiloxane borate an adhesion promoter. Example 25 describes the preparation of a pigment-containing basecoating composition according to the present invention which contains a polysiloxane borate as an adhesion promoter.

Comparative Example 24

An aqueous silver metallic basecoat composition was prepared in three stages as follows. The first four components of the "organic portion" of the basecoat were combined and then agitated until well dispersed. The next two ingredients were then added under agitation and mixed for 20 minutes, followed by addition of the last ingredient which was added under agitation until dispersed.

In a separate container, the "thickener portion" of the basecoat was prepared by combining the three ingredients under agitation and mixed for 20 minutes.

The "aqueous portion" of the basecoat was assembled by adding each aqueous component under agitation and mixing for approximately 10 minutes until well blended. The organic portion was then added slowly to the aqueous portion and agitated for 20 minutes. The pH of the admixture was adjusted to 8.5–8.7 with a 50% solution of dimethylethanol amine and deionized water. The thickener portion was then added and again the pH was adjusted. The resulting basecoating composition was allowed to equilibrate for 24 hours before the final pH adjustment was made. At that time, the basecoating composition was reduced in viscosity to 25–27 seconds using a 4 Ford Cup with deionized water before spraying.

| | Resin Solids (grams) | Pigment Solids (grams) | Additive Solids (grams) | Solution Weight (grams) |
|---|---|---|---|---|
| Organic Portion | | | | |
| N-Butoxypropanol | 0 | 0 | 0 | 45.04 |
| Cymel 303LF[1] | 25 | 0 | 0 | 25 |
| Cymel 385[2] | 5 | 0 | 0 | 6.25 |
| TINUVIN ® 1130[3] | 0 | 0 | 1.4 | 1.40 |
| Aqua Paste 3620-D23[4] | 1.5 | 15.1 | 0 | 23.50 |
| Aqua Paste 3700-A23[5] | 0.4 | 4.3 | 0 | 6.50 |
| Phosphatized Epoxy[6] | 0 | 0 | 0.24 | 0.39 |
| Aqueous Portion | | | | |
| SHELLSOL ® 071[7] | 0 | 0 | 0 | 6 |
| Latex resin[8] | 58.1 | 0 | 0 | 140 |
| Deionized water | 0 | 0 | 0 | 50 |
| Acrylic Grind Dispersion[9] | 6 | 0 | 0 | 23.1 |
| 50% dimethanolamine solution | 0 | 0 | 0 | 2.2 |
| Thickener Solution | | | | |
| Deionized water | 0 | 0 | 0 | 10 |
| 50% DMEA Solution | 0.0 | 0.0 | 0.0 | 2.5 |
| Oligomeric Polyester[10] | 4 | 0.0 | 0.0 | 5 |

[1]Melamine available from Cytec Industries, Inc.
[2]Melamine available from Cytec Industries, Inc.
[3]Substituted benzotriazole UV light absorber available from Ciba Additives.
[4]Aqua Paste, treated aluminum available from Silberline Manufacturing Co., Inc.
[5]Aqua Paste, treated aluminum available from Silberline Manufacturing Co., Inc.
[6]Phosphatized epoxy prepared from EPON ® 828, a polyglycidyl ether of Bisphenol A, available form Shell Oil and Chemical Co.; reacted with phosphoric acid at an 83:17 weight ratio.
[7]Mineral spirits available from Shell Chemical Co.
[8]Latex prepared as follows: (I) a polyester resin was prepared by adding to a four-neck round bottom flask equipped with a thermometer, mechanical stirrer, condenser, dry nitrogen sparge, and a heating mantle, the following ingredients: 1103.0 g isostearic acid, 800.0 g pentaerythritol, 470.0 g crotonic acid, 688.0 g phthalic anhydride, 6.1 g dibutyltin oxide, 6.1 g triphenyl phosphite, 1170.0 g butyl acrylate, and 4.0 g Ionol (butylated hydroxytoluene). The first six ingredients were stirred in the flask at 210° C. until 245 ml of distillate was collected and the acid value dropped to 4.6. The material was cooled to 77° C. and the last two ingredients were stirred in. The final product was a viscous yellow liquid with a hydroxyl value of 54.0, a Gardner-Holdt viscosity of Z+, a weight average molecular weight of 45,600, and a non-volatile content of 70.2%; (II) a pre-emulsion was prepared by stirring together the following ingredients: 286.0 g of the polyester of (I), 664.0 g butyl acrylate, 30.0 g ethylene glycol dimethacrylate, 20.0 g acrylic acid, 46.4 g dodecylbenzenesulfonic acid (70% in isopropanol), 14.3 g dimethylethanolamine, and 1000.0 g water. The pre-emulsion was passed once through a Microfluidizer © M110T at 8000 psi and transferred to a fourneck round bottom flask equipped with an overhead stirrer, condenser, thermometer, and a nitrogen atmosphere. 150.0 g of water used to rinse the Microfluidizer © was added to the flask. The polymerization was initiated by adding 3.0 g of isoascorbic acid and 0.02 g of ferrous ammonium sulfate dissolved in 120.0 g water followed by a thirty minute addition of 4.0 g of 70% t-butyl hydroperoxide dissolved in 115.0 g of water. The reaction exothermed from 23° C. to 80° C. After the temperature was reduced to 30° C., 36 g of 33.3% aqueous dimethylethanolamine was added followed by 2.0 g of Proxel GXL (Biocide available from ICI Americas, Inc.) in 8.0 g of water. The final pH of the latex was 8.0, the nonvolatile content was 42.0%, the particle size was 105 nm, and the Brookfield viscosity was 12 cps (spindle #1, 50 rpm).
[9]Acrylic dispersion grind vehicle (35% butyl acrylate, 30% styrene, 18% butyl methacrylate, 8.5% hydroxyethyl acrylate, and 8.5% acrylic acid).
[10]Prepared according to U.S. Pat. No. 5,356,973, Example A.

Example 25

This example describes a pigment-containing basecoating composition of the present invention which contains a polysiloxane borate as an adhesion promoter. The basecoating composition was prepared in three stages as described above with reference to the basecoating composition of Comparative Example 24.

|  | Resin Solids (grams) | Pigment Solids (grams) | Additive Solids (grams) | Solution Weight (grams) |
|---|---|---|---|---|
| Organic Portion |  |  |  |  |
| N-Butoxypropanol | 0 | 0 | 0 | 45.04 |
| Cymel 303LF | 25 | 0 | 0 | 25 |
| Cymel 385 | 5 | 0 | 0 | 6.25 |
| TINUVIN ® 1130 | 0 | 0 | 1.4 | 1.40 |
| Aqua Paste 3620-D23 | 1.5 | 15.1 | 0 | 23.50 |
| Aqua Paste 3700-A23 | 0.4 | 4.3 | 0 | 6.50 |
| Phosphatized Epoxy | 0 | 0 | 0.24 | 0.39 |
| Aqueous Portion |  |  |  |  |
| SHELLSOL ® 071 | 0 | 0 | 0 | 6 |
| Latex of Example 24 | 58.1 | 0 | 0 | 140 |
| Deionized water | 0 | 0 | 0 | 50 |
| Acrylic Grind Dispersion of Example 24 | 6 | 0 | 0 | 23.1 |
| 50% DMEA solution Thickener Solution | 0 | 0 | 0 | 2.2 |
| Deionized water | 0 | 0 | 0 | 10 |
| 50% DMEA Solution | 0.0 | 0.0 | 0.0 | 2.5 |
| Oligomeric Polyester of Example 24 Adhesion promoter | 4 | 0.0 | 0.0 | 5 |
| Polysiloxane borate of Example I | 0 | 0 | .5 | .9 |

The polysiloxane borate of Example I was post-added under agitation to the basecoating composition of Example 25 in the amounts indicated above.

Testing

Each of the basecoating compositions of Comparative Example 24 and Example 25 was applied on ED5000 panels primed with GPXH5379 using the Sames 402 un mounted on the Kohne machine in a one-coat application.

The basecoats were given a five minute ambient flash and then pre-baked at the various conditions listed in the following Table 7. Basecoat film build was targeted at 0.5 to 0.7 mils. A two-component isocyanate-containing clearcoat, TKU-1050AR (available from PPG Industries, Inc.) was applied under the same conditions as was the basecoat, except the clearcoating composition was applied in two coats. The panels thus prepared were given a ten minute ambient flash period before curing for 30 minutes at 250° F. (121° C.). The cured clearcoat dry film thickness ranged from 1.8–2.0 mils (45.7 to 50 micrometers).

Note, a 5 minute at 200° F. (93° C.) prebake is the standard prebake condition. The 10 minute prebake at 250° F. (121° C.) prebake which was used in the above described evaluations was intended to simulate an over pre-bake condition (as would be encountered on a commercial coating line should there be a malfunction in the prebake oven).

A 30 minute prebake at 250° F. (121° C.)/5 minute prebake at 200° F. (93° C.) was used to simulate a malfunction in the clearcoat booth or oven. In this instance, the basecoat is applied and given a standard prebake but no clearcoat is applied due to a malfunction on the clearcoating line. Thus the basecoat receives a full clearcoat bake of 30 minutes at 250° F. (121° C.). As mentioned above, in such situations, some automobile manufacturers elect to reapply the basecoat and give it a standard prebake before clearcoating.

Adhesion was tested 1 hour after clearcoating using a razor knife to cut a 6×6 two-millimeter grid through the total paint coating and then taping with black Tesa tape. The adhesion is rated according to ASTM D 3359-97 which assigns a whole number from 5(no adhesion loss) to 0(total adhesion loss). In this case an acceptable adhesion rating is a 5 or a 4. For the 10 minutes at 250° F. prebake scenario described above, the adhesion between clearcoat and basecoat was evaluated. For the 30 minutes at 250° F. (121° C.)/5 minutes at 250° F (121° C.) prebake scenario described above, the adhesion between the basecoat layers was evaluated. Adhesion test results are presented below in the following Table 7.

TABLE 7

| BASECOATING COMPOSITION | Elemental Weight % on Resin Solids | PREBAKE SCENARIO | CROSS HATCH ADHESION RATING |
|---|---|---|---|
| EXAMPLE 24* | 0 | 5' at 200 F. (standard) | 5 |
| EXAMPLE 25 | 0.01 | 5' at 200 F. (standard) | 5 |
| EXAMPLE 24* | 0 | 10' at 250 F. | 0 |
| EXAMPLE 25 | 0.01 | 10' at 250 F. | 5 |
| EXAMPLE 24* | 0 | 30' at 250 F./ 5' at 200 F. | 0 |
| EXAMPLE 25 | 0.01 | 30' at 250 F./ 5' 200 F. | 5 |

The data presented above in Table 7 illustrates that the basecoating composition of Comparative Example 24 does not exhibit acceptable clearcoat-to-basecoat adhesion when the basecoat undergoes an extended prebake (10' at 250° F. (121° C.) prebake). Nor does this basecoat exhibit acceptable basecoat-to-basecoat adhesion when the basecoat is fully baked and then another layer of basecoat is applied and given the standard prebake (30' at 250° F. (121° C.)/5' at 200° F. (93° C.) prebake) before clearcoating. By contrast, the basecoating compositions of the present invention comprising the polysiloxane borate as an adhesion promoter exhibits excellent adhesion in both prebake scenarios.

Carbamate-Containing Clearcoat Compositions

Comparative Example 26

This comparative example describes the preparation of thermosetting clearcoating composition which does not contain an adhesion promoter. The clearcoating composition was prepared by mixing together the following ingredients sequentially:

| Ingredient | Solid Weight (g) | Solution Weight. (g) |
|---|---|---|
| Xylene |  | 5.75 |
| Aromatic 100 |  | 12.00 |
| Hexyl cellosolve |  | 2.57 |
| Methyl Ethyl Ketone |  | 11.7 |
| Tinuvin 328[1] | 1.29 | 1.29 |
| Tinuvin 900[2] | 1.29 | 1.29 |
| Acrylic Microgel Dispersion[3] | 1.74 | 5.79 |
| Silica Dispersion[4] | 9.17 | 21.3 |
| RESIMENE 757[5] | 38.13 | 39.3 |

-continued

| Ingredient | Solid Weight (g) | Solution Weight. (g) |
|---|---|---|
| Ethanol | | 4.45 |
| Carbamate functional Polyester of Example CC | 39.5 | 54.9 |
| Carbamate Functional Acrylic of Example BB | 13.17 | 20.9 |
| Tinuvin 292[6] | 0.32 | 0.32 |
| DISPARLON OX-60[7] | 0.06 | 0.12 |
| Flow Additive[8] | 0.38 | 0.63 |
| Catalyst[9] | 1.03 | 1.47 |

[1]Substituted benzotriazole UV Light stabilizer available from Ciba Geigy Corporation.
[2]Substituted benzotriazole UV Light stabilizer available from Ciba Geigy Corporation.
[3]A non-aqueous dispersion of an acrylic polymer formed from ethyleneglycol dimethacrylate, styrene, butyl acrylate and methyl methacrylate.
[4]Fumed silica grind.
[5]A fully alkylated methoxy/butoxy functional aminoplast available from Solutia, Inc.
[6]Sterically hindered amine light stabilizer available from Ciba Geigy Corporation.
[7]Additive from King Industries.
[8]Additive from DuPont.
[9]Dodecyl benzene sulfonic acid solution.

Example 27

This example describes the preparation of a clearcoating composition of the present invention which contains a boric acid ester as an adhesion promoter. The clearcoatng composition was prepared by mixing together the

| Ingredients | Solid Weight. (g) | Solution Weight. (g) |
|---|---|---|
| Clearcoating Composition of Example 26 | 106.08 | 184.9 |
| Boric Acid Ester of Example J | 1.0 | 1.4 |

Example 28

This example describes the preparation of a clearcoating composition of the present invention which contains a boric acid ester as an adhesion promoter. The clearcoating composition was prepared by mixing together the following ingredients:

| Ingredients | Solid Weight. (g) | Solution Weight. (g) |
|---|---|---|
| Clearcoating Composition of Example 26 | 106.08 | 184.9 |
| Polysiloxane polyol of Example AA | 1.0 | 1.0 |
| Boric Acid Ester of Example F | 0.56 | 0.90 |

Example 29

This example describes the preparation of a clearcoating composition of the present invention which contains a boric acid ester as an adhesion promoter. The clearcoating composition was prepared by mixing together the following ingredients:

| Ingredients | Solid Weight. (g) | Solution Weight. (g) |
|---|---|---|
| Clearcoating composition of Example 26 | 106.08 | 184.5 |
| Boric Acid Ester of Example F | 0.56 | 0.90 |

Comparative Example 30

This comparative example describes the preparation of a clearcoating which contains a polysiloxane polyol, but no adhesion promoter. The clearcoating composition was prepared by mixing together the following ingredients:

| Ingredients | Solid Weight (g) | Solution Weight (g) |
|---|---|---|
| Clearcoating composition of Example 26 | 106.08 | 184.5 |
| Polysiloxane polyol of Example AA | 0.88 | 0.88 |

Testing

The film-forming compositions of Examples 26–30 were applied to pigmented basecoats to form color-plus-clear composite coatings over a steel substrate previously coated with an electrocoat primer and a primer surfacer. The basecoat used for the examples is commercially available from PPG Industries, Inc. and is identified as ODCT6505 (silver metallic). The primer used is commercially available from PPG Industries, Inc. and is identified as FCP-6759. The electrocoat used on the steel is commercially available from PPG Industries, Inc. and is identified as ED5000.

The basecoat was spray applied in two coats to the primed electrocoated steel panels at a temperature of about 75° F. (24° C.). A 60 seconds flash time was allowed between the two basecoat applications. After the second basecoat application, a 90 seconds flash time was allowed at about 75° F. (24° C.) before the application of the clear coating composition. The clear coating compositions of Examples 26–30 were each applied to a basecoated panel in two coats with a 60 seconds flash at 75° F. (24° C.) allowed between coats. The composite coating was allowed to air flash at about 75° F. (24° C.) for 8–10 minutes before baking at 285° F. (141° C.) to cure both the basecoat and the clearcoat. The panels were baked in a horizontal position. The colored panel for each clearcoat example was baked for 30 minutes and used to test for adhesion.

In order to test the adhesion of the clearcoat to the windshield adhesive, a bead of windshield adhesive was applied to the clearcoat surface within 14 hours following the 30 minutes at 285° F. (141° C.) bake. The windshield adhesive used for Examples 26–30 is commercially available from Essex Speciality Products Company and is identified as Adhesive 15625.

A 5 mm×5 mm×250 mm adhesive bead was placed on the clearcoat surface of the cured color-plus-clear composite. The adhesive plus the color-plus-clear composite was cured for 72 hours at about 75° F. (24° C.) and 20–50% relative humidity. The cured adhesive bead was cut with a razor blade. A cut was made through the adhesive bead at a 60°angle at 12 mm intervals while pulling back the edge of the adhesive at a 180°angle. A minimum of 10 cuts was done for each system. The desired result is described as 100% cohesive failure (CF). Cohesive failure (CF) occurs when the integrity of the adhesive bead is lost as a result of cutting and pulling rather than the bond between the adhesive bead and the clearcoat surface. The adhesion results over the silver metallic basecoat are summarized in Table 8 below.

TABLE 8

| CLEARCOATING COMPOSITION | Percent Cohesive Failure (% CF) |
|---|---|
| Example 26* | 0% CF |
| Example 27 | 100% CF |
| Example 28 | 100% CF |
| Example 29* | 0% CF |
| Example 30* | 0% CF |

*Comparative Examples

The data presented above in Table 8 illustrate that in the absence of the siloxane plus borate combination (Comparative Examples 26, 29 and 30) the adhesive beads do not adhere to the clearcoat surface indicating 0% cohesive failure. By contrast, clearcoats containing a siloxane plus borate additive (Examples 27 and 28) adhere strongly to the adhesive beads (100% cohesive failure) and the mode of failure occurs within the adhesive bead itself.

Powder Coating Compositions

Examples 31 Through 33

Each epoxy-acid powder clearcoat composition in Examples 31 through 33 in Table 9 below is shown in parts by weight. Each composition was processed in the following manner. The components were blended in a Henschel Mixer for 60 to 90 seconds. The mixtures were then extruded through a Werner & Pfleider co-rotating twin screw extruder operating at a screw speed of 450 RPM with barrel temperatures adjusted to produce extrudate at a temperature of 100° C. to 125° C. The extruded material was then ground to a mean particle size of 17 to 27 microns using an ACM 2 (Air Classifying Mill from Hosakowa Micron Powder Systems). The finished powders were electrostatically sprayed onto test panels and evaluated for coatings properties.

TABLE 9

| Component | Example 31 Comparative | Example 32 | Example 33 |
|---|---|---|---|
| ¹GMA Acrylic | 69.99 | 69.80 | 67.57 |
| Dodecanedioic Acid | 20.91 | 20.85 | 20.18 |
| ²Flow Additive | 1.00 | 1.00 | 0.97 |
| Benzoin | 0.20 | 0.20 | 0.19 |
| ³Wax C Micropowder | 0.60 | 0.60 | 0.58 |
| ⁴Tinuvin 144 | 2.00 | 2.00 | 1.94 |
| ⁵CGL1545 | 2.00 | 2.00 | 1.94 |
| ⁶HCA-1 | 2.00 | 2.00 | 1.94 |
| ⁷Armeen M2C | 1.00 | 1.00 | 0.97 |
| ⁸Aluminum Oxide | 0.30 | 0.30 | 0.29 |

TABLE 9-continued

| Component | Example 31 Comparative | Example 32 | Example 33 |
|---|---|---|---|
| ⁹Orthoboric Acid | 0.00 | 0.25 | 0.00 |
| Siloxane Borate of Example I | 0.00 | 0.00 | 3.55 |

¹Proprietary Acrylic
²Proprietary Flow Additive
³Wax C Micropowder, a fatty acid amide (ethylene bis-stearolyamide), commercially available from Hoechst-Celanese.
⁴2-tert-butyl-2-(4-hydroxy-3,5-di-tert-butylbenzyl)[bis(methyl-2,2,6,6,-tetramethyl-4-piperidinyl)]dipropionate), an ultraviolet light stabilizer commercially available from Ciba-Geigy Corp.
⁵2-[4((2-Hydroxy-3-(2-ethylhexyloxy)propyl)-oxy]-2-hydroxyphenyl)-4,6-bis(2,4-dimethylphenyl)-1,3,5-triazine), an ultraviolet light stabilizer commercially available form Ciba-Geigy Corp.
⁶HCA-1, an anti-yellowing agent commercially available from Sanko Chemical Corp.
⁷Methyl dicocoamine commercially available from Akzo-Nobel Corp.
⁸Microgrit WCA3 commercially available from Micro Abrasives.
⁹Optibor TP, commercially available from U.S. Borax, Inc.

Each of the powder coating compositions of Examples 31 to 33 was prepared for testing in the following manner. The test panels, pre-coated with an electrocoat primer commercially available from PPG Industries; Inc., as ED5000 were coated with a primer/surfacer and a basecoat by spray application to a film thickness of 1.1 mils (27.9 microns) and 0.6 mils (15.2 microns) respectively, with gray solventborne primer commercially available form Akzo-Nobel Corp., and a waterborne silver basecoat (prepared by blending under agitation: 171.6 SHELLSOL® 071, 1700.4 resin (dispersion prepared from 60% acrylic grafted to 40% poylurethane), 902.2 DOATAN 6462 available from Solutia, 559 Hexyl Cellosolve®, 31.2 dimethylethanolamine 50%solution, 2876.9 deionized water, 102.7 octanol, 37.7 Tinuvin® 1130, 13 phosphatized epoxy (prepared from EPON® 828, a polyglicydyl ether of Bisphenol A, available form Shell Oil and Chemical Co., reacted with phosphoric acid at an 83:17 weight ratio.), 260 Cymel® 303LF melamine available from Cytec Industries, Inc., 365.3 TOYO 7106 NS untreated aluminum available from Toyo Aluminum K. K. and 107.9 aluminum passivator prepared according to U.S. Pat. No. 5,429,674 Example 6). The basecoat panels were then flashed 10 minutes at 176° F. (80° C.) before electrostatically applying the powder clearcoating compositions of Examples 31 to 33. The powder coatings were applied at 1.97–2.36 mils (50–60 microns) film thickness and cured for 30 minutes at 293° F. (145° C.). Test panels were then given a second layer of the waterborne silver basecoat. Finally, a two component isocyanate clearcoat commercially available from BASF, was applied at a film thickness of 1.6 to 1.8 mils (40.6 to 45.7 microns) and cured for 20 minutes at 293° F. (145° C.). The test panels coated with the powder clearcoats from Examples 31 to 33 were then evaluated for adhesion by the following procedure:

A cutting template, Super Cutter Guide manufactured by Taiyu Kizai Co ltd, was used along with a blade to scribe a grid into the test panels. The lines of the grid are spaced 3 mm apart. Black tape available as Tesa 4651 through Beiersdorf AG is then placed across the grid and rubbed to insure good surface contact. The tape is then yanked off. The panels are then rated according to the percentage of surface area of the grid that was pulled off the grid as % failure.

Results are reported in Table 10 below.

TABLE 10

| Coating Composition | % Failure |
| --- | --- |
| Comparative Example 31 | 100% complete delamination |
| Example 32 | 35% partial delamination |
| Example 33 | 8% slight delamination |

The data presented above in Table 10 illustrate that the powder clearcoating compositions of the present invention (Examples 32 and 33) provide improved adhesion over that of the Comparative Example 31 which contains no boron-containing compound.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

Therefore, we claim:

1. In a multi-layer composite of two or more polymeric layers, at least one of which is formed from a thermosetting composition, said composite comprising at least a first polymeric layer formed on a substrate and a second polymeric layer formed over at least a portion of said first polymeric layer, wherein in the absence of a boron-containing compound, said first polymeric layer and said second polymeric layer have poor interlayer adhesion, the improvement comprising the inclusion of at least one boron-containing compound in one or both of said first and second polymeric layers in an amount sufficient to improve the interlayer adhesion of said first polymeric layer and said second polymeric layer, wherein said boron-containing compound comprises a boric acid ester derivative selected from at least one of triethanolamineborate, mannitol borate, n-propanol amine borate, trimethyolpropane borate, glycerol borate, and mixtures thereof.

2. In a multi-layer composite of two or more polymeric layers, at least one of which is formed from a thermosetting composition, said composite comprising at least a first polymeric layer formed on a substrate and a second polymeric layer formed over at least a portion of said first polymeric layer, wherein in the absence of a boron-containing compound, said first polymeric layer and said second polymeric layer have poor interlayer adhesion, the improvement comprising the inclusion of at least one boron-containing compound in one or both of said first and second polymeric layers in an amount sufficient to improve the interlayer adhesion of said first polymeric layer and said second polymeric layer, wherein said boron-containing compound comprises the reaction product formed from the following reactants:

(A) at least one polysiloxane comprising at least one of the following structural units (I):

wherein each $R^1$, which may be identical or different, represents H, OH, a monovalent hydrocarbon group or a monovalent siloxane group; each $R^2$, which may be identical or different, represents a group comprising one or more active hydrogens; and m and n each represent a positive number fulfilling the requirements of $0 < m < 4$; $0 < n < 4$; and $2 \leq (m+n) < 4$; and (B) a boron-containing compound selected from at least one of boric acid, boric acid equivalents, and mixtures thereof.

3. The composite of claim 2, wherein at least one $R^2$ comprises OR', where R' is H or an alkyl group having 1 to 20 carbon atoms.

4. The composite of claim 2, wherein said polysiloxane comprises one or more ungelled non-hydrolyzable organic polysiloxanes having reactive functional groups, said polysiloxane having the following structure (II) or (III):

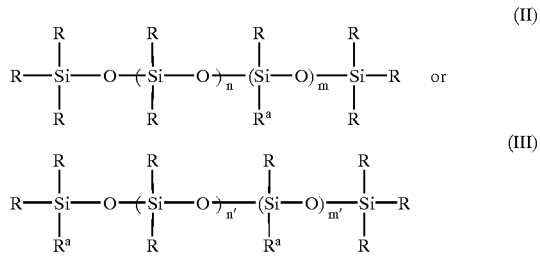

wherein:

m has a value of at least 1;

m ranges from 0 to 75;

n ranges from 0 to 75;

n ranges from 0 to 75;

each R, which may be identical or different, is selected from H,

OH, monovalent hydrocarbon groups, monovalent siloxane groups, and mixtures of any of the foregoing; and $R^a$ comprises the following structure (IV):

wherein —$R^3$ is selected from an alkylene group, an oxyalkylene group, an alkylene aryl group, an alkenylene group, an oxyalkenylene group, and an alkenylene aryl group; and; and $R^a$ comprises the following structure (IV):

wherein $R^3$ is alkenylene, alkylene, oxyalkylene, alkylene aryl or alkenylene; and X represents a group which comprises at least one reactive functional group selected from at least one of a hydroxyl group, a carboxyl group, a primary amine group, a secondary amine group, an amide group, a carbamate group, a urea group, an anhydride group, a hydroxy alkylamide group, and an epoxy group.

5. The composite of claim 4, wherein the polysiloxane is the reaction product of the following reactants:

(A) at least one silicon hydride-containing polysiloxane having the following structure (V):

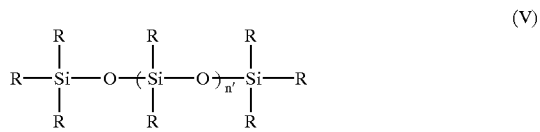

wherein the R groups are selected from H, OH, monovalent hydrocarbon groups, siloxane groups and mixtures thereof, wherein at least one of the groups represented by R is H, and n' ranges from 0 to 100, such that the mole percent of hydrogen-bonded silicon atoms to non-hydrogen-bonded silicon atoms ranges from 10 to 100 percent; and (B) one or more hydroxyl functional materials comprising at least one primary hydroxyl group and at least one unsaturated bond capable of undergoing hydrosilylation reaction.

6. The composite of claim 5, wherein reactant (B) is a hydroxyl functional group-containing allyl ether selected from trimethylolpropane monoallyl ether, pentaerythritol monoallyl ether, trimethylolpropane diallyl ether and mixtures thereof; or an allyl alcohol.

7. The composite of claim 2, wherein the first polymeric layer is formed from a thermosetting composition comprising a boron-containing compound present in said thermosetting composition in an amount sufficient to provide an amount of boron ranging from 0.001 to 5 percent by weight, based on weight of total resin solids present in the thermosetting composition.

8. The composite of claim 1, wherein one or both of said first polymeric layer and said second polymeric layer comprises a cured layer formed from a thermosetting composition comprising:

(A) at least one film-forming polymer having reactive functional groups selected from hydroxyl groups, carbamate groups and mixtures thereof;

(B) at least one curing agent having functional groups reactive with the functional groups of (A) selected from aminoplast resins, polyisocyanates, blocked isocyanates and mixtures thereof; and (C) at least one boron-containing compound selected from boric acid esters selected from one or more of triethanolamineborate, mannitol borate, n-propanol amine borate, trimethyolpropane borate, glycerol borate, and mixtures thereof.

9. The composite of claim 8, wherein the at least one acrylic film-forming polymer having reactive functional groups (A), comprises the residue of a beta-hydroxy group-containing monomer selected from at least one of:

(i) the reaction product of an ethylenically unsaturated acid functional monomer and an epoxy functional compound having no ethylenic unsaturation; and (ii) the reaction product of an ethylenically unsaturated, epoxy functional monomer and a saturated carboxylic acid.

10. The composite of claim 9, wherein the at least one curing agent (B) having functional groups reactive with the functional groups of (A), comprises at least one aminoplast resin and at least one blocked isocyanate compound comprising a tricarbamoyl triazine compound.

11. The composite of claim 1, wherein said first polymeric layer is formed from a cured layer formed from a thermosetting composition comprising:

(A) at least one film-forming acrylic polymer comprising functional groups selected from hydroxyl groups, carbamate groups and mixtures thereof;

(B) at least one curing agent having functional groups reactive with the functional groups of (A) comprising an aminoplast resin, and a blocked isocyanate comprising a tricarbamoyl triazine compound; and (C) at least one boron-containing compound selected from boric acid esters selected from one or more of triethanolamineborate, mannitol borate, n-propanol amine borate, trimethyolpropane borate, glycerol borate, and mixturesthereof; and said second polymeric layer comprises a cured layer formed from a thermosetting composition comprising:

(D) at least one film-forming polymer having reactive functional groups;

(E) at least one curing agent selected from aminoplast resins, polyisocyanates, blocked polyisocyanates and mixtures thereof; and (F) at least one boron-containing compound selected from boric acid esters selected from one or more of triethanolamineborate, mannitol borate, n-propanol amine borate, trimethyolpropane borate, glycerol borate, and mixtures thereof.

12. The composite of claim 2, wherein both of said first polymeric layer and said second polymeric layer are cured layers formed from a thermosetting composition comprising:

(A) at least one film-forming polymer having reactive functional groups;

(B) at least one curing agent having functional groups reactive with the functional groups of (A); and (C) at least one boron-containing compound selected from reaction products formed from the following reactants:

(i) at least one polysiloxane comprising at least one of the following structural units (I):

$$\text{(I)} \ R^1{}_n R^2{}_m SiO_{(4-n-m)/2} \tag{I}$$

wherein each $R^1$ is independently-selected from H, a monovalent hydrocarbon group or a siloxane group; each $R^2$ independently is a group comprising OR', where R' is H or an alkyl group having 1 to 20 carbon atoms; and m and n each represent a positive number fulfilling the requirements of $0<m<4$; $0<n<4$; and $2\leq(m+n)<4$; and (ii) a boron-containing compound comprising at least one of boric acid, boric acid equivalents, and mixtures thereof.

13. The composite of claim 12, wherein the boron-containing compound (C) comprises boric acid and/or boric acid ester.

14. The composite of claim 12, wherein the boron-containing compound (C) is present in the thermosetting composition in an amount sufficient to provide an amount of boron ranging from 0.001 to 5 weight percent based on weight of total resin solids present in the thermosetting composition.

15. In a curable coating composition used to form a multi-layer composite coating comprising two or more cured coating layers, said multi-layer composite coating comprising at least a first coating layer formed on a substrate and a second coating layer over at least a portion of said first polymeric layer, wherein one or both of said first coating layer and said second coating layer are formed from said curable coating composition, and wherein in the absence of a boron-containing compound, said first coating layer and said second coating layer have poor interlayer adhesion, the improvement comprising the inclusion in said curable coating composition of a boron-containing compound in an amount sufficient to improve the interlayer adhesion between said first coating layer and said second coating layer, wherein said boron-containing compound comprises the reaction product of the following reactants:

(A) at least one polysiloxane comprising at least one of the following structural units (I):

$$R^1_n R^2_m SiO_{(4-n-m)/2} \quad (I)$$

wherein each $R^1$, which may be identical or different, represents H, OH, a monovalent hydrocarbon group or a monovalent siloxane group; each $R^2$, which may be identical or different, represents a group comprising one or more active hydrogens; and m and n each represent a positive number fulfilling the requirements of 0<m<4; 0<n<4; and 2≦(m+n)<4; and (B) at least one boron-containing compound selected from at least one of boric acid, boric acid equivalents, and mixtures thereof.

16. The coating composition of claim 15, wherein at least one $R^2$ comprises OR', where R' represents H or an alkyl group having 1 to 20 carbon atoms.

17. The coating composition of claim 15, wherein said polysiloxane (A) comprises one or more ungelled, organic polysiloxanes having reactive functional groups, said polysiloxane having the following structure (II) or (III):

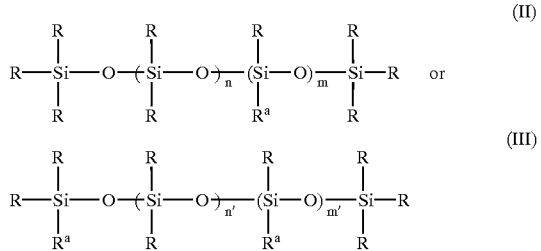

where m has a value of at least 1;

m' ranges from 0 to 75;

n ranges from 0 to 75;

n' ranges from 0 to 75;

each R, which may be identical or different, is selected from H, OH, monovalent hydrocarbon groups, monovalent siloxane groups, and mixtures of any of the foregoing; and $R^a$ comprises the following structure (IV):

$$-R^3-X \quad (IV):$$

wherein $-R^3$ is selected from an alkylene group, an oxyalkylene group, an alkylene aryl group, an alkenylene group, an oxyalkenylene group, and an alkenylene aryl group; and X represents a group which comprises at least one reactive functional group selected from selected from at least one of a hydroxyl group, a carboxyl group, a primary amine group, a secondary amine group, an amide group, a carbamate group, a urea group, an anhydride group, a hydroxy alkylamide group, and an epoxy group.

18. The coating composition of claim 17, wherein the polysiloxane comprises the reaction product of the following reactants:

(A) at least one silicon hydride-containing polysiloxane having the following structure (V):

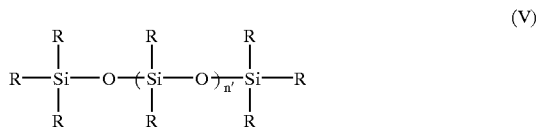

wherein the R groups are selected from H, OH, monovalent hydrocarbon groups, siloxane groups and mixtures thereof, wherein at least one of the groups represented by R is H, and n' ranges from 0 to 100, such that the mole percent of hydrogen-bonded silicon atoms to non-hydrogen-bonded silicon atoms ranges from 10 to 100 percent; and (B) one or more hydroxyl functional materials comprising at least one hydroxyl group and at least one unsaturated bond capable of undergoing hydrosilylation reaction.

19. The coating composition of claim 18, wherein reactant (B) comprises at least one of an allyl alcohol, and a hydroxyl functional group-containing allyl ether selected format least one of trimethylolpropane monoallyl ether, pentaerythritol monoallyl ether, trimethylolpropane diallyl ether and mixtures thereof.

20. In a curable coating composition used to form a multi-layer composite coating comprising two or more cured coating layers, said multi-layer composite coating comprising at least a first coating layer formed on a substrate and a second coating layer over at least a portion of said first polymeric layer, wherein one or both of said first coating layer and said second coating layer are formed from said curable coating composition, and wherein in the absence of a boron-containing compound, said first coating layer and said second coating layer have poor interlayer adhesion, the improvement comprising the inclusion in said curable coating composition of a boron-containing compound selected from at least one of boric acid, boric acid equivalents, and mixtures thereof in an amount sufficient to improve the interlayer adhesion between said first coating layer and said second coating layer, wherein one or both of said first coating layer and said second coating layer comprises a cured coating layer formed from a curable coating composition comprising:

(A) at least one film-forming polymer having reactive functional groups selected from hydroxyl groups, carbamate groups and mixtures thereof;

(B) at least one curing agent having functional groups reactive with the functional groups of (A) selected from aminoplast resins, polyisocyanates, blocked polyisocyanates and mixtures thereof; and (C) at least one boron-containing compound selected from at least one of boric acid, boric acid equivalents, and mixtures thereof.

21. In a curable coating composition used to form a multi-layer composite coating comprising two or more cured coating layers, said multi-layer composite coating comprising at least a first coating layer formed on a substrate and a second coating layer over at least a portion of said first polymeric layer, wherein one or both of said first coating layer and said second coating layer are formed from said curable coating composition, and wherein in the absence of a boron-containing compound, said first coating layer and said second coating layer have poor interlayer adhesion, the improvement comprising the inclusion in said curable coating composition of a boron-containing compound selected from at least one of boric acid, boric acid equivalents, and mixtures thereof in an amount sufficient to improve the interlayer adhesion between said first coating layer and said second coating layer, wherein one or both of said first coating layer and said second coating layer comprises a cured coating layer formed from a curable coating composition comprising:
(A) at least one acrylic film-forming polymer having reactive functional groups selected from hydroxyl groups, carbamate groups and mixtures thereof, the acrylic film-forming polymer comprising residues of a beta-hydroxy group containing monomer selected from at least one of:
    (i) the reaction product of an ethylenically unsaturated acid functional monomer and an epoxy functional compound having no ethylenic unsaturation; and
    (ii) the reaction product of an ethylenically unsaturated, epoxy functional monomer and a saturated carboxylic acid;
(B) at least one curing agent having functional groups reactive with the functional groups of (A) selected from aminoplast resins, polyisocyanates, blocked polyisocyanates and mixtures thereof; and
(C) at least one boron-containing compound selected from at least one of boric acid, boric acid equivalents, and mixtures thereof.

22. The coating composition of claim 21, wherein the curing agent (B) comprises at least one aminoplast resin and at least one blocked polyisocyanate comprising a tricarbamoyl triazine compound.

23. In a curable coating composition used to form a multi-layer composite coating comprising two or more cured coating layers, said multi-layer composite coating comprising at least a first coating layer formed on a substrate and a second coating layer over at least a portion of said first polymeric layer, wherein one or both of said first coating layer and said second coating layer are formed from said curable coating composition, and wherein in the absence of a boron-containing compound, said first coating layer and said second coating layer have poor interlayer adhesion, the improvement comprising the inclusion in said curable coating composition of a boron-containing compound selected from at least one of boric acid, boric acid equivalents, and mixtures thereof in an amount sufficient to improve the interlayer adhesion between said first coating layer and said second coating layer, wherein said first coating layer is formed from a cured coating layer formed from a curable coating composition comprising:
(A) at least one film-forming acrylic polymer comprising functional groups selected from hydroxyl groups, carbamate groups and mixtures thereof;
(B) at least one curing agent selected from aminoplast resins, polyisocyanates, blocked polyisocyanates and mixtures thereof comprising an aminoplast resin and a blocked polyisocyanate comprising a tricarbamoyl triazine compound; and
(C) at least one boron-containing compound selected from boric acid, boric acid equivalents, and mixtures thereof;
and said second coating layer comprises a cured coating layer formed from a curable coating composition comprising:
(D) at least one film-forming polymer having reactive functional groups selected from hydroxyl groups, carbamate groups and mixtures thereof;
(E) at least one curing agent comprising functional groups reactive with the functional groups of (A); and
(F) at least one boron-containing compound selected from at least one of boric acid, boric acid equivalents, and mixtures thereof.

24. In a curable coating composition used to form a multi-layer composite coating comprising two or more cured coating layers, said multi-layer composite coating comprising at least a first coating layer formed on a substrate and a second coating layer over at least a portion of said first polymeric layer, wherein one or both of said first coating layer and said second coating layer are formed from said curable coating composition, and wherein in the absence of a boron-containing compound, said first coating layer and said second coating layer have poor interlayer adhesion, the improvement comprising the inclusion in said curable coating composition of a boron-containing compound selected from at least one of boric acid, boric acid equivalents, and mixtures thereof in an amount sufficient to improve the interlayer adhesion between said first coating layer and said second coating layer, wherein one or both of said first coating layer and said second coating layer comprises a cured coating layer formed from a curable coating composition comprising:
(A) at least one film-forming acrylic polymer having reactive functional groups comprising residues of a beta-hydroxy group-containing monomer selected from at least one of:
    (i) the reaction product of an ethylenically unsaturated acid functional monomer and an epoxy functional compound having no ethylenic unsaturation; and
    (ii) the reaction product of an ethylenically unsaturated, epoxy functional monomer and a saturated carboxylic acid;
(B) at least one curing agent having functional groups reactive with the functional groups of (A) comprising an aminoplast resin and a blocked polyisocyanate comprising a tricarbamoyl triazine compound; and
(C) at least one boron-containing compound comprising a reaction product formed from the following reactants:
    (i) at least one polysiloxane comprising having at least one of the following structural units (I):

wherein each $R^1$ independently is selected from H, a monovalent hydrocarbon group or a siloxane group; each $R^2$ is independently a group comprising OR', where R' is H or an alkyl group having 1 to 20 carbon atoms; and m and n each represent a positive number fulfilling the requirements of $0<m<4$; $0<n<4$; and $2\leq(m+n)<4$; and
    (ii) at least one boron-containing compound comprising at least one of boric acid, boric acid equivalents, and mixtures thereof.

25. The coating composition of claim 24, wherein the boron-containing compound (C) is present in the curable coating composition in an amount sufficient to provide an amount of boron ranging from 0.001 to 5 weight percent, based on weight of total resin solids present in the coating composition.

26. A method for improving the intercoat adhesion of a multi-layer composite comprising two or more polymeric layers, at least one of which is formed from a thermosetting composition, said composite comprising at least a first polymeric layer formed on at least a portion of a substrate, and a second polymeric layer formed over at least a portion of said first polymeric layer, wherein in the absence of a boron-containing compound, said first polymeric layer and said second polymeric layer have poor interlayer adhesion, the improvement comprising the inclusion of at least one boron-containing compound selected from at least one of boric acid, borate ester, and mixtures thereof in one or both of said first and second polymeric layers in an amount sufficient to improve the interlayer adhesion of said first polymeric layer and said second polymeric layer, wherein said boron-containing compound is selected from at least one of acrylic borate ester, polysiloxane borate ester, polyester borate ester, polyurethane borate ester, and mixtures thereof.

27. A method for improving the intercoat adhesion of a multi-layer composite comprising two or more polymeric layers, at least one of which is formed from a thermosetting composition, said composite comprising at least a first polymeric layer formed on at least a portion of a substrate, and a second polymeric layer formed over at least a portion of said first polymeric layer, wherein in the absence of a boron-containing compound, said first polymeric layer and said second polymeric layer have poor interlayer adhesion, the improvement comprising the inclusion of at least one boron-containing compound in one or both of said first and second polymeric layers in an amount sufficient to improve the interlayer adhesion of said first polymeric layer and said second polymeric layer, wherein said boron-containing compound comprises the reaction product formed from the following reactants:

(A) at least one polysiloxane comprising at least one of the following structural units (I):

(I)

wherein each $R_1$ is independently selected from a monovalent hydrocarbon group or a siloxane group; each $R^2$ independently is a group comprising OR', where R' is H or an alkyl group having 1 to 20 carbon atoms; and m and n each represent a positive number fulfilling the requirements of 0<m<4; 0<n<4; and 2≦(m+n)<4; and (B) at least one boron-containing compound selected from at least one of boric acid, boric acid equivalents, and mixtures thereof.

28. The method of claim 27, wherein at least one $R^2$ comprisesOH.

29. The method of claim 27, wherein said polysiloxane comprises one or more ungelled, organic polysiloxanes having reactive functional groups, said polysiloxane having the following structure (II) or (III):

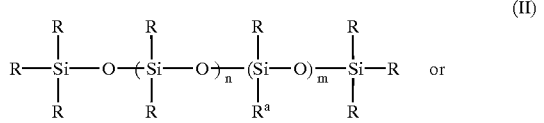

(II)

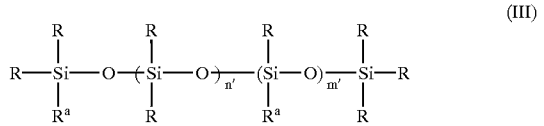

(III)

where
m has a value of at least 1;
m' ranges from 0 to 75;
n ranges from 0 to 75;
n' ranges from 0 to 75;
each R, which may be identical or different, is selected from H, OH, monovalent hydrocarbon groups, monovalent siloxane groups, and mixtures of any of the foregoing; and
$R^a$ comprises the following structure (IV):

—$R^3$—X        (IV):

wherein —$R^3$ is selected from an alkylene group, an oxyalkylene group, an alkylene aryl group, an alkenylene group, an oxyalkenylene group, and an alkenylene aryl group; and
X represents a group which comprises at least one reactive functional group selected from selected from at least one of a hydroxyl group, a carboxyl group, a primary amine group, a secondary amine group, an amide group, a carbamate group, a urea group, an anhydride group, a hydroxy alkylamide group, and an epoxy group.

30. The method of claim 29, wherein the polysiloxane is a reaction product formed from the following reactants:

(A) a silicon hydride-containing polysiloxane having the following structure (V):

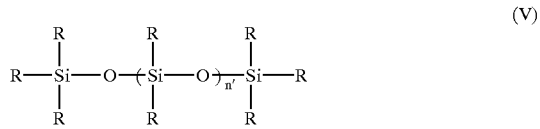

(V)

wherein the R groups are selected from H, OH, monovalent hydrocarbon groups, siloxane groups and mixtures thereof, wherein at least one of the groups represented by R is H, and n' ranges from 0 to 100, such that the mole percent of hydrogen-bonded silicon atoms to non-hydrogen-bonded silicon atoms ranges from 10 to 100 percent; and (B) one or more hydroxyl functional materials comprising at least one primary hydroxyl group and at least one unsaturated bond capable of undergoing hydrosilylation reaction.

31. The method of claim 30, wherein reactant (B) is a hydroxyl functional group-containing allyl ether selected from at least one of trimethylolpropane monoallyl ether, pentaerythritol monoallyl ether, trimethylolpropane diallyl ether and mixtures thereof; or an allyl alcohol.

32. A method lbr improving the intercoat adhesion of a multi-layer composite comprising two or more polymeric layers, at least one of which is formed from a thermosetting composition, said composite comprising at least a first polymeric layer formed on at least a portion of a substrate, and a second polymeric layer formed over at least a portion of said first polymeric layer, wherein in the absence of a boron-containing compound, said first polymeric layer and said second polymeric layer have poor interlayer adhesion, the improvement comprising the inclusion of at least one boron-containing compound selected from boric acid, boric acid equivalents and mixtures thereof in one or both of said first and second polymeric layers in an amount sufficient to improve the interlayer adhesion of said first polymeric layer and said second polymeric layer, wherein said first polymeric layer is formed from a thermosetting composition comprising:

(A) at least one film-forming acrylic polymer having reactive functional groups selected from hydroxyl groups, carbamate groups and mixtures thereof;

(B) at least one curing agent having functional groups reactive with the functional groups of (A), at least one curing agent comprising an aminoplast resin and a blocked isocyanate comprising a tricarbamoyl triazine compound; and (C) at least one boron-containing compound selected from boric acid, boric acid equivalents, and mixtures thereof; and said second polymeric layer comprises a cured layer formed from a thermosetting composition comprising:

(D) at least one film-forming polymer having reactive functional groups;

(E) at least one curing agent having functional groups reactive with the functional groups of (A); and (F) at least one boron-containing compound selected from at least one of boric acid, boric acid equivalents, and mixtures thereof.

33. A method for improving the intercoat adhesion of a multi-layer composite comprising two or more polymeric layers, at least one of which is formed from a thermosetting composition, said composite comprising at least a first polymeric layer formed on at least a portion of a substrate, and a second polymeric layer formed over at least a portion of said first polymeric layer, wherein in the absence of a boron-containing compound, said first polymeric layer and said second polymeric layer have poor interlayer adhesion, the improvement comprising the inclusion of at least one boron-containing compound selected from boric acid, boric acid equivalents and mixtures thereof in one or both of said first and second polymeric layers in an amount sufficient to improve the interlayer adhesion of said first polymeric layer and said second polymeric layer, wherein said first polymeric layer is formed from a thermosetting composition comprising:

(A) at least one film-forming acrylic polymer having reactive functional groups selected from hydroxyl groups, carbamate groups and mixtures thereof;

(B) at least one curing agent selected from aminoplast resins, polyisocyanates, blocked isocyanates and mixtures thereof; and (C) at least one boron-containing compound comprising the reaction product formed from the following reactants:

(i) at least one polysiloxane comprising at least one of the following structural units (I):

$$R^1{}_n R^2{}_m SiO_{(4-n-m)/2} \quad (I)$$

wherein each $R^1$ is independently selected from a monovalent hydrocarbon group or a siloxane group; each $R^2$ independently is a group comprising OR', where R' is H or an alkyl group having 1 to 20 carbon atoms; and m and n each represent a positive number fulfilling the requirements of $0<m<4$; $0<n<4$; and $2 \leq (m+n) <4$; and (ii) a boron-containing compound comprising at least one of boric acid, boric acid equivalents, and mixtures thereof; and said second polymeric layer comprises a cured layer formed from a thermosetting composition comprising:

(D) at least one film-forming polymer having reactive functional groups;

(E) at least one curing agent having functional groups reactive with the functional groups of (A); and (F) at least one boron-containing compound selected from at least one of boric acid, boric acid equivalents, and mixtures thereof.

34. The method of claim 33, wherein the boron-containing compound (C) comprises boric acid and/or boric acid ester.

35. The method of claim 33, wherein the boron-containing compound (C) is present in the thermosetting composition in an amount sufficient to provide an amount of boron ranging from 0.001 to 5 weight percent based on weight of total resin solids present in the thermosetting composition.

* * * * *